United States Patent
Norton et al.

(10) Patent No.: US 9,244,235 B2
(45) Date of Patent: Jan. 26, 2016

(54) SYSTEMS AND ASSEMBLIES FOR TRANSFERRING HIGH POWER LASER ENERGY THROUGH A ROTATING JUNCTION

(71) Applicant: Foro Energy Inc., Littleton, CO (US)

(72) Inventors: Ryan J. Norton, Conifer, CO (US);
Ryan P. McKay, Littleton, CO (US);
Jason D. Fraze, Littleton, CO (US);
Charles C. Rinzler, Denver, CO (US);
Daryl L. Grubb, Houston, TX (US);
Brian O. Faircloth, Evergreen, CO (US); Mark S. Zediker, Castle Rock, CO (US)

(73) Assignee: FORO ENERGY, INC., Houston, TX (US)

( * ) Notice: Subject to any disclaimer, the term of this patent is extended or adjusted under 35 U.S.C. 154(b) by 279 days.

(21) Appl. No.: 13/782,942

(22) Filed: Mar. 1, 2013

(65) Prior Publication Data

US 2013/0266031 A1    Oct. 10, 2013

Related U.S. Application Data

(63) Continuation-in-part of application No. 13/210,581, filed on Aug. 16, 2011, now Pat. No. 8,662,160, and a continuation-in-part of application No. 13/366,882, filed on Feb. 6, 2012, now Pat. No. 9,138,786, and a
(Continued)

(51) Int. Cl.
*G02B 6/26* (2006.01)
*G02B 6/42* (2006.01)
*H01S 3/08* (2006.01)
*G02B 6/38* (2006.01)
(Continued)

(52) U.S. Cl.
CPC .......... *G02B 6/4296* (2013.01); *G02B 6/2817* (2013.01); *G02B 6/32* (2013.01); *G02B 6/3871* (2013.01); *G02B 6/3897* (2013.01); *H01S 3/08* (2013.01); *G02B 6/3604* (2013.01); *G02B 2006/4297* (2013.01)

(58) Field of Classification Search
CPC ............................ G02B 6/4296; G02B 6/2817
See application file for complete search history.

(56) References Cited

U.S. PATENT DOCUMENTS

| 914,636 A | 3/1909 | Case |
|---|---|---|
| 2,548,463 A | 4/1951 | Blood |

(Continued)

FOREIGN PATENT DOCUMENTS

| EP | 0 295 045 A2 | 12/1988 |
|---|---|---|
| EP | 0295 045 A2 | 12/1988 |

(Continued)

OTHER PUBLICATIONS

International Search Report for related application case No. PCT/US2012/049338, dated Jan. 22, 2013, 14 pgs.
(Continued)

*Primary Examiner* — Rhonda Peace
(74) *Attorney, Agent, or Firm* — Glen P. Belvis; Steptoe & Johnson

(57) ABSTRACT

There are provided high power laser devices and systems for transmitting a high power laser beam across a rotating assembly, including optical slip rings and optical rotational coupling assemblies. These devices can transmit the laser beam through the rotation zone in free space or within a fiber.

5 Claims, 48 Drawing Sheets

Related U.S. Application Data continuation-in-part of application No. 12/543,986, filed on Aug. 19, 2009, now Pat. No. 8,826,973, and a continuation-in-part of application No. 12/544,136, filed on Aug. 19, 2009, now Pat. No. 8,511,401.

(60) Provisional application No. 61/605,401, filed on Mar. 1, 2012, provisional application No. 61/106,472, filed on Oct. 17, 2008, provisional application No. 61/153,271, filed on Feb. 17, 2009.

(51) Int. Cl.
*G02B 6/32* (2006.01)
*G02B 6/28* (2006.01)
*G02B 6/36* (2006.01)

(56) References Cited

U.S. PATENT DOCUMENTS

| | | |
|---|---|---|
| 2,742,555 A | 4/1956 | Murray |
| 3,122,212 A | 2/1964 | Karlovitz |
| 3,383,491 A | 5/1968 | Muncheryan |
| 3,461,964 A | 8/1969 | Venghiattis |
| 3,493,060 A | 2/1970 | Van Dyk |
| 3,503,804 A | 3/1970 | Schneider et al. |
| 3,539,221 A | 11/1970 | Gladstone |
| 3,544,165 A | 12/1970 | Snedden |
| 3,556,600 A | 1/1971 | Shoupp et al. |
| 3,574,357 A | 4/1971 | Alexandru et al. |
| 3,586,413 A | 6/1971 | Adams |
| 3,652,447 A | 3/1972 | Yant |
| 3,693,718 A | 9/1972 | Stout |
| 3,699,649 A | 10/1972 | McWilliams |
| 3,802,203 A | 4/1974 | Ichise et al. |
| 3,820,605 A | 6/1974 | Barber et al. |
| 3,821,510 A | 6/1974 | Muncheryan |
| 3,823,788 A | 7/1974 | Garrison et al. |
| 3,871,485 A | 3/1975 | Keenan, Jr. |
| 3,882,945 A | 5/1975 | Keenan, Jr. |
| 3,938,599 A | 2/1976 | Horn |
| 3,960,448 A | 6/1976 | Schmidt et al. |
| 3,977,478 A | 8/1976 | Shuck |
| 3,992,095 A | 11/1976 | Jacoby et al. |
| 3,992,096 A | 11/1976 | Oliveira |
| 3,998,281 A | 12/1976 | Salisbury et al. |
| 4,019,331 A | 4/1977 | Rom et al. |
| 4,025,091 A | 5/1977 | Zeile, Jr. |
| 4,026,356 A | 5/1977 | Shuck |
| 4,047,580 A | 9/1977 | Yahiro et al. |
| 4,057,118 A | 11/1977 | Ford |
| 4,061,190 A | 12/1977 | Bloomfield |
| 4,066,138 A | 1/1978 | Salisbury et al. |
| 4,090,572 A | 5/1978 | Welch |
| 4,113,036 A | 9/1978 | Stout |
| 4,125,757 A | 11/1978 | Ross |
| 4,151,393 A | 4/1979 | Fenneman et al. |
| 4,162,400 A | 7/1979 | Pitts, Jr. |
| 4,189,705 A | 2/1980 | Pitts, Jr. |
| 4,194,536 A | 3/1980 | Stine et al. |
| 4,199,034 A | 4/1980 | Salisbury et al. |
| 4,227,582 A | 10/1980 | Price |
| 4,228,856 A | 10/1980 | Reale |
| 4,243,298 A | 1/1981 | Kao et al. |
| 4,249,925 A | 2/1981 | Kawashima et al. |
| 4,252,015 A | 2/1981 | Harbon et al. |
| 4,256,146 A | 3/1981 | Genini et al. |
| 4,266,609 A | 5/1981 | Rom et al. |
| 4,280,535 A | 7/1981 | Willis |
| 4,281,891 A | 8/1981 | Shinohara et al. |
| 4,282,940 A | 8/1981 | Salisbury et al. |
| 4,332,401 A | 6/1982 | Stephenson et al. |
| 4,336,415 A | 6/1982 | Walling |
| 4,340,245 A | 7/1982 | Stalder |
| 4,367,917 A | 1/1983 | Gray |
| 4,370,886 A | 2/1983 | Smith, Jr. et al. |
| 4,374,530 A | 2/1983 | Walling |
| 4,375,164 A | 3/1983 | Dodge et al. |
| 4,389,645 A | 6/1983 | Wharton |
| 4,415,184 A | 11/1983 | Stephenson et al. |
| 4,417,603 A | 11/1983 | Argy |
| 4,436,177 A | 3/1984 | Elliston |
| 4,444,420 A | 4/1984 | McStravick et al. |
| 4,453,570 A | 6/1984 | Hutchison |
| 4,459,731 A | 7/1984 | Hutchison |
| 4,477,106 A | 10/1984 | Hutchison |
| 4,504,112 A | 3/1985 | Gould et al. |
| 4,522,464 A | 6/1985 | Thompson et al. |
| 4,531,552 A | 7/1985 | Kim |
| 4,565,351 A | 1/1986 | Conti et al. |
| 4,662,437 A | 5/1987 | Renfro |
| 4,694,865 A | 9/1987 | Tauschmann |
| 4,707,073 A * | 11/1987 | Kocher ............. B23K 26/06 219/121.6 |
| 4,725,116 A | 2/1988 | Spencer et al. |
| 4,741,405 A | 5/1988 | Moeny et al. |
| 4,744,420 A | 5/1988 | Patterson et al. |
| 4,770,493 A | 9/1988 | Ara et al. |
| 4,793,383 A | 12/1988 | Gyory et al. |
| 4,830,113 A | 5/1989 | Geyer |
| 4,860,654 A | 8/1989 | Chawla et al. |
| 4,860,655 A | 8/1989 | Chawla |
| 4,872,520 A | 10/1989 | Nelson |
| 4,924,870 A | 5/1990 | Wlodarczyk et al. |
| 4,952,771 A | 8/1990 | Wrobel |
| 4,989,236 A | 1/1991 | Myllymäki |
| 4,997,250 A | 3/1991 | Ortiz, Jr. |
| 5,003,144 A | 3/1991 | Lindroth et al. |
| 5,004,166 A | 4/1991 | Sellar |
| 5,013,311 A * | 5/1991 | Nouri ............. A61F 9/008 128/897 |
| 5,033,545 A | 7/1991 | Sudol |
| 5,049,738 A | 9/1991 | Gergely et al. |
| 5,054,877 A * | 10/1991 | Ortiz, Jr. ............. G02B 6/2817 385/33 |
| 5,065,448 A * | 11/1991 | Ortiz, Jr. ............. G02B 6/4296 385/53 |
| 5,084,617 A | 1/1992 | Gergely |
| 5,086,842 A | 2/1992 | Cholet |
| 5,093,880 A | 3/1992 | Matsuda et al. |
| 5,107,936 A | 4/1992 | Foppe |
| 5,121,872 A | 6/1992 | Legget |
| 5,125,061 A | 6/1992 | Marlier et al. |
| 5,125,063 A | 6/1992 | Panuska et al. |
| 5,128,882 A | 7/1992 | Cooper et al. |
| 5,136,676 A * | 8/1992 | Arnett ............. A61B 18/201 385/117 |
| 5,140,664 A | 8/1992 | Bosisio et al. |
| 5,163,321 A | 11/1992 | Perales |
| 5,168,940 A | 12/1992 | Foppe |
| 5,172,112 A | 12/1992 | Jennings |
| 5,182,785 A | 1/1993 | Savegh et al. |
| 5,212,755 A | 5/1993 | Holmberg |
| 5,226,107 A | 7/1993 | Stern et al. |
| 5,269,377 A | 12/1993 | Martin |
| 5,285,204 A | 2/1994 | Sas-Jaworsky |
| 5,309,541 A * | 5/1994 | Flint ............. G02B 6/102 359/365 |
| 5,319,528 A * | 6/1994 | Raven ............. G02B 27/09 359/318 |
| 5,348,097 A | 9/1994 | Giannesini et al. |
| 5,351,533 A | 10/1994 | Macadam et al. |
| 5,353,875 A | 10/1994 | Schultz et al. |
| 5,355,967 A | 10/1994 | Mueller et al. |
| 5,356,081 A | 10/1994 | Sellar |
| 5,396,805 A | 3/1995 | Surjaatmadja |
| 5,397,372 A | 3/1995 | Partus et al. |
| 5,411,081 A | 5/1995 | Moore et al. |
| 5,411,085 A | 5/1995 | Moore et al. |
| 5,411,105 A | 5/1995 | Gray |
| 5,413,045 A | 5/1995 | Miszewski |
| 5,413,170 A | 5/1995 | Moore |
| 5,419,188 A | 5/1995 | Rademaker et al. |
| 5,423,383 A | 6/1995 | Pringle |
| 5,425,420 A | 6/1995 | Pringle |

(56) References Cited

U.S. PATENT DOCUMENTS

| | | |
|---|---|---|
| 5,435,351 A | 7/1995 | Head |
| 5,435,395 A | 7/1995 | Connell |
| 5,463,534 A * | 10/1995 | Raven .................. G02B 27/09 |
| | | 359/318 |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |
| 5,566,764 A | 10/1996 | Elliston |
| 5,573,225 A | 11/1996 | Boyle et al. |
| 5,574,815 A | 11/1996 | Kneeland |
| 5,577,560 A | 11/1996 | Coronado et al. |
| 5,586,609 A | 12/1996 | Schuh |
| 5,599,004 A | 2/1997 | Newman et al. |
| 5,615,052 A | 3/1997 | Doggett |
| 5,638,904 A | 6/1997 | Misselbrook et al. |
| 5,655,745 A | 8/1997 | Morrill |
| 5,692,087 A | 11/1997 | Partus et al. |
| 5,694,408 A | 12/1997 | Bott et al. |
| 5,699,974 A | 12/1997 | Jenkins |
| 5,699,996 A | 12/1997 | Boyle |
| 5,707,939 A | 1/1998 | Patel |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,946,788 A | 9/1999 | Griffioen |
| 5,950,298 A | 9/1999 | Griffioen |
| 5,973,783 A | 10/1999 | Goldner et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,200 B1 | 5/2001 | Cunningham et al. |
| 6,227,300 B1 | 5/2001 | Cunningham et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,354,370 B1 | 3/2002 | Miller |
| 6,355,928 B1 | 3/2002 | Skinner et al. |
| 6,356,683 B1 | 3/2002 | Hu et al. |
| 6,361,299 B1 | 3/2002 | Quigley |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,409,155 B1 | 6/2002 | Brown |
| 6,426,479 B1 | 7/2002 | Bischof |
| 6,437,326 B1 | 8/2002 | Yamate et al. |
| 6,450,257 B1 | 9/2002 | Douglas |
| 6,463,198 B1 | 10/2002 | Coleman et al. |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,634,388 B1 | 10/2003 | Taylor |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Crabtree et al. |
| 6,725,924 B2 | 4/2004 | Davidson et al. |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,944,380 B1 | 9/2005 | Hideo et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,013,993 B2 | 3/2006 | Masui |
| 7,015,983 B2 * | 3/2006 | Saccomanno ...... G02B 27/1046 |
| | | 348/383 |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,099,533 B2 | 8/2006 | Chenard |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,685 B2 | 12/2006 | Adnan |
| 7,152,700 B2 | 12/2006 | Church et al. |

(56) References Cited

U.S. PATENT DOCUMENTS

| | | | |
|---|---|---|---|
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,310,466 B2 | 12/2007 | Fink et al. |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,382,949 B2 * | 6/2008 | Bouma ............... A61B 1/00183 |
| | | 385/147 |
| 7,394,064 B2 | 7/2008 | Marsh |
| 7,395,696 B2 | 7/2008 | Bissonnette et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,535,628 B2 | 5/2009 | Tsuchiya et al. |
| 7,559,378 B2 | 7/2009 | Moeny |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,953 B2 | 1/2010 | Dowd et al. |
| 7,647,948 B2 | 1/2010 | Quigley et al. |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,773,655 B2 * | 8/2010 | Chuyanov ............. G02B 6/4206 |
| | | 372/50.23 |
| 7,802,384 B2 | 9/2010 | Kobayashi et al. |
| 7,834,777 B2 | 11/2010 | Gold |
| 7,845,419 B2 | 12/2010 | Naumann |
| 7,848,368 B2 | 12/2010 | Gapontsev et al. |
| 7,900,699 B2 | 3/2011 | Ramos et al. |
| 7,938,175 B2 | 5/2011 | Skinner et al. |
| 8,011,454 B2 | 9/2011 | Castillo |
| 8,062,986 B2 | 11/2011 | Khrapko et al. |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,118,282 B2 | 2/2012 | Griffioen |
| 8,175,433 B2 | 5/2012 | Caldwell et al. |
| 8,307,900 B2 | 11/2012 | Lynde |
| 8,385,705 B2 | 2/2013 | Overton et al. |
| 8,424,617 B2 | 4/2013 | Faircloth |
| 8,432,945 B2 * | 4/2013 | Faybishenko ........ G02B 6/4296 |
| | | 362/259 |
| 8,464,794 B2 | 6/2013 | Schultz |
| 8,511,401 B2 * | 8/2013 | Zediker ................. E21B 7/14 |
| | | 166/65.1 |
| 8,522,869 B2 | 9/2013 | Noya |
| 8,528,643 B2 | 9/2013 | Schultz |
| 8,534,357 B2 | 9/2013 | Schultz |
| 8,540,026 B2 | 9/2013 | Schultz |
| 8,627,901 B1 * | 1/2014 | Underwood ............ E21B 7/14 |
| | | 175/107 |
| 8,662,160 B2 * | 3/2014 | DeWitt ................. E21B 10/60 |
| | | 166/65.1 |
| 8,711,894 B2 * | 4/2014 | Chuyanov ............ G02B 6/4206 |
| | | 372/23 |
| 2002/0007945 A1 | 1/2002 | Neuroth et al. |
| 2002/0028287 A1 | 3/2002 | Kawada et al. |
| 2002/0039465 A1 | 4/2002 | Skinner |
| 2002/0189806 A1 | 12/2002 | Davidson et al. |
| 2003/0000741 A1 | 1/2003 | Rosa |
| 2003/0025842 A1 * | 2/2003 | Saccomanno ...... G02B 27/1046 |
| | | 348/758 |
| 2003/0053783 A1 | 3/2003 | Shirasaki |
| 2003/0056990 A1 | 3/2003 | Oglesby |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026127 A1 | 2/2004 | Masui |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0096614 A1 | 5/2004 | Quigley |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0200341 A1 | 10/2004 | Walters |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammai et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0016730 A1 | 1/2005 | McMechan |
| 2005/0024716 A1 | 2/2005 | Nilsson et al. |
| 2005/0034857 A1 | 2/2005 | Defretin et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121094 A1 | 6/2005 | Quigley |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0279511 A1 | 12/2005 | Adnan |
| 2005/0282645 A1 | 12/2005 | Bissonnette et al. |
| 2006/0005579 A1 | 1/2006 | Jacobsen et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0173148 A1 | 8/2006 | Sasaki et al. |
| 2006/0185843 A1 | 8/2006 | Smith, Jr. |
| 2006/0191684 A1 | 8/2006 | Smith, Jr. |

(56) References Cited

U.S. PATENT DOCUMENTS

| | | |
|---|---|---|
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 | 11/2006 | Tsuchiya et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0081157 A1 | 4/2007 | Csutak et al. |
| 2007/0125163 A1 | 6/2007 | Dria et al. |
| 2007/0153847 A1* | 7/2007 | Faircloth ............... H01S 5/405 372/35 |
| 2007/0171556 A1* | 7/2007 | Faircloth ............... G02B 5/04 359/834 |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0128123 A1 | 6/2008 | Gold |
| 2008/0135818 A1 | 6/2008 | Griffioen |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2009/0020333 A1 | 1/2009 | Marsh |
| 2009/0029842 A1 | 1/2009 | Khrapko et al. |
| 2009/0031870 A1 | 2/2009 | O'Connor |
| 2009/0033176 A1 | 2/2009 | Huang et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0225793 A1 | 9/2009 | Marciante |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1 | 2/2010 | Zediker |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0096124 A1 | 4/2010 | Naumann |
| 2010/0111474 A1 | 5/2010 | Satake |
| 2010/0114190 A1 | 5/2010 | Bendett et al. |
| 2010/0155059 A1 | 6/2010 | Ullah |
| 2010/0158457 A1 | 6/2010 | Drozd et al. |
| 2010/0158459 A1 | 6/2010 | Homa |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0212769 A1 | 8/2010 | Quigley |
| 2010/0215326 A1 | 8/2010 | Zediker |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0260454 A1* | 10/2010 | Mills ................... G02B 6/4204 385/33 |
| 2010/0290781 A1 | 11/2010 | Overton et al. |
| 2010/0326659 A1 | 12/2010 | Schultz et al. |
| 2010/0326665 A1 | 12/2010 | Redlinger et al. |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0085149 A1 | 4/2011 | Nathan |
| 2011/0122644 A1 | 5/2011 | Okuno |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0170563 A1 | 7/2011 | Heebner et al. |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler et al. |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt et al. |
| 2012/0068086 A1 | 3/2012 | DeWitt et al. |
| 2012/0068523 A1 | 3/2012 | Bowles |
| 2012/0074110 A1 | 3/2012 | Zediker et al. |
| 2012/0081893 A1* | 4/2012 | Faybishenko ........ G02B 6/4296 362/235 |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0155813 A1 | 6/2012 | Quigley |
| 2012/0189258 A1 | 7/2012 | Overton et al. |
| 2012/0217015 A1 | 8/2012 | Zediker et al. |
| 2012/0217017 A1 | 8/2012 | Zediker et al. |
| 2012/0217018 A1 | 8/2012 | Zediker et al. |
| 2012/0217019 A1 | 8/2012 | Zediker et al. |
| 2012/0239013 A1 | 9/2012 | Islam |
| 2012/0248078 A1 | 10/2012 | Zediker et al. |
| 2012/0255774 A1 | 10/2012 | Grubb et al. |
| 2012/0255933 A1 | 10/2012 | McKay et al. |
| 2012/0255993 A1 | 10/2012 | Bandholz |

(56) References Cited

U.S. PATENT DOCUMENTS

| | | |
|---|---|---|
| 2012/0259013 A1 | 10/2012 | Motwani |
| 2012/0261188 A1 | 10/2012 | Zediker et al. |
| 2012/0266803 A1 | 10/2012 | Zediker et al. |
| 2012/0267168 A1 | 10/2012 | Grubb et al. |
| 2012/0273269 A1 | 11/2012 | Rinzler et al. |
| 2012/0273470 A1 | 11/2012 | Zediker et al. |
| 2012/0275159 A1 | 11/2012 | Fraze et al. |
| 2013/0011102 A1 | 1/2013 | Rinzler |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0228557 A1 | 9/2013 | Zediker |
| 2013/0266031 A1* | 10/2013 | Norton ............. H01S 3/08 372/9 |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 515 983 A1 | 12/1992 |
| EP | 0515983 A1 | 12/1992 |
| EP | 0 565 287 A1 | 10/1993 |
| EP | 0 950 170 B1 | 9/2002 |
| FR | 2 716 924 | 9/1995 |
| FR | 2 716 924 A1 | 9/1995 |
| GB | 1 284 454 | 8/1972 |
| GB | 2420358 B | 5/2006 |
| JP | 1987-011804 | 1/1987 |
| JP | 1993-118185 | 5/1993 |
| JP | 1993-33574 | 9/1993 |
| JP | 09072738 A | 3/1997 |
| JP | 09-242453 A | 9/1997 |
| JP | 2000-334590 A | 12/2000 |
| JP | 2001-208924 | 8/2001 |
| JP | 2003-239673 | 8/2003 |
| JP | 2004-108132 | 4/2004 |
| JP | 2004-108132 A | 4/2004 |
| JP | 2006-039147 | 2/2006 |
| JP | 2006-509253 | 3/2006 |
| JP | 2006-307481 A | 11/2006 |
| JP | 2007-120048 A | 5/2007 |
| JP | 2008-242012 | 10/2008 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/050286 A1 | 7/2003 |
| WO | WO 03/060286 A1 | 7/2003 |
| WO | WO 2004/009958 A1 | 1/2004 |
| WO | WO2004/052078 | 6/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/135485 A2 | 11/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/037944 A1 | 8/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

International Search Report for PCT Application No. PCT/US2011/044548, dated Jan. 24. 2012, 17 pgs.

International Search Report for PCT Application No. PCT/US2011/047902, dated Jan. 17, 2012, 9 pgs.

International Search Report for PCT Application No. PCT/US2011/050044, dated Feb. 1, 2012, 26 pgs.

International Search Report for PCT Application No. PCT/US2012/026277, dated May 30, 2012, 11 pgs.

International Search Report for PCT Application No. PCT/US2012/026265, dated May 30, 2012, 14 pgs.

U.S. Appl. No. 13/486,795, filed Jun. 1, 2012, Rinzler et al.

U.S. Appl. No. 13/565,345, filed Aug. 2, 2012, Zediker et al.

International Search Report for PCT Application No. PCT/US2012/026280, dated May 30, 2012, 12 pgs.

International Search Report for PCT Application No. PCT/US2012/026471, dated May 30, 2012, 13 pgs.

International Search Report for PCT Application No. PCT/US2012/026525, dated May 31, 2012, 8 pgs.

International Search Report for PCT Application No. PCT/US2012/026526, dated May 31, 2012, 10 pgs.

International Search Report for PCT Application No. PCT/US20/026494, dated May 31, 2012, 12 pgs.

International Search Report for PCT Application No. PCT/US2012/026337, dated Jun. 7, 2012, 21 pgs.

International Search Report for PCT Application No. PCT/US2012/020789, dated Jun. 29, 2012, 9 pgs.

International Search Report for PCT Application No. PCT/US2012/040490, dated Oct. 22, 2012, 14 pgs.

Labuz, J. F. et al., "Experiments with Rock: Remarks on Strength and Stability Issues", *International Journal of Rock Mechanics & Mining Science*, vol. 44, 2007, pp. 525-537.

Labuz, J. F. et al., "Size Effects in Fracture of Rock", *Rock Mechanics for Industry*, Amadei, Kranz, Scott & Smeallie (eds), 1999, pp. 1137-1143.

Langeveld, C. J., "PDC Bit Dynamics", a paper prepared for presentation at the 1992 IADC/SPE Drilling Conference, Feb. 1992, pp. 227-241.

Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.

Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.

Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.

Lehnhoff, T. F. et al., "The Influence of Temperature Dependent Properties on Thermal Rock Fragmentation", *Int. J. Rock Mech. Min, Sci. & Geomech. Abstr.*, vol. 12, 1975, pp. 255-260.

(56) References Cited

OTHER PUBLICATIONS

Leong, K. H., "Modeling Laser Beam-Rock Interaction", a report prepared for US Department of Energy (http://www.doe.gov/bridge), while publication date is unknown, it is believed to be prior to Jul. 21, 2010, 8 pages including pp. 1-6.

Li, Q. et al., "Experimental Research on Crack Propagation and Failure in Rock-type Materials under Compression", *EJGE*, vol. 13, Bund. D, 2008, p. 1-13.

Li, X. B. et al., "Experimental Investigation in the Breakage of Hard Rock by the PDC Cutters with Combined Action Modes", *Tunnelling and Underground Space Technology*, vol. 16. 2001, pp. 107-114.

Liddle, D. et al., " Cross Sector Decommissioning Workshop", presentation, Mar. 23, 2011, 14 pages.

Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.

Loland, K. E., "Continuous Damage Model for Load-Response Estimation of Concrete", *Cement and Concrete Research*, vol. 10, 1980, pp. 395-402.

Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.

Lubarda, V. A. et al., "Damage Model for Brittle Elastic Solids with Unequal Tensile and Compressive Strengths", *Engineering Fracture Mechanics*, vol. 29, No. 5, 1994, pp. 681-692.

Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.

Luffel, D. L. et al., "Travis Peak Core Permeability and Porosity Relationships at Reservoir Stress", *SPE Formation Evaluation*, Sep. 1991, pp. 310-318.

Luft, H. B. et al., "Development and Operation of a New Insulated Concentric Coiled Tubing String for Continuous Steam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Lund, M. et al., "Specific Ion Binding to Macromolecules: Effect of Hydrophobicity and Ion Pairing", *Langmuir*, 2008 vol. 24, 2008, pp. 3387-3391.

Manrique, E. J. et al., "EOR Field Experiences in Carbonate Reservoirs in the United States", *SPE Reservoir Evaluation & Engineering*, Dec. 2007, pp. 667-686.

Maqsood, A. et al., "Thermophysical Properties of Porous Sandstones: Measurement and Comparative Study of Some Representative Thermal Conductivity Models", International Journal of Thermophysics, vol. 26, No. 5, Sep. 2005. pp. 1617-1632.

Marcuse, D., "Curvature Loss Formula for Optical Fibers", *J. Opt. Soc. Am.*, vol. 66, No. 3, 1976, pp. 216-220.

Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.

Martins, A. et al., "Modeling of Bend Losses in Single-Mode Optical Fibers", Institutu de Telecomunicacoes, Portugal, while the date of publication is unknown, it is believed to be prior to Aug. 19, 2009, 3 pages.

Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Meister, S. et al., "Glass Fibers for Stimulated Brillouin Scattering and Phase Conjugation", *Laser and Particle Beams*, vol. 25. 2007, pp. 15-21.

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly Heterogeneous Applications", a paper prepared for the 2004 SPE (Society of Petroleum Engineers) Eastern Regional Meeting, Sep. 2004, pp. 1-14.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mirkovich, V. V., "Experimental Study Relating Thermal Conductivity to Thermal Piercing of Rocks", *Int. J. Rock Mech. Min. Sci.*, vol. 5, 1968, pp. 205-218.

Mittelstaedt, E. et al., "A Noninvasive Method for Measuring the Velocity of Diffuse Hydrothermal Row by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the US Department of Transportation under Contract C-85-65, May 1968, 91 pages.

Montross, C. S. et al., "Laser-Induced Shock Wave Generation and Shock Wave Enhancement in Basalt", *International Journal of Rock Mechanics and Mining Sciences*, 1999, pp. 849-855.

Morozumi, V. et al., "Growth and Structures of Surface Disturbances of a Round Liquid Jet in a Coaxial Airflow", *Fluid Dynamics Research*, vol. 34, 2004, pp. 217-231.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Moshier, S. O., "Microporosity in Micritic Limestones: A Review", *Sedimentary Geology*, vol. 63, 1989, pp. 191-213.

Mostafa, M. S. et al., "Investigation of Thermal Properties of Some Basalt Samples in Egypt", *Journal of Thermal Analysis and Calorimetry*, vol. 75, 2004, pp. 178-188.

Mukhin, I. B. et al., "Experimental Study of Kilowatt-Average-Power Faraday Isolators", OSA/ASSP, 2007, 3 pages.

Multari, R. A. et al., "Effect of Sampling Geometry on Eiemental Emissions in Laser-Induced Breakdown Spectroscopy", *Applied Spectroscopy*, vol. 50, No. 12, 1996, pp. 1483-1499.

Munro, R. G., "Effective Medium Theory of the Porosity Dependence of Bulk Moduli", *Communications of American Ceramic Society*, vol. 84, No. 5, 2001, pp. 1190-1192.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.

Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.

Nara, Y. et al., "Study of Subcritical Crack Growth in Andesite Using the Double Torsion Test", *International Journal of Rock Mechanics & Mining Sciences*, vol. 42, 2005, pp. 521-530.

Nicklaus, K. et al., "Optical Isolator for Unpolarized Laser Radiation at Multi-Kilowatt Average Power", *Optical Society of America*, 2005, 3 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

(56) References Cited

OTHER PUBLICATIONS

Nilsen, B. et al., "Recent Developments in Site Investigation and Testing for Hard Rock TBM Projects", *1999 RETC Proceedings*, 1999, pp. 715-731.

Nimick, F. B., "Empirical Relationships Between Porosity and the Mechanical Properties of Tuff", *Key Questions in Rock Mechanics*, Cundall et al, (eds), 1988, pp. 741-742.

Nolen-Hoeksema, R., "Fracture Development and Mechnical Stratigraphy of Austin Chalk, Texas: Discussion", a discussion for The American Association of Petroleum Geologists Bulletin, vol. 73, No. 6, Jun. 1989, pp. 792-793.

Oglesby, K. et al., "Advanced Ultra High Speed Motor for Drilling", a project update by Impact Technologies LLC for the US Department of Energy, Sep. 12, 2005, 36 pages.

Olsen, F. O., "Fundamental Mechanisms of Cutting Front Formation in Laser Cutting", *SPIE*, vol. 2207, while publication date is unknown, it is believed to be prior to Jul. 21, 2010, pp. 402-413.

Ouyang, L. B. et al., "General Single Phase Wellbore Flow Model", a report prepared for the US COE/PETC, May 2, 1997, 51 pages.

Palchaev, D. K. et al., "Thermal Expansion of Silicon Carbide Materials", *Journal of Engineering Physics and Thermophysics*, vol. 66, No. 6, 1994, 3 pages.

Parker, R. et al., "Drilling Large Diameter Holes in Rocks Using Multiple Laser Beams (504)", while the date of the publication is unknown, it is believed to be prior to Aug. 19, 2009, 6 pages.

Patricio, M. et al., "Crack Propagation Analysis", while the date of the publication is unknown, it is believed to be prior to Aug. 19, 2009, 24 pages.

Peebler, R. P. et al., "Formation Evaluation with Logs in the Deep Anadarko Basin", *SPE of AIME*, 1972, 15 pages.

Pepper, D. W. et al., "Benchmarking COMSOL Multiphysics 3.5a—CFD Problems", a presentation, Oct. 10, 2009, 54 pages.

Pettitt, R. et al., "Evolution of a Hybrid Roller Cone/PDC Core Bit", a paper prepared for Geothermal Resources Council 1980 Annual Meeting, Sep. 1980, 7 pages.

Phani, K. K. et al., "Porosity Dependence of Ultrasonic Velocity and Elastic Modulus in Sintered Uranium Dioxide—a discussion", *Journal of Materials Science Letters*, vol. 5, 1986, pp. 427-430.

Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

Porter, J. A. et al., "Cutting Thin Sheet Metal with a Water Jet Guided Laser Using Various Cutting Distances, Feed Speeds and Angles of Incidence", *Int. J. Adv. Manuf. Technol.*, vol. 33, 2007, pp. 961-967.

Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.

Potyondy, D. O., "Simulating Stress Corrosion with a Bonded-Particle Model for Rock", *International Journal of Rock Mechanics & Mining Sciences*, vol. 44, 2007, pp. 677-691.

Powell, M. et al., "Optimization of UHP Waterjet Cutting Head, The Orifice", Flow International, while the date of the publication is unknown, it is believed to be prior to Aug. 19, 2009, 19 pages.

Price, R. H., et al., "Analysis of the Elastic and Strength Properties of Yuccs Mountain tuff, Nevada", 26th US Symposium on Rock Mechanics, Jun. 1985, pp. 89-96.

Quinn, R. D. et al., "A Method for Calculating Transient Surface Temperatures and Surface Heating Rates for High-Speed Aircraft", NASA, Dec. 2000, 35 pages.

Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauerizahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.

Ravishankar, M. K., "Some Results on Search Complexity vs Accuracy", DARPA Spoken Systems Technology Workshop, Feb. 1997, 4 pages.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of Igneous Rocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rjken, P. et al., "Role of Shale Thickness on Vertical Connectivity of Fractures: Application of Crack-Bridging Theory to the Austin Chalk, Texas", *Tectonophysics*, vol. 337, 2001, pp. 117-133.

Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.

Rosler, M., "Generalized Hermite Polynomials and the Heat Equation for Dunkl Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rubin, A. M. et al., "Dynamic Tensile-Failure-Induced Velocity Deficits in Rock", *Geophysical Research Letters*, vol. 18, No. 2, Feb. 1991, pp. 219-222.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for The US Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

(56) References Cited

OTHER PUBLICATIONS

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

Shiraki, K. et al., "SBS Threshold of a Fiber with a Brillouin Frequency Shift Distribution", Journal of Lightwave Technology, vol. 14, No. 1, Jan. 1996, pp. 50-57.

Singh, T. N. et al., "Prediction of Thermal Conductivity of Rock Through Physico-Mechanical Properties", *Building and Environment*, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003, 6 pages.

Sinor, A. et al., "Drag Bit Wear Model", *SPE Drilling Engineering*, Jun. 1989, pp. 128-136.

Smith, D., "Using Coupling Variables to Solve Compressible Flow, Muitiphase Flow and Plasma Processing Problems", COMSOL Users Conference 2006, Nov. 1, 2006, 38 pages.

Sneider, RM et al., "Rock Types, Depositional History, and Diangenetic Effects, Ivishak reservoir Prudhoe Bay Field", *SPE Reservoir Engineering*, Feb. 1997, pp. 23-30.

Soedler, D. J. et al., "Pore Geometry in High- and Low-Permeability Sandstones. Travis Peak Formation, East Texas", *SPE Formation Evaluation*, Dec. 1990, pp. 421-430.

Somerton, W. H. et al., "Thermal Expansion of Fluid Saturated Rocks Under Stress", SPWLA Twenty-Second Annual Logging Symposium, Jun. 1981, pp. 1-8.

Sousa, L. M. O. et al., "Influence of Microfractures and Porosity on the Physico-Mechanical Properties and Weathering of Ornamental Granites", *Engineering Geology*, vol. 77, 2005, pp. 153-168.

Stowell, J. F. W., "Characterization of Opening-Mode Fracture Systems in the Austin Chalk", *Gulf Coast Association of Geological Societies Transactions*, vol. L1 , 2001, pp. 313-320.

Straka, W. A. et al., "Cavitation Inception in Quiescent and Co-Flow Nozzle Jets", 9th International Conference on Hydrodynamics, Oct. 2010, pp. 813-819.

Suarez, M. G. et al., "COMSOL in a New Tensorial Formulation of Non-Isothermal Poroelasticity", publisher unknown, while the date of the publication is unknown, it is believed to be prior to Aug. 19, 2009,2 pages.

Summers, D. A., "Water Jet Cutting Related to Jet & Rock Properties", publisher unknown, while the date of the publication is unknown, it is believed to be prior to Aug. 19, 2009, 13 pages.

Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.

Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.

Tao, Q. et al., "A Chemo-Poro-Thermoelastic Model for Stress/Pore Pressure Analysis around a Wellbore in Shale", a paper prepared for presentation at the US Symposium on Rock Mechanics (USRMS): *Rock Mechanics for Energy*, Mineral and Infrastructure Development in the Northern Regions, Jun. 2005, 7 pages.

Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.

Terzopoulos, D. et al., "Modeling Inelastic Deformation: Viscoelasticity, Plasticity, Fracture", SIGGRAPH '88, Aug. 1988, pp. 269-278.

Thomas, R. P., "Heat Flow Mapping at the Geysers Geothermal Field", published by the California Department of Conservation Division of Oil and Gas, 1986, 56 pages.

Thompson, G. D., "Effects of Formation Compressive Strength on Perforator Performance", a paper presented of the Southern District API Division of Production, Mar. 1962, pp. 191-197.

Tovo, R. et al., "Fatigue Damage Evaluation on Mechanical Components Under Multiaxial Loadings", excerpt from the Proceedings of the COMSOL Conference, 2009, 8 pages.

Tuler, F. R. et al., "A Criterion for the Time Dependence of Dynamic Fracture", "The International Journal of Fracture Mechanics", vol. 4, No. 4, Dec. 1968, pp. 431-437.

Turner, D. et al., "New DC Motor for Downhole Drilling and Pumping Applications", a paper prepared for presentation at the SPE/ICoTA Coiled Tubing Roundtable, Mar. 2001, pp. 1-7.

Turner, D. R. et al., "The All Electric BHA: Recent Developments Toward an intelligent Coiled-Tubing Drilling System", a paper prepared for presentation at the 1999 SPE/ICoTA Coiled Tubing Roundtable. May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

Udd, E. et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., "Stress-Strain Relationship for Empirical Equations of Creep in Rocks", *Engineering Geology*, Mar. 29, 1971, 5 pages.

Wagh, A. S. et al., "Dependence of Ceramic Fracture Properties on Porosity", *Journal of Material Sience*, vol. 28, 1993, pp. 3589-3593.

Wagner, F. et al., "The Laser Microjet Technology—10 Years of Development (M401)", publisher unknown, while the date of the publication is unknown, it is believed to be prior to Aug. 19, 2009, 9 pages.

Waldron, K. et al., "The Microstructures of Perthitic Alkali Feldspars Revealed by Hydroflouric Acid Etching", *Contributions to Mineralogy and Petrology*, vol. 116, 1994, pp. 360-364.

Walker, B. H. et al., "Roller-Bit Penetration Rate Response as a Function of Rock Properties and Well Depth", A paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", Journal of Chemical Physics, vol. 116, No. 4, Jan. 22, 2002, pp. 154-161.

Wandera, C. et al., "Laser Power Requirement for Cutting of Thick-Section Steel and Effects of Processing Parameters on Mild Steel Gut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainiess Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", Computational Materials Science, vol. 43, 2008, pp. 892-901.

(56) References Cited

OTHER PUBLICATIONS

Waples, D. W. et al., "A Review and Evaluation of Specific Heat Capacities of Rocks, Minerals, and Subsurface Fluids. Part 1: Minerals and Nonporous Rocks", Natural Resources Research, vol. 13. No. 2, Jun. 2004, pp. 97-122.

Waples, D. W. et al., "A Review and Evaluation of Specific Heat Capacities of Rocks, Minerals, and Subsurface Fluids. Part 2: Fluids and Porous Rocks", Natural Resources Research, vol. 13 No. 2, Jun. 2004, pp. 123-130.

Warren, T. M. et al., "Laboratory Drilling Performance of PDC Bits", SPE Drilling Engineering, Jun. 1988, pp. 125-135.

White, E. J. et al., "Reservoir Rock Characteristics of the Madison Limestone in the Williston Basin", The Log Analyst, Sep.-Oct. 1970, pp. 17-25.

White, E. J. et al., "Rock Matrix Properties of the Ratcliffe Interval (Madison Limestone) Flat Lake Field, Montana", SPE of AIME, Jun. 1968, 16 pages.

Wilkinson, M. A. et al., "Experimental Measurement of Surface Temperatures During Flame-Jet Induced Thermal Spallation", Rock Mechanics and Rock Engineering, 1993, pp. 29-62.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of The Industrial Physicist at: http://www.aip.org/tip/INPHFA/vol-9/iss-3/p24.html, on May 18, 2010, pp. 1-5.

Wu, X. Y. et al., "The Effects of Thermal Softening and Heat Conductin on the Dynamic Growth of Voids", International Journal of Solids and Structures, vol. 40, 2003, pp. 4461-4478.

Xiao, J. Q. et al., "Inverted S-Shaped Model for Nonlinear Fatigue Damage of Rock", International Journal of Rock Mechanics & Mining Sciences, vol. 46, 2009, pp. 643-648.

Xu, Z. et al., "Application of High Powered Lasers to Perforated Completions", International Congress on Applications of Laser & Electro-Optics, Oct. 2003, 6 pages.

Xu, Z. et al., "Laser Rock Drilling by a Super-Pulsed CO2 Laser Beam", a manuscript created for the US Department of Energy, while the date of the publication is unknown, it is believed to be prior to Aug. 19, 2009, 9 pages.

Xu, Z. et al., "Laser Spallation of Rocks for Oil Well Drilling", Proceedings of the 23rd International Congress on Appiications of Lasers and Electro-Optics, 2004, pp. 1-6.

Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.

Xu, Z. et al., "Rock Perforation by Pulsed Nd: YAG Laser", Proceedings of the 23rd International Congress on Applications of Lasers and Electro-Optics 2004, 2004, 5 pages.

Xu, Z. et al., "Specific Energy for Pulsed Laser Rock Drilling", Journal of Laser Applications, vol. 15, No. 1, Feb. 2003, pp. 25-30.

Yabe, T. et al., "The Constrained Interpolation Profile Method for Multiphase Analysis", Journal of Computational Physics, vol. 169, 2001, pp. 556-593.

Yamamoto, K. Y. et al., "Detection of Metals in the Environment Using a Portable Laser-Induced Breakdown Spectroscopy Instrument", Applied Spectroscopy, vol. 50, No. 2, 1996, pp. 222-233.

Yamashita, Y. et al., "Underwater Laser Welding by 4kW CW YAG Laser", Journal of Nuclear Science and Technology, vol. 38, No. 10, Oct. 2001, pp. 891-895.

Yasar, E. et al., "Determination of the Thermal Conductivity from Physico-Mechanical Properties", Bull Eng. Geol. Environ., vol. 67, 2008, pp. 219-225.

York, J. L. et al., "The Influence of Flashing and Cavitation on Spray Formation", a progress report for UMRI Project 2815 with Delavan Manufacturing Company, Oct. 1959, 27 pages.

Zamora, M. et al., "An Empirical Relationship Between Thermal Conductivity and Elastic Wave Velocities in Sandstone", Geophysical Research Letters, vol. 20, No. 16, Aug. 20, 1993, pp. 1679-1682.

Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): Rock Mechanics Across Borders and Disciplines, Jun. 2004, 9 pages.

Zehnder, A. T., "Lecture Notes on Fracture Mechanics", 2007, 227 pages.

Zeuch, D. H. et al., "Rock Breakage Mechanisms With a PDC Cutter", a paper prepared presentation at the 60th Annual Technical Conference and Exhibition of the Society of Petroleum Engineers, Sep. 1985, 12 pages.

Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.

Zheleznov, D. S. et al., "Faraday Rotators With Short Magneto-Optical Eiements for 50-kW Laser Power", IEEE Journal of Quantum Electronics, vol. 43, No. 6, Jun. 2007, pp. 451-457.

Zhou, T. et al., "Analysis of Stimulated Briilouin Scattering in Multi-Mode Fiber by Numerical Solution", Journal of Zhejiang University of Science, vol. 4 No. 3, May-Jun. 2003, pp. 254-257.

Zhu, X, et al., "High-Power ZBLAN Glass Fiber Lasers: Review and Prospect", Advance in OptoElectronics, vol. 2010, pp. 1-23.

Zietz, J. et al., "Determinants of House Prices: A Quantile Regression Approach", Department of Economics and Finance Working Paper Series, May 2007, 27 pages.

Zuckerman, N. et al., "Jet Impingement Heat Transfer: Physics, Correlations, and Numerical Modeling", Advances in Heat Transfer, vol. 39, 2006, pp. 565-631.

Aptukov, V. N., "Two Stages of Spallation", publisher unknown, while the date of the publication is unknown, it is believed to be prior to Aug. 19, 2009, 6 pages.

Author known, "Heat Capacity Analysis", published by Bechtel SAIC Company LLC, a report prepared for US Department of Energy, Nov. 2004, 100 pages.

Author unknown, "Chapter 7: Energy Conversion Systems—Options and Issues", publisher ubknown, while the date of the publication is unknown, it is believed to be prior to Aug. 19, 2009, pp. 7-1 to 7-32 and table of contents page.

Author unknown , "Chapter I—Laser-Assisted Rock-Cutting Tests", publisher unknown, while the date of the publication is unknown, it is believed to be prior to Aug. 19, 2009, 64 pages.

Author unknown, "Cross Process Innovations", Obtained from the Internat at: http://www.md.columbia.edu/ntm/CrossProcess/CrossProcessSect5.htm, on Feb. 2, 2010, 11 pages.

Author unknown, "Fourier Series, Generalized Functions, Laplace Transform", publisher unknown, while the date of the publication is unknown, it is believed to be prior to Aug. 19, 2009, 6 pages.

Author unknown, "Silicone Fluids: Stable, Inert Media", published by Gelest, Inc., while the date of the publication is unknown, it is believed to be prior to Aug. 19, 2009, 27 pages.

Author unknown, "Introduction to Optical Liquids", Cargille-Sacher Laboratories Inc., Obtained from the Internet at: http://www.cargille.com/opticalintro.shtml, on Dec. 23, 2008, 5 pages.

Author unknown, "Laser Drilling", Oil & Natural Gas Projects (Exploration & Production Technologies) Technical Paper, Dept. of Energy, Jul. 2007, 3 pages.

Author unknown, "Leaders in Industry Luncheon", IPAA & TIPRO, Jul. 8, 2009, 19 pages.

Author unknown, "Measurement and Control of Abrasive Water-Jet Velocity", publisher unknown, while the date of the publication is unknown, it is believed to be prior to Aug. 19, 2009, 8 pages.

Author unknown, "Nonhomogeneous PDE—Heat Equation with a Forcing Term", a lecture, 2010, 6 pages.

Author unknown, "Performance Indicators for Geothermal Power Plants", prepared by International Geothermal Association for World Energy Council Working Group on Performance of Renewable Energy Plants, author unknown, Mar. 2011, 7 pages.

(56) References Cited

OTHER PUBLICATIONS

Author unknown, "Rock Mechanics and Rock Engineering", publisher unknown, while the date of the publication is unknown, it is believed to be prior to Aug. 19, 2009, 69 pages.
Author unknown, "Shock Tube Solved With Cosmol Multiphysics 3.5a", published by Comsol Multiphysics, 2008, 5 pages.
Author unknown, "Stimulated Brillouin Scattering (SBS) in Optical Fibers", published by Centro de Pesquisa em Optica e Fotonica, Obtained from the Internet at: http://cepof.ifi.unicamp.br/index.php . . . ), on Jun. 25, 2012, 2 pages.
Author unknown, "Underwater Laser Cutting", published by TWI Ltd, May/Jun. 2011, 2 pages.
Related utility application assigned U.S. Appl. No. 13/486,795, filed Jun. 1, 2012, 166 pages.
Related utility application assigned U.S. Appl. No. 13/565,345, filed Aug. 2, 2012, 112 pages.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 6, 1852, pp. 1571-1596.
Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using Porous Lubricated Nozzles", *Transactions of the ASME*, vol. 125, Jan. 2003, pp. 168-181.
Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Antonucci, V. et al., "Numerical and Experimental Study of a Concentrated Indentation Force on Polymer Matrix Composites", an excerpt from the *Proceedings of the COMSOL Conference*, 2009, 4 pages.
Author unknown, "Standard Test Method for Thermal Conductivity of Solids by Means of the Guarded-Comparative-Longitudinal Heat flow Technique, Standard under the fixed Designation E1225-09, ", published by ASTM International, 2009, pp. 1-9.
Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.
Avar, B. B. et al., "Porosity Dependence of the Elastic Modulus of Lithophysae-rich Tuff: Numerical and Experimental Investigations", *International Journal of Rock Mechanics & Mining Sciences*, vol. 40, 2003, pp. 919-928.

Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Baek, S.Y. et al., "Simulation of the Coupled Thermal/Optical Effects for Liquid Immersion Micro-/Nanolithography", source unknown, believed to be publically available prior to 2012, 13 pages.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Baird, J. A. et al., "Analyzing the Dynamic Behavior of Downhole Equipment During Drilling", US government Sandia Report, SAND-84-0758C, DE84 008840, believed to be publically available prior to Jul. 2010, 7 pages.
Batarseh, S. I. et al, "Innovation in Wellbore Perforation Using High-Power Laser", *International Petroleum Technology Conference*, IPTC No. 10981. Nov. 2005, 7 pages.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Baykasoglu, A. et al., "Prediction of Compressive and Tensile Strength of Limestone via Genetic Programming", *Expert Systems with Applications*, vol. 35, 2008, pp. 111-123.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of Porous Building Stones", *Eur. J. Mineral*, vol. 20, Aug. 2008, pp. 673-685.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal—Hydrological Conditions in Heated Fractured Rock", an origial research paper published online http://vzy.scjournals.org/cgi/content/full/5/2/657, May 26, 2006, 27 pages.
Blackwell, D. D. et al., "Geothermal Resources in Sedimentary Basins", a presentation for the Geothermal Energy Generation in Oil and Gas Settings, Mar. 13, 2006, 28 pages.
Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.
Blomqvist, M. et al., "All-in-Quartz Optics for Low Focal Shifts", *SPIE Photonics West Conference in San Francisco*, Jan. 2011, 12 pages.
Boechat, A. A. P. et al., "Bend Loss in Large Core Multimode Optical Fiber Beam Delivery Systems", *Applied Optics.*, vol. 30 No. 3. Jan. 20, 1991, pp. 321-327.
Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.
Brown, G., "Development, Testing and Track Record of Fiber-Optic, Wet-Mate, Connectors", *IEEE*, 2003, pp. 83-88.
Brujan, E. A. et al., "Dynamics of Laser-Induced Cavitation Bubbles Near an Elastic Bounder", *J. Fluid Mech.*, vol. 433, 2001, pp. 251-281.
Burdine, N. T., "Rock Failure Under Dynamic Loading Conditions", Society of Petroleum Engineers Journal, Mar. 1963, pp. 1-8.
Bybee, K., "Modeling Laser-Spallation Rock Drilling", *JPT*, an SPE available at www.spe.org/jpt. Feb. 2006, 2 pp. 62-63.

(56) References Cited

OTHER PUBLICATIONS

Bybee, Karen, highlight of "Drilling a Hole in Granite Submerged in Water by Use of CO2 Laser", an SPE available at www.spe.org/jpt, *JPT*, Feb. 2010, pp. 48, 50 and 51.

Cai, W. et al., "Strength of Glass from Hertzian Line Contact", *Optomechanics 2011: Innovations and Solutions*, 2011, 5 pages.

Capetta, I. S. et al., "Fatigue Damage Evaluation on Mechanical Components Under Multiaxial Loadings", European Comsol Conference, University of Ferrara, Oct. 16, 2009, 25 pages.

Carstens, J. P. et al., "Rock Cutting by Laser", a paper of *Society of Petroleum Engineers of AIME*, 1971, 11 pages.

Caruso, C. et al., "Dynamic Crack Propagation in Fiber Reinforced Composites", Excerpt from the Proceedings of the COMSOL Conference, 2009, 5 pages.

Chastain, T. et al., "Deepwater Drilling Riser System", *SPE Drilling Engineering*, Aug. 1986, pp. 325-328.

Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-ideal Conditions", source unknown, Jan. 7, 2010, pp. 1-18.

Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Cimetiere, A. et al., "A Damage Model for Concrete Beams in Compression", *Mechanics Research Communications*, vol. 34, 2007, pp. 91-96.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Cohen, J. H., "High-Power Slim-Hole Drilling System", a paper presented at the conference entitled Natural Gas RD&D Contractor's Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Corey, P. S. et al., "Measurements on 5:1 Scale Abrasive Water Jet Cutting Head Models", source unknown, available prior to 2012, 15 pages.

Cruden, D. M. "The Static Fatigue of Brittle Rock Under Uniaxial Compression", *Int. J. Rock Mech. Min. Sci. & Geomech. Abstr.*, vol. 11, 1974, pp. 67-73.

da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dahl, F. et al., "Development of a New Direct Test Method for Estimating Cutter Life, Based on the Sievers' J Miniature Drill Test", *Tunnelling and Underground Space Technology*, vol. 22, 2007 pp. 106-116.

de Castro Lima, J. J. et al., "Linear Thermal Expansion of Granitic Rocks: Influence of Apparent Porosity, Grain Size and Quartz Content", *Bull Eng Geol Env.*, vol. 63, 2004, pp. 215-220.

Degallaix, J. et al., "Simulation of Bulk-Absorption Thermal Lensing in Transmissive Optics of Gravitational Waves Detector", *Appl. Phys.*, B77, 2003, pp. 409-414.

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 106-134.

Dole, L. et al., "Cost-Effective Cementitious Material Compatible with Yucca Mountain Repository Geochemistry", a paper prepared by Oak Ridge National Laboratory for the US Department of Energy, No. ORNL/TM-2004/296. Dec. 2004, 128 pages.

Dumans, C. F. F. et al., "PDC Bit Selection Method Through the Analysis of Past Bit Performances", a paper prepared for presentation at the SPE (Society of Petroleum Engineers—Latin American Petroleum Engineering Conference), Oct. 1890, pp. 1-6.

Dutton, S. P. et al., "Evolution of Porosity and Permeability in the Lower Cretaceous Travis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-886.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Ersoy, A., "Wear Characteristics of PDC Pin and Hybrid Core Bits in Rock Drilling", *Wear*, vol. 188, 1995, pp. 150-166.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-536.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Fertl, W. H, et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Finger, J. T. et al., "PDC Bit Research at Sandia National Laboratories", Sandia Report No. SAND89-0079-UC-253, a report prepared for US Department of Energy, Jun. 1989, 88 pages.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Excavation Engineering Associates, Inc. for the US Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

(56) References Cited

OTHER PUBLICATIONS

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, B. C. et al., "Laser Drilling: Drilling with the Power of Light, Phase 1: Feasibility Study", a Topical Report by the Gas Technology Institute, for the US Government under Cooperative Agreement No. DE-FC26-00NT40917, Sep. 30, 2001, 107 pages.

Gale, J. F. W. et al., "Natural Fractures in the Barnett Shale and Their Importance for Hydraulic Fracture Treatments", The American Association of Petroleum Geologists, *AAPG Bulletin*, vol. 91, No. 4, Apr. 2007, pp. 603-622.

Gardner, R. D. et al., "Fluorescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Gonthier, F. "High-power All-Fiber® components: The missing link for high power fiber lasers", source unknown, believed to be publically available prior to Jul. 2010, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, believed to be publically available prior to Jul. 2010, 13 pages.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998. 761-770.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "Inhomogeneous Boundary Value Problems", a lecture for Math 124B, Jan. 26, 2010, pp. 1-5.

Grigoryan, V., "Separation of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Gurarie, V. N., "Stress Resistance Parameters of Brittle Solids Under Laser/Plasma Pulse Heating", *Materials Science and Engineering*, vol. A288, 2000, pp. 168-172.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.

Hancock, M. J., "The 1-D Heat Equation: 18.303 Linear Partial Differential Equations", source unknown, 2004, pp. 1-41.

Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.

Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Hood, M., "Waterjet-Assisted Rock Cutting Systems—The Present State of the Art", *International Journal of Mining Engineering*, vol. 3, 1985, pp. 91-111.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the 10th American Waterjet Confeence in Houston, Texas, 1999, 25 pages.

Hu, H. et al., "Simultaneous Velocity and Concentration Measurements of a Turbulent Jet Mixing Flow", *Ann. N.Y. Acad. Sci.*, vol. 972, 2002, pp. 254-259.

Huang, C. et al., "A Dynamic Damage Growth Model for Uniaxial Compressive Response of Rock Aggregates", *Mechanics of Materials*, vol. 34, 2002, pp. 267-277.

Huang, H. et al., "Intrinsic Length Scales in Tool-Rock Interaction", *International Journal of Geomechanics*, Jan./Feb. 2008, pp. 39-44.

Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.

Hutchinson, J. W., "Mixed Mode Cracking in Layered Materials", *Advances in Applied Mechanics*, vol. 29, 1992, pp. 63-191.

Imbt, W. C. et al., "Porosity in Limestone and Dolomite Petroleum Reservoirs", paper presented at the Mid Continent District, Division of Production: Oklahoma City: Oklahoma, Jun. 1946, pp. 364-372.

Jackson, M. K. et al., "Nozzle Design for Coherent Water Jet Production", source unknown, believed to be published prior to 2012, pp. 53-89.

Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.

Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.

Jen, C. K. et al., "Leaky Modes in Weakly Guiding Fiber Acoustic Waveguides", *IEEE Transactions on Ultrasonic Ferroolectrics and Frequency Control*, vol. UFFC-33 No. 6, Nov. 1986, pp. 634-643.

Judzis, A. et al., "Investigation of Smaller Footprint Drilling System; Ultra-High Rotary Speed Diamond Drilling Has Potential for Reduced Energy Requirements", IADC/SPE No. 99020: believed to be publically available prior to Jul. 2010, 33 pages.

Jurewicz, B. R., "Rock Excavation with Laser Assistance", *Int. J. Rock Mech. Min. Sci. & Geomech. Abstr.*, vol. 13, 1976, pp. 207-219.

(56) References Cited

OTHER PUBLICATIONS

Karakas, M., "Semianalytical Productivity Models for Perforated Completions", *SPE*, No. 18247, a paper for SPE (Society of Petroleum Engineers) Production Engineering, Feb. 1991, 73-82.
Karasawa, H. et al., "Development of PDC Bits for Downhole Motors", *Proceedings 17th NZ Geothermal Workshop*, 1995 , pp. 145-150.
Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.
Khandelwal, M., "Prediction of Thermal Conductivity Rocks by Soft Computing", *Int. J. Earth Sci. (Geol. Rundsch)*, May 11, 2010, 7 pages.
Kim, C. B. et al., "Measurement of the Refractive Index of Liquids at 1,3 and 1.5 Micron Using a Fibre Optic Fresnel Ratio Meter", *Meas. Sci. Technol.*, vol. 5, 2004, pp. 1683-1686.
Kiwata, T. et al., "Flow Visualization and Characteristics of a Coaxial Jet with a Tabbed Annular Nozzle", *JSME International Journal Series B*, vol. 49, No. 4, 2006, pp. 906-913.
Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.
Kobyakov, A. et al., "Design Concept for Optical Fibers with Enhanced SBS Threshold", *Optics Express*, vol. 13, No. 14, Jul. 11, 2005, pp. 5338-5346.
Kolari, K., "Damage Mechanics Model for Brittle Failure of Transversely Isotropic Solids (Finite Element Implementation)", *VTT Publications 628*, 2007, 210 pages.
Kollé, J. J., "A Comparison of Water Jet, Abrasive Jet and Rotary Diamond Drilling in Hard Rock", *Tempress Technologies Inc.*, 1999, pp. 1-8.
Kolle, J. J., "HydroPulse Drilling", a Final Report for US Department of Energy under Cooperative Development Agreement No. DE-FC26-FT34367, Apr. 2004, 28 pages.
Kovalev, V. I. et al., "Observation of Hole Burning in Spectrum in SBS in Optical Fibres Under CW Monochromatic Laser Excitation", *IEEE*, Jun. 3, 2010, pp. 56-57.
Koyamada, Y. et al., "Simulating and Designing Brillouin Gain Spectrum in Single-Mode Fibers", *Journal of Lightwave Technology*, vol. 22, No. 2, Feb. 2004, pp. 631-639.
Krajcinovic, D. et al., "A Micromechanical Damage Model for Concrete", *Engineering Fracture Mechanics*, vol. 25, No. 5/6, 1986, pp. 585-596.
Kranz, R. L., "Microcracks in Rocks: A Review", *Tectonophysics*, vol. 100, 1983, pp. 449-480.
U.S. Appl. No. 12/543,986, filed Aug. 19, 2013, Moxley et al.
U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,615, filed Feb. 23, 2012, Grubb et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,509, filed Feb. 23, 2012, Fraze et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
International Search Report and Written Opinion for PCT App. No. PCT/US10/24368, dated Nov. 2, 2010, 16 pgs.
International Search Report for PCT Application No. PCT/US09/54295, dated Apr. 26, 2010, 16 pgs.
International Search Report for PCT Application No. PCT/US2011/044548, dated Jan. 24, 2012, 17 pgs.
International Search Report or PCT Application No. PCT/US2011/047902, dated Jan. 17, 2012, 9 pgs.
International Search Report or PCT Application No. PCT/US2011/044548, dated Jan. 24, 2012, 17 pgs.
International Search Report for PCT Application No. PCT/US2011/050044 dated Feb. 1, 2012, 26 pgs.
International Search Report for PCT Application No. PCT/US2012/026265, dated May 30, 2012, 14 pgs.
International Search Report for PCT Application No. PCT/US20121/026526, dated May 31, 2012, 10 pgs.
International Search Report for PCT Application No. PCT/US2012/026494, dated May 31, 2012, 12 pgs.
International Search Report for PCT Application No. PCT/US2012/049338, dated Jan. 22, 2013, 14 pgs.
Agrawal Dinesh et al., "Microstructural by TEM of WC/Co composites Prepared by Conventional and Microwave Processes", Materials Research Lab, The Pennsylvania State University, *15th International Plansee Seminar*, vol. 2, , 2001, pp. 677-684.
Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.
Agrawal Dinesh et al., Report on "Graded Steele-Tungsten Cardide/Cobalt-Diamond Systems Using Microwave Heating", Material Research Institute, Penn State University, *Proceedings of the 2002 International Conference on Functionally Graded Materials*, 2002, pp. 50-58.
Agrawal, Govind P., "Nonlinear Fiber Optics", Chap. 9, Fourth Edition, Academic Press copyright 2007, pp. 334-337.
Ai, H.A. et al., "Simulation of dynamic response of granite: A numerical approach of shock-induced damage beneath impact craters", *International Journal of Impact Engineering*, vol. 33, 2006, pp. 1-10.
Albertson, M. L. et al., "Diffusion of Submerged Jets", a paper for the *American Society of Civil Engineers*, Nov. 5, 1852, pp. 1571-1596.
Al-Harthi, A. A. et al., "The Porosity and Engineering Properties of Vesicular Basalt in Saudi Arabia", *Engineering Geology*, vol. 64, 1999, pp. 313-320.
Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.
Anton, Richard J. et al., "Dynamic Vickers indentation of brittle materials", *Wear*, vol. 239, 2000, pp. 27-35.
Ashby, M. F. et al., "The Failure of Brittle Solids Containing Small Cracks Under Compressive Stress States". *Acta Metall.*, vol. 34, No. 3,1986, pp. 497-510.
ASTM International, "Standard Test Method for Thermal Conductivity of Solids by Means of the Guarded-Comparative-Longitudinal Heat Flow Technique", Standard under the fixed Designation E1225-09: 2009, pp. 1-9.
Avar, B. B. et al., "Porosity Dependence of the Elastic Modulof Lithophysae-rich Tuff: Numerical and Experimental Investigations", *International Journal of Rock Mechanics & Mining Sciences*, vol. 40, 2003, pp. 919-928.
Aydin, A. et al., "The Schmidt hammer in rock material characterization", *Engineering Geology*, vol. 81, 2005, pp. 1-14.

(56) References Cited

OTHER PUBLICATIONS

Backers, T. et al., "Tensile Fracture Propagation and Acoustic Emission Activity in Sandstone: The Effects of Loading Rate", *International Journal of Rock Mechanics & Mining Sciences*, vol. 42, 2005, pp. 1094-1101.
Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.
Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.
Baird, J. A. "GEODYN: A Geological Formation/Drillstring Dynamics Computer Program", *Society of Petroleum Engineers of AIME*, 1964, 9 pgs.
Baird, J. A. et al., "Analyzing the Dynamic Behavior of Downhole Equipment During Drilling", government Sandia Report, SAND-84-0758C, DE84 008840, 7 pages.
Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.
Batarseh, S. I. et al, "Innovation in Wellbore Perforation Using High-Power Laser", *International Petroleum Technology Conference*, IPTC No. 10981, Nov. 2005, 7 pages.
Batarseh, S. et al. "Well Perforation Using High-Power Lasers", *Society of Petroleum Engineers*, SPE 84418, 2003, pp. 1-10.
BDM Corporation, Geothermal Completion Technology Life-Cycle Cost Model (GEOCOM), *Sandia National Laboratories*, for the U.S. Dept. of Energy, vols. 1 and 2, 1982, 222 pgs.
Bechtel SAIC Company LLC, "Heat Capacity Analysis", a report prepared for Department of Energy, Nov. 2004, 100 pages.
Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.
Beste, U. et al., "Micro-scratch evaluation of rock types—a means to comprehend rock drill wear", *Tribology International*, vol. 37, 2004, pp. 203-210.
Bieniawski, Z. T., "Mechanism of Brittle Fracture of Rock: Part I—Theory of the Fracture Process", *Int. J. Rock Mech. Min, Sci.*, vol. 4, 1967: pp. 395-406.
Birkholzer, J. T. et al., "The Impact of Fracture—Matrix Interaction on Thermal-Hydrological Conditions in Heated Fractured Rock", an origial research paper published online http://vzy.scijournals.org/cgi/content/full/5/657, May 26, 2006, 27 pages.
Blackwell, B. F., "Temperature Profile in Semi-infinite Body With Exponential Source and Convective Boundary Condition", *Journal of Heat Transfer, Transactions of the ASME*, vol. 112, 1990, pp. 567-571.
Boechat, A. A. P. et al., "Bend Loss in Large Core Muitimode Optical Fiber Beam Delivery Systems", *Applied Optics.*, vol. 30 No. 3, Jan. 20, 1991, pp. 321-327.
Britz, Dieter, "Digital Simulation in Electrochemistry", *Lect. Notes Phys.*, vol. 666, 2005, pp. 103-117.
Browning, J. A. et al., "Recent Advances in Flame Jet Working of Minerals", *7th Symposium on Rock Mechanics*, Pennsylvania State Univ., 1965, pp. 281-313.
Brujan, E. A. et al., "Dynamics of Laser-Induced Cavitation Bubbles Near an Elastic Boundar", *J. Fluid Mech.*, vol. 433, 2001, pp. 251-281.
Bybee, K., "Modeling Laser-Spallation Rock Drilling", *JPT*, an SPE available at www.spe.org/jpt, Feb. 2006, 2 pp. 62-63.
Bybee, Karen, highlight of "Drilling a Hole in Granite Submerged in Water by Use of CO2 Laser", an SPE available at www.spe.org/jpt, *JPT*, Feb. 2010, pp. 48, 50 and 51.
Cardenas, R., "Protected Polycrystalline Diamond Compact Bits for Hard Rock Drilling", Report No. DOE-99049-1381, *U.S. Department of Energy*, 2000, pp. 1-79.
Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.
Chen. K., paper titled "Analysis of Oil Film Interferometry Implementation in Non-Ideal Conditions", source unknown, Jan. 7, 2010, pp. 1-18.
Cimetiere, A. et al., "A Damage Model for Concrete Beams in Compression", *Mechanics Research Communications*, vol. 34, 2007. pp. 91-96.
Clegg, John et al., "Improved Optimisation of Bit Selection Using Mathematically Modelled Bit-Performance Indices", *IADC/SPE International 102287*, 2006, pp. 1-10.
Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.
Close, F. et al., "Successful Drilling of Basalt in a West of Shetland Deepwater Discovery", *SPE International 90575*, Society of Petroleum Engineers, 2006, pp. 1-10.
Cobern, Martin E., "Downhole Vibration Monitoring & Control System Quarterly Technical Report #1", *APS Technology, Inc.*, Quarterly Technical Report #1, DVMCS, 2003, pp. 1-15.
Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.
Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.
Coray, P. S. et al., "Measurements on 5:1 Scale Abrasive Water Jet Cutting Head Models", source unknown, available prior to 2012, 15 pages.
Cruden. D. M., "The Static Fatigue of Brittle Rock Under Uniaxial Compression", *Int. J. Rock Mech. Min. Sci. & Geomech. Abstr.*, vol. 11, 1974, pp. 67-73.
Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.
Dahl, Filip et al., "Development of a new direct test method for estimating cutter life, based on the Sievers J miniature drill test", *Tunnelling and Underground Space Technology*, vol. 22, 2007, pp. 106-116.
Damzen, M. J. et al., "Stimulated Brillion Scattering", Chapter 8—SBS in Optical Fibres, OP Publishing Ltd, Published by Institute of Physics, London, England, 2003, pp. 137-153.
Das, A. C. et al., "Acousto-ultrasonic study of thermal shock damage in castable refractory", *Journal of Materials Science Letters*, vol. 10, 1991, pp. 173-175.
de Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.
De Guire, Mark R., "Thermal Expansion Coefficient (start)", *EMSE 201—Introduction to Materials Science & Engineering*, 2003, pp. 15.1-15.15.
Diamond-Cutter Drill Bits, by Geothermal Energy Program, Office of Geothermal and Wind Technologies, 2000, 2 pgs.
Dimotakis: P. E. et al., "Flow Structure and Optical Beam Propagation in High-Reynolds-Number Gas-Phase Shear Layers and Jets", *J. Fluid Mech.*, vol. 433, 2001, pp. 105-134.
Dinçer, Ismail et al., "Correlation between Schmidt hardness, uniaxiai compressive strength and Young's modulfor andesites, basalts and tuffs", *Bull Eng Gaol Env.* vol. 63, 2004, pp. 141-148.
Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.
Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

(56) References Cited

OTHER PUBLICATIONS

Dunn, James C., "Geothermal Technology Development at Sandia", *Geothermal Research Division, Sandia National Laboratories*, 1987, pp. 1-6.

Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.

Eichler, H.J. et al., "Stimulated Brillouin Scattering in Multimode Fibers for Optical Phase Conjugation", *Optics Communications*, vol. 208, 2002, pp. 427-431.

Eighmy, T. T. et al., "Microfracture Surface Charaterizations: Implications for In Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", Mechanical Engineering Dept., *University of Southwestern Louisiana and Sandia National Laboratories*, 2000, pp. 1-10.

Ersoy, A., "Wear Characteristics of PDC Pin and Hybrid Core Bits in Rock Drilling", *Wear*, vol. 188, 1995, pp. 150-165.

Extreme Coil Drilling, by Extreme Drilling Corporation, 2009, 10 pgs.

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Ferro, D. et al., "Vickers and Knoop hardness of electron beam deposited ZrC and HfC thin films on titanium", *Surface & Coatings Technology*, vol. 200, 2006, pp. 4701-4707.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, J. T. et al., "PDC Bit Research at Sandia National Laboratories", Sandia Report No. SAND89-0079-UC-253, a report prepared for Department of Energy, Jun. 1989, 88 pages.

Finger, John T. et al., "PDC Bit Research at Sandia National Laboratories", Sandia Report, *Geothermal Research Division 6252 Sandia National Laboratories*, SAND89-0879-UC-253, 1989, 1-88.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C. et al., "Laser Drilling: Determination of Energy Required to Remove Rock". *Society of Petroleum Engineers International*, SPE 71466, 2001, pp. 1-11.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", Society of Petroleum Engineers, SPE 97093, 2005, pp. 1-7.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Gale, J. F. W. et al., "Natural Fractures in the Barnett Shale and Their Importance for Hydraulic Fracture Treatments", The American Asosction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-ievel (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/ISPE Drilling Conference, Feb. 2006, pp. 1-9.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "Design Considerations for a Hard-Rock PDC Drill Bit", *Geothermal Technology Development Division 6241 Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A., "The Use of Single-Cutter Data in the Analysis of PDC Bit Designs", *61st Annual Technical Conference and Exhibition of Society of Petroleum Engineers*, 1986, pp. 1-37.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002. pp. 1-8.

Graves, R. M. et al., "Spectral signatures and optic coeffecients of surface and reservoir rocks at COIL, CO2 and Nd:YAG laser wavelenghts", source unknown, 13 pages.

Graves, R. M. et al., "StarWars Laser Technology Applied to Drilling and Completing Gas Wells", *SPE*, No. 49259, a paper prepared for presentation at the 1898 SPE Annual Technical Conference and Exhibition, 1998, pp. 761-770.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 12, 2009, pp. 1-3.

Habib, P. et al., "The Influence of Residual Stresses on Rock Hardness", *Rock Mechanics*, vol. 6, 1974, pp. 15-24.

Hall, K. et al., "Rock Albedo and Monitoring of Thermal Conditions in Respect of Weathering: Some Expected and Some Unexpected Results", *Earth Surface Processes and Landforms*. vol. 30, 2005, pp. 801-811.

Hall, Kevin, "The role of thermal stress fatigue in the breakdown of rock in cold regions", *Geomorphology*, vol. 31. 1999, pp. 47-63.

Han, Wei, "Computational and experimental investigations of laser drilling and welding for microelectronic packaging", *Dorchester Polytechnic Institute*, A Dissertation submitted in May 2004, 242 pgs.

Hareland, G. et al., "Cutting Efficiency of a Single PDC Cutter on Hard Rock", *Journal of Canadian Petroleum Technology*, vol. 48, No. 6, 2009, pp. 1-6.

Healy, Thomas E., "Fatigue Crack Growth in Lithium Hydride", *Lawrence Livermore National Laboratory*, 1993, pp. 1-32.

Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998, pp. 3-15.

Hibbs, Louis E. et al., "Wear Mechanisms for Polycrystalline-Diamond Compacts as Utilized fro Drilling in Geothermal Environments", *Sandia National Laboratories*, for the United States Government, Report No. SAND-82/7213, 1983, 287 pgs.

(56) References Cited

OTHER PUBLICATIONS

Hoek, E., "Fracture of Anisotropic Rock", *Journal of the African Institute of Mining and Metallurgy*, vol. 64, No. 10, 1964, pp. 501-523.
Hoover, Ed R. et al., "Failure Mechanisms of Polycrystalline-Diamond Compact Drili Bits in Geothermal Environments", Sandia Report, *Sandia National Laboratories*, SAND81-1404, 1981, pp. 1-35.
Hu, H. et al., "SimultaneoVelocity and Concentration Measurements of a Turbulent Jet Mixing Flow", *Ann. N.Y. Acad. Sci.*, vol. 972, 2002, pp. 254-259.
Huff, C. F. et al., "Recent Developments in Polycrystalline Diamond-Drill-Bit Design", *Drilling Technology Division—4741, Sandia National Laboratories*, 1980, pp. 1-29.
IADC Dull Grading System for Fixed Cutter Bits, by Hughes Christensen, 1996, 14 pgs.
Imbt, W. C. et al., "Porosity in Limestone and Dolomite Petroleum Reservoirs", paper presented at the Mid Continent District, Division of Production, Oklahoma City, Oklahoma. Jun. 1946, pp. 364-372.
Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.
Jimeno, Carlos Lopez et al., Drilling and Blasting of Rocks, *a. a. Baikema Publishers*, 1995, 30 pgs.
Judzis, A. et al., "Investigation of Smaller Footprint Drilling System; Ultra-High Rotary Speed Diamond Drilling Has Potential for Reduced Energy Requirements", IADC/SPE No. 99020, 33 pages.
Jurewicz, B. R., "Rock Excavation with Laser Assistance", *Int. J. Rock Mech. Min. Sci. & Geomech. Abstr.* vol. 13, 1976, pp. 207-219.
Kahraman, S. et al., "Dominant rock properties affecting the penetration rate of percussive drills", *International Journal of Rock Mechanics and Mining Sciences*, 2003, vol. 40, pp. 711-723.
Karakas, M., "Semianalytical Productivity Models for Perforated Completions", *SPE*, No. 18247, a paper for SPE (Society of Petroleum Engineers) Production Engineering, Feb. 1991, pp. 73-82.
Karasawa, H. et al., "Development of PDC Bits for Downhole Motors", *Proceedings 17th NZ Geothermal Workshop*, 1995, pp. 145-150.
Kelsey, James R., "Drilling Technology/GDO", *Sandia National Laboratories*, SAND-85-1866c. DE85 017231, 1985, pp. 1-7.
Kerr, Callin Joe, "PDC Drill Bit Design and Field Application Evolution", *Journal of Petroleum Technology*, 1988, pp. 327-332.
Ketata, C. et al., "Knowledge Selection for Laser Drilling in the Oil and Gas Industry", *Computer Society*, 2005, pp. 1-6.
Khan, Ovais U. et al., "Laser heating of sheet metal and thermal stress development", *Journal of Materials Processing Technology*, vol. 155-156, 2004, pp. 2045-2050.
Khandelwal, M., "Prediction of Thermal Conductivity of Rocks by Soft Computing", *Int. J. Earth Sci. (Geol. Rundsch)*, May 11, 2010, 7 pages.
Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.
Kim, K. R. et al., "$CO_2$ laser-plume interaction in materials processing", *Journal of Applied Physics*, vol. 89. No. 1, 2001, pp. 681-688.
Klotz, K. et al., "Coatings with intrinsic stress profile: Refined creep analysis of (Ti,A1)N and cracking due to cyclic laser heating", *Thin Solid Films*. vol. 496, 2006, pp. 469-474.
Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.
Kobyakov, A. et al., "Design Concept for Optical Fibers with Enhanced SBS Threshold", *Optics Express*, vol. 13, No. 14, Jul. 11, 2005, pp. 5338-6346.
Kollé, J. J., "A Comparison of Water Jet, Abrasive Jet and Rotary Diamond Drilling in Hard Rock", *Tempress Technologies Inc.*, 1999, pp. 1-8.
Kolle, J. J., "HydroPulse Drilling", a Final Report for Department of Energy under Cooperative Development Agreement No. DE-FC26-FT34367, Apr. 2004, 28 pages.
Kubacki, Emily et al., "Optics for Fiber Laser Applications", *CVI Laser, LLC*, Technical Reference Document #20050415, 2005, 5 pgs.
Kujawski, Daniel, "A fatigue crack driving force parameter with load ratio effects", *International Journal of Fatigue*, vol. 23, 2001, pp. S239-S246.
Labuz, J. F. et al., "Size Effects in Fractured of Rock", *Rock Mechanics for Industry*, Amadei, Kranz, Scott & Smeallie (eds), 1999, pp. 1137-1143.
Labuz, J. F. et al., "Microrack-dependent fracture of damaged rock", *International Journal of Fracture*, vol. 51, 1991, pp. 231-240.
Lacy, Lewis L., "Dynamic Rock Mechanics Testing for Optimized Fracture Designs", *Society of Petroleum Engineers International, Annual Technical Conference and Exhibition*, 1997, pp. 23-36.
Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.
Langeveld, C. J., "PDC Bit Dynamics", a paper prepared for presentation the 1992 IADC/SPE Drilling Conference, Feb. 1992, pp. 227-241.
Lau, John H., "Thermal Fatigue Life Prediction of Flip Chip Solder Joints by Fracture Mechanics Method", *Engineering Fracture Mechanics*, vol. 45, No. 5, 1993, pp. 643-654.
Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.
Leong, K. H. et al., "Lasers and Beam Delivery for Rock Drilling", *Argonne National Laboratory*, ANL/TD/TM03-01, 2003, pp. 1-35.
Leong, K. H., "Modeling Laser Beam-Rock Interaction", a report prepared for Department of Energy (http://www.doe.gov/bridge), 8 pages.
Leung, M. et al., "Theoretical study of heat transfer with moving phase-change interface in thawing of frozen food", *Journal of Physics D: Applied Physics*, vol. 38, 2005, pp. 477-482.
Li, X. B. et al., "Experimental Investigation in the Breakage of Hard Rock by the PDC Cutters with Combined Action Modes", *Tunnelling and Underground Space Technology*, vol. 16., 2001, pp. 107-114.
Liddle, D. et al., "Cross Sector Decommissioning Workshop", presentation, Mar. 23, 2011, 14 pages.
Lima, R. S. et al., "Elastic ModulMeasurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", *Sandia National Laboratories*, SAND-81-1470C, 1981, pp. 1-6.
Loland, K. E., "ContinuoDamage Model for Load-Response Estimation of Concrete", *Cement and Concrete Research*, vol. 10, 1980, pp. 395-402.
Lomov, I. N. et al., "Explosion in the Granite Field: Hardening and Softening Behavior in Rocks", *U.S. Department of Energy, Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lucia, F. J. et al., "Characterization of Diageneticaily Altered Carbonate Reservoirs, South Cowden Graybin Reservoir, West Texas", a paper prepared for presentation at the 1996 SPE Annual Technical Conference and Exhibition, Oct. 1996, pp. 883-893.
Luft, H. B. et al., "Development and Operation of a New Insulated Concentric Coiled Tubing String for ContinuoSteam Injection in Heavy Oil Production", Conference Paper pubiished by Society of Petroleum Engineers on the Internet at: (http://www.onepetro.org/mslib/servlet/onepetropreview?id=00030322), on Aug. 8, 2012, 1 page.
Lyons, K. David et al., "NETL Extreme Drilling Laboratory Studies High Pressure High Temperature Drilling Phenomena", *U.S. Department of Energy, National Energy Technology Laboratory*, 2007, pp. 1-6.
Manrique, E. J. et al., "EOR Field Experiences in Carbonate Reservoirs in the United States", *SPE Reservoir Evaluation & Engineering*, Dec. 2007, pp. 667-886.

(56) References Cited

OTHER PUBLICATIONS

Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.
Marcuse, D., "Curvature Loss Formula for Optical Fibers", *J. Opt. Soc. Am.*, vol. 66, No. 3, 1978, pp. 218-220.
Marshall, David B. et al., "Indentation of Brittle Materials", *Microindentation Techniques in Materials Science and Engineering, ASTM STP 889; American Society for Testing and Materials*, 1986, pp. 26-46.
Martin, C. D., "Seventeenth Canadian Geotechnical Coloquium: The Effect of Cohesion Loss and Stress Path on Brittle Rock Strength", *Canadian Geotechnical Journal*, vol. 34, 1997, pp. 698-725.
Martins, A. et al., "Modeling of Bend Losses in Single-Mode Optical Fibers", Institutu de Telecomunicacoes, Portugal, 3 pages.
Maurer, William C., "Advanced Drilling Techniques", published by Petroleum Publishing Co., copyright 1980, 26 pgs.
Maurer, William C., "Novel Drilling Techniques", pubiished by Pergamon Press, UK, copyright 1968, pp. 1-64.
Mazerov, Katie, "Bigger coil sizes, hybrid rigs, rotary steerable advances push coiled tubing drilling to next level", *Drilling Contractor*, 2008, pp. 54-60.
McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.
Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.
Meister, S. et al., "Glass Fibers for Stimulated Brillouin Scattering and Phase Conjugation", *Laser and Particle Beams*, vol. 25, 2007, pp. 15-21.
Mejia-Rodriguez, G. et al., "Multi-Scale Materiai Modeling of Fracture and Crack Propagation", Final Project Report in Multi-Scale Methods in Applied Mathematics, while the date of the publication is unknown, it is believed to be prior to Aug. 19, 2009, pp. 1-9.
Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.
Mensa-Wilmot, Graham et al., "Advanced Cutting Structure Improves PDC Bit Performance in Hard and Abrasive Drilling Environments", *Society of Petroleum Engineers International*, 2003, pp. 1-13.
Messaoud, Louafi, "Influence of Fluids on the Essential Parameters of Rotary Percussive Drilling", Laboratoire d'Environnement (Tébessa), vol. 14, 2009, pp. 1-8.
Messica, A. et al., "Theory of Fiber-Optic Evanescent-Wave Spectroscopy and Sensor", *Applied Optics*. vol. 35, No. 13, May 1, 1996, pp. 2274-2284.
Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.
Moavenzadeh, F. et al., "Thin Disk Technique for Analyzing Fock Fractures Induced by Laser Irradiation", a report prepared for the Department of Transportation under Contract C-85-65, May 1968, 91 pages.
Mocofanescu, A. et al., "SBS threshold for single mode and multimode GRIN fibers in an all fiber configuration", *Optics Express*, vol. 13, No. 6, 2005, pp. 2019-2024.
Moradian, Z. A. et al., "Predicting the Uniaxial Compressive Strength and Static Young's Modulof Intact Sedimentary Rocks Using the Ultrasonic Test", *International Journal of Geomechanics*, vol. 9, No. 1, 2009, pp. 14-19.
Morozumi, Y. et al., "Growth and Structures of Surface Disturbances of a Round Liquid Jet in a Coaxial Airflow", *Fluid Dynamics Research*, vol. 34, 2004, pp. 217-231.

Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.
Munro, R. G., "Effective Medium Theory of the Porosity Dependence of Bulk Moduli", *Communications of American Ceramic Society*,vol. 84, No. 5, 2001, pp. 1190-1192.
Muto, Shigeki et al., "Laser cutting for thick concrete by multi-pass technique", *Chinese Optics Letters*, vol. 5 Supplement, 2007, pp. S39-S41.
Myung, I. J., "Tutorial on Maximum Likelihood, Estimation", *Journal of Mathematical Psychology*, vol. 47, 2003, pp. 90-100.
Nadavi, I. Z. et al., "Laser heating of multilayer assembly and stress levels: elasto-plastic consideration", *Heat and Mass Transfer*, vol. 40, 2003. pp, 25-32.
Nara, Y. et al., "Sub-critical crack growth in anisotropic rock", *International Journal of Rock Mechanics and Mining Sciences*, vol. 43, 2006, 437-453.
Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.
Nikles, M. et al., "Brillouin Gem Spectrum Characterization in Single-Mode Optical Fibers", *Journal of Lightwave Technology*, vol. 15, No. 10, Oct. 1997, pp. 1842-1851.
Nimick, F. B., "Empirical Relationships Between Porosity and the Mechanical Properties of Tuff", *Key Questions in Rock Mechanics*, Cundall et al. (eds), 1988, pp. 741-742.
Nolen-Hoeksema, R., "Fracture Development and Mechnical Stratigraphy of Austin Chalk, Texas: Discussion", a discussion for the American Association of Petroleum Geologists Bulletin, vol. 73, No. 8, Jun. 1989, pp. 792-793.
O'Hare, Jim et al., "Design Index: A Systematic Method of PDC Drill-Bit Selection", *Society of Petroleum Engineers International*, IADC/SPE Drilling Conference, 2000, pp. 1-15.
Oglesby, K. et al., "Advanced Ultra High Speed Motor for Drilling", a project update by Impact Technologies LLC for the Department of Energy, Sep. 12, 2005, 36 pages.
Okon, P. et al., "Laser Welding of Aluminium Alloy 5083", *21st International Congress on Applications of Lasers and Electro-Optics*, 2002, pp. 1-9.
Olsen, F. O., "Fundamental Mechanisms of Cutting Front Formation in Laser Cutting", SPIE, vol. 2207, pp. 402-413.
Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.
Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.
Ortiz, Blas et al., Improved Bit Stability Reduces Downhole Harmonics (Vibrations), *International Association of Drilling Contractors/Society of Petroleum Engineers Inc.*, 1996, pp. 379-389.
Ouyang, L. B. et al., "General Single Phase Wellbore Flow Model", a report prepared for the COE/PETC, May 2, 1997, 51 pages.
Palashchenko, Yuri A., "Pure Rolling of Bit Cones Doubles Performance", *I & Gas Journal*, vol. 106, 2008, 8 pgs.
Palchaev, D. K. et al., "Thermal Expansion of Silicon Carbide Materials", *Journal of Engineering Physics and Thermophysics*, vol. 66, No. 8, 1994, 3 pages.
Pardoen, T. et al., "An extended model for void growth and Coalescence", *Journal of the Mechanics and Physics of Solids*, vol. 48, 2000, pp. 2467-2512.
Park, Un-Chul et al, "Thermal Analysis of Laser Drilling Processes", *IEEE Journal of Quantum Electronics*, 1972, vol. QK-8. No. 2, 1972, pp. 112-119.
Parker, Richard A. et al., "Laser Drilling Effects of Beam Application Methods on Improving Rock Removal", *Society of Petroleum Engineers*, SPE 84353, 2003, pp. 1-7.
Pavlina, E. J. et al., "Correlation of Yield Strength and Tensile Strength with Hardness for Steels", *Journals of Materials Engineering and Performance*, vol. 17, No. 6, 2008, pp. 888-893.
Feebler, R. P. et al., "Formation Evaluation with Logs in the Deep Anadarko Basin", *SPE of AIME*, 1972, 15 pages.

(56) References Cited

OTHER PUBLICATIONS

Percussion Drilling Manual, by Smith Tools, 2002, 67 pgs.
Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.
Ping, Cao et al., "Testing study of subcritical crack growth rate and fracture toughness in different rocks", *Transactions of NonferroMetals Society of China*, vol. 16, 2006, pp. 709-714.
Plinninger, Dr. Ralf J. et al., "Wear Prediction in Hardrock Excavation Using the CERCHAR Abrasiveness Index (CAI)", *EUROCK 2004 & 53rd Geomechanics Colloquium*, Schubert (ed.), VGE, 2004, pp. 1-6.
Flinninger, Ralf J. et al., "Predicting Tool Wear in Drill and Blast", *Tunnels & Tunneling International Magazine*, 2002, pp. 1-5.
Polsky, Yarom et al., "Enhanced Geothermal Systems (EGS) Well Construction Technology Evaluation Report", *Sandia National Laboratories*, Sandia Report, SAND2008-7866, 2008, pp. 1-108.
Pooniwala, S. et al., "Lasers: The Next Bit", a paper prepared for the presentation at the 2006 SPE (Society of Petroleum Engineers) Eastern Regional Meeting Oct. 2006, pp. 1-10.
Pooniwala, Shahvir, "Lasers: The Next Bit", *Society of Petroleum Engineers*, No. SPE 104223, 2006, 10 pgs.
Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.
Potyondy, D. O. et al., "A Bonded-particle model for rock", *International Journal of Rock Mechanics and Mining Sciences*, vol. 41, 2004, pp. 1329-1364.
Price, R. H. et al., "Analysis of the Elastic and Strength Properties of Yuccs Mountain tuff, Nevada", 26th Symposium on Rock Mechanics, Jun. 1985, pp. 89-96.
Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.
Radkte, Robert, "New High Strength and faster Drilling TSP Diamond Cutters", Report by *Technology International, Inc.*, DOE Award No. DE-FC26-97FT34368, 2006, 97 pgs.
Rao, M. V. M. S. et al., "A Study of Progressive Failure of Rock Under Cyclic Loading by Ultrasonic and AE Monitoring Techniques", *Rock Mechanics and Rock Engineering*, vol. 25. No. 4, 1992, pp. 237-251.
Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.
Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.
Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.
Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.
Richter, D. et al., "Thermal Expansion Behavior of IgneoRocks", *Int. J. Rock Mech. Min. Sci. & Geomech. Abstr.*, vol. 11, 1974, pp. 403-411.
Rjken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.
Rosler, M., "Generalized Hermite Polynomials and the Heat Equation for Dunkl Operators", a paper, while the date of the publication is unknown, it is beiieved to be prior to Aug. 19, 2009, pp. 1-24.
Rossmanith, H. P. et al., "Wave Propagation, Damage Evolution, and Dynamic Fracture Extension. Part I. Percussion Drilling", *Materials Science*, vol. 32, No. 3, 1996, pp. 350-358.
Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.
Sano, Osam et al., "Acoustic Emission During Slow Crack Growth", *Department Mining and Mineral Engineering, NII-Electronic Library Service*, 1980, pp. 381-388.
Sattler, A. R., "Core Analysis in a Low Permeability Sandstone Reservoir: Results from the Multiwell Experiment", a report by Sandia National Laboratories for the Department of Energy, Apr. 1989, 69 pages.
Schaffer, C. B. et al., "Dynamics of Femtosecond Laser-Induced Breakdown in Wafer from Femtoseconds to Microseconds", *Optics Express*, vol. 10, No. 3, Feb. 11, 2002, pp. 196-203.
Schormair, Nik et al., "The influence of anisotropy on hard rock drilling and cutting", *The Geological Society of London, IAEG*, Paper No. 491, 2006, pp. 1-11.
Shannon, G. J. et al., "High power laser welding in hyperbaric gas and water environments", *Journal of Laser Applications*, vol. 9, 1997, pp. 129-136.
Shuja, S. Z. et al., "Laser heating of semi-infinite solid with consecutive pulses: Influence of materaial properties on temperature field", *Optics & Laser Technology*, vol. 40, 2008, pp. 472-480.
Simple Drilling Methods, WEDC Loughborough University, United Kingdom, 1995, 4 pgs.
Smith, D., "Using Coupling Variables to Solve Compressible Flow, Multiphase Flow and Plasma Processing Problems", COMSOL Users Conference 2006, 38 pages.
Smith, E., "Crack Propagation at a Constant Crack Tip Stress Intensity Factor", *Int. Journal of Fracture*, vol. 16, 1980, pp. R215-R218.
Soeder, D. J. et al., "Pore Geometry in High- and Low-Permeability Sandstones, Travis Peak Formation, East Texas", *SPE Formation Evaluation*, Dec. 1990, pp. 421-430.
Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.
Sousa, Luis M. O. et al., "Influence of microfractures and porosity on the physico-mechanical properties and weathering of ornamental granites", *Engineering Geology*, vol. 77, 2005, pp. 153-168.
Stone, Charles M. et al., "Qualifications of a Computer Program for Drill String Dynamics", *Sandia National Laboratories*, SAND-85-0633C, 1985, pp. 1-20.
Stowell, J. F. W., "Characterization of Opening-Mode Fracture Systems in the Austin Chalk", *Gulf Coast Association of Geological Societies Transactions*, vol. L1, 2001, pp. 313-320.
Suarez, M. C. et al., "COMSOL in a New Tensorial Formulation of Non-Isothermal Poroelasticity", publisher unknown, while the date of the publication is unknown, it is believed to be prior to Aug. 19, 2009,2 pages.
Suwamo, et al., "Dielectric Properties of Mixtures Between Mineral Oil and Natural Ester from Palm Oil", *WSEAS Transactions on Power Systems*, vol. 3, Issue 2, Feb. 2008, pp. 37-46.
Takarli, Mokhfi et al., "Damage in granite under heating/cooling cycles and water freeze-thaw condition", *International Journal of Rock Mechanics and Mining Sciences*, vol. 45, 2008, pp. 1164-1175.
Tanaka, K. et al., "The Generalized Relationship Between the Parameters C and m of Paris' Law for Fatigue Crack Growth", *Scripta Metallurgica*, vol. 15, No. 3, 1981, pp. 259-264.
Tang, C. A. et al., "Coupled analysis of flow, stress and damage (FSD) in rock failure", *International Journal of Rock Mechanics and Mining Sciences*, vol. 39, 2002, pp. 477-489.
Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastructure Development in the Northern Regions, Jun. 2005, 7 pages.
Thorsteinsson, Hiidigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.

(56) References Cited

OTHER PUBLICATIONS

Tuler, F. R. et al., "A Criterion for the Time Dependence of Dynamic Fracture", *The International Jopurnal of Fracture Mechanics*, vol. 4, No. 4, Dec. 1968, pp. 431-437.

Turner, D. et al., "New DC Motor for Downhole Drilling and Pumping Applications", a paper prepared for presentation at the SPE/iCoTA Coiled Tubin Roundtable, Mar. 2001, pp. 1-7.

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

U.S. Dept of Energy, "Chapter 6—Drilling Technology and Costs", from Report for Yhe Future of Geothermal Energy, 2005, 53 pgs.

U.S. Non-Provisional U.S. Appl. No. 12/840,978, filed Jul. 21, 2009, 61 pgs.

Udd, E, et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., Stress-Strain Relationship for Empirical Equations of Creep in Rocks, *Engineering Geology*, Mar. 29, 1971, 5 pages.

Vamado, S. G. et al., "The Design and Use of Polycrystalline Diamond Compact Drag Bits in the Geothermal Environment", *Society of Petroleum Engineers of AIME*, SPE 8378, 1979, pp. 1-11.

Wandera, C. et al., "Characterzaton of the Melt Removal Rate in Laser Cutting of Thick-Section Stainless Steel", *Journal of Laser Applications*, vol. 22, No. 2, May 2010, pp. 62-70.

Wandera, C., et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part E, *Journal of Engineering Manufacture*, vol. 225, 2011, 22 pages.

Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Wen-gui, Cao et al., "Damage constituitive model for strain-softening rock based on normal distribution and its parameter determination", *J. Cent. South Univ. Technol.*, vol. 14, No. 5, 2007, pp. 719-724.

Wiercigroch, M., "Dynamics of ultrasonic percussive drilling of hard rocks", *Journal of Sound and Vibration*, vol. 280, 2005, pp. 739-757.

Williams, R. E. et al., "Experiments in Thermal Spallation of VarioRocks", *Transactions of the ASME*, vol. 118, 1996, pp. 2-8.

Willis, David A. et al., "Heat transfer and phase change during picosecond laser ablation of nickel", *International Journal of Heat and Mass Transfer*, vol. 45, 2002, pp. 3911-3918.

Wong, Teng-fong et al., "Microcrack statistics, Weibull distribution and micromechanical modeling of compressive failure in rock", *Mechanics of Materials*, vol. 38, 2006, pp. 664-681.

Wood, Tom, "Dual Purpose COTD™ Rigs Establish New Operational Records", *Treme Coil Drilling Corp., Drilling Technology Without Borders*, 2009, pp. 1-18.

Xia, K. et al., "Effects of microstructures on dynamic compression of Barre granite". *International Journal of Rock Mechanics and Mining Sciences*, vol. 45, 2008. pp. 879-887, available at www.sciencedirect.com.

Xu, Z et al. "Modeling of Laser Spailation Drilling of Rocks fro gas-and Oilwell Driliing", *Society of Petroleum Engineers*, SPE 95746, 2005, pp. 1-6.

Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.

Xu, Z. et al., "Laser Spallation of Rocks for Oil Well Drilling", Proceedings of the 23rd International Congress on Applications of Lasers and Electro-Optics, 2004, pp. 1-6.

Xu, Z. et al., "Modeling of Laser Spallation Drilling of Rocks for Gas-and Oilwell Driiling", a paper prepared for the presentation at the 2005 SPE (Society of Petroleum Engineers) Annual Technical Conference and Exhibition, Oct. 2005, 6 pages.

Xu, Z. et al., "Specific Energy of Pulsed Laser Rock Drilling", *Journal of Laser Applications*, vol. 15, No. 1, Feb. 2003, pp. 25-30.

Xu, Z. et al., "Specific Energy for Laser Removal of Rocks", *Proceedings of the 20th International Congress on Applications of Lasers & Electro-Optics*, 2001, pp. 1-8.

Xu, Z. et al., "Specific energy for pulsed laser rock drilling", *Journal of Laser Applications*, vol. 15, No. 1, 2003, pp. 25-30.

Xu, Zhiyue et al., "Laser Spallation of Rocks for Oil Well Drilling", *Proceedings of the 23rd international Congress on Applications of Lasers and Electro-Optics*, 2004, pp. 1-6.

Yabe, T. et al., "The Constrained Interpolation Profile Method for Multiphase Analysis", *Journal of Computational Physics*, vol. 169, 2001, pp. 556-593.

Yamshchikov, V. S. et al., "An Evaluation of the Microcrack Density of Rocks by Ultrasonic Velocimetric Method", *Moscow Mining Institute*. (Translated from *Fiziko-Tekhnicheskie Problemy Razrabotki Poleznykh Iskopaemykh*), 1985, pp. 363-366.

Yilbas, B. S. et al., "Laser short pulse heating: Influence of pulse intensity on temperature and stress fields", *Applied Surface Science*, vol. 252, 2006, pp. 8428-6437.

Yilbas, B. S. et al., "Laser treatment of aluminum surface: Analysis of thermal stress field in the irradiated region": *Journal of Materials Processing Technology*, vol. 209, 2009. pp. 77-88.

Yilbas, B. S. et al., "Nano-second laser pulse heating and assisting gas jet considerations", *International Journal of Machine Tools & Manufacture*, vol. 40, 2000, pp. 1023-1038.

Yilbas, B. S. et al., "Repetitive laser pulse heating with a convective boundary condition at the surface", *Journal of Physics D: Applied Physics*, vol. 34, 2001, pp. 222-231.

Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.

Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.

Zeuch, D.H. et al., "Rock Breakage Mechanism Wirt a PDC Cutter", *Society of Petroleum Engineers, 6$^{th}$ Annual Technical Conference*, Las Vegas, Sep. 22-25, 1985, 11 pgs.

Zhai, Yue et al., "Dynamic failure analysis on granite under uniaxial impact compressive load", *Front. Archit. Civ. Eng. China*, vol. 2. No. 3, 2008, pp. 253-260.

Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.

Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.

Zhou, X.P., "Microcrack Interaction Brittle Rock Subjected to Uniaxial Tensile Loads", *Theoretical and Applied Fracture Mechanics*, vol. 47, 2007, pp. 68-76.

Zhou, Zehua et al., "A New Thermal-Shock-Resistance Model for Ceramics: Establishment and validation", *Materials Science and Engineering*, A 405, 2005, pp. 272-276.

Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.

(56) References Cited

OTHER PUBLICATIONS

Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
Zhu, X. et al., "High-Power ZBLAN Glass Fiber Lasers: Review and Prospect", *Advances in OptoElectronics*, vol. 2010, pp. 1-23.
A Built-for-Purpose Coiled Tubing Rig, by Schulumberger Wells, No. DE-PS26-03NT15474, 2006, 1 pg.
"Chapter I—Laser-Assisted Rock-Cutting Tests", publisher unknown, while the date of the publication is unknown, it is believed to be prior to Aug. 19, 2009, 64 pages.
"Chapter 7: Energy Conversion Systems—Options and Issues", publisher unknown, while the date of the publication is unknown, it is believed to be prior to Aug. 19, 2009, pp. 7-1 to 7-32 and table of contents page.
"Cross Process Innovations", Obtained from the Internat at: http://www.mrl.columbia.edu/ntm/CrossProcess/CrossProcessSect5.htm, on Feb. 2, 2010, 11 pages.
"Fourier Series, Generalized Functions, Laplace Transform", publisher unknown, while the date of the publication is unknown, it is believed to be prior to Aug. 19, 2009, 6 pages.
"Introduction to Optical Liquids", published by Cargille-Sacher Laboratories Inc., Obtained from the Internet at: http://www.cargille.com/opticalintro.shtml, on Dec. 23, 2008.
"Laser Drilling", Oil & Natural Gas Projects (Exploration & Production Technologies) Technical Paper, Dept. of Energy, Jul. 2007, 3 pages.
"Leaders in Industry Luncheon", IPAA & TIPRO, Jul. 8, 2009, 19 pages.
"Measurement and Control of Abrasive Water-Jet Velocity", publisher unknown, while the date of the publication is unknown, it is believed to be prior to Aug. 19, 2009, 8 pages.
"NonhomogeneoPDE—Heat Equation with a Forcing Term", a lecture, 2010, 6 pages.
"Performance Indicators for Geothermal Power Plants", prepared by International Geothermal Association for World Energy Council Working Group on Performance of Renewable Energy Plants, author unknown, Mar. 2011, 7 pages.
"Rock Mechanics and Rock Engineering", publisher unknown, while the date of the publication is unknown, it is believed to be prior to Aug. 19, 2009, 69 pages.
"Shock Tube", Cosmol MultiPhysics 3.5a, 2008, 5 pages.
"Silicone Fluids: Stable, Inert Media", Gelest, Inc., while the date of the publication is unknown, it is believed to be prior to Aug. 19, 2009, 27 pages.
"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.
"Underwater Laser Cutting", TWI Ltd, May/Jun. 2011, 2 pages.
Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.
Office Action from JP Application No. 2011-551172 dated Sep. 17, 2013.
Office Action from JP Application No. 2011-523959 dated Aug. 27, 2013.
Office Action regarding corresponding Chinese Patent Application 200980141304.7 dated Mar. 5, 2013, 6 pages with English-language translation, 11 pages.
U.S. Appl. No. 13/366,882, filed Feb. 6, 2012, McKay et al.
Related utility application assigned U.S. Appl. No. 13/777,650, filed Feb. 26, 2013, 73 pages.
Related utility application assigned U.S. Appl. No. 13/800,559, filed Mar. 13, 2013, 73 pages.
Related utility application assigned U.S. Appl. No. 13/800,820, filed Mar. 13, 2013, 73 pages.
Related utility application assigned U.S. Appl. No. 13/800,879, filed Mar. 13, 2013, 73 pages.
Related utility application assigned U.S. Appl. No. 13/800,933, filed on Mar. 13, 2013, 73 pages.
Related utility application assigned U.S. Appl. No. 13/849,831, filed Mar. 25, 2013, 77 pages.
Abousleiman, Y. et al., "Poroelastic Solution of an Inclined Borehole in a Transversely Isotropic Medium", *Rock Mechanics*, Daemen & Schultz (eds). 1995, pp. 313-318.
Albertson, M. L. et al., "Diffusion of Submerged Jets", a paper for the *American Society of Civil Engineers*, Nov. 5, 1862, pp. 1571-1596.
Anovitz, L. M. et al., "A New Approach to Quantification of Metamorphism Using Ultra-Small and Small Angle Neutron Scattering", *Geochimica at Cosmochimica Acta*, vol. 73, 2009, pp. 7303-7324.
ASTM International, "Standard Test Method for Thermal Conductivity of Solids by Means of the Guarded-Comparative-Longitudinal Heat Flow Technique", Standard under the fixed Designation E1225-09, 2009, pp. 1-9.
Atkinson, B. K., "Introduction to Fracture Mechanics and Its Geophysical Applications", *Fracture Mechanics of Rock*, 1987, pp. 1-26.
Baird, J. A. et al., "Analyzing the Dynamic Behavior of Downhole Equipment During Drilling", US government Sandia Report, SAND-84-0758C, DE84 008840, 7 pages.
Birkholzer, J. T. et al., "The Impact of Fracture—Matrix Interaction on Thermal-Hydrological Conditions in Heated Fractured Rock", an origial research paper published online http://vzy.scijournals.org/cgi/content/full/5/2/657, May 26, 2006, 27 pages.
Boechat, A. A. P. et al., "Bend Loss in Large Core Multimode Optical Fiber Beam Delivery Systems", *Applied Optics.*, vol. 30 No. 3, Jan. 20, 1991, pp. 321-327.
Cone, C., "Case History of the University Block 9 (Wolfcamp) Field-Gas-Water Injection Secondary Recovery Project", *Journal of Petroleum Technology*, Dec. 1970, pp. 1485-1491.
Cooper, R., "Coiled Tubing Deployed ESPs Utilizing Internally Installed Power Cable—A Project Update", a paper prepared by SPE (Society of Petroleum Engineers) Program Committee for presentationat the 2nd North American Coiled Tubing Roundtable, SPE 38406, Apr. 1997, pp. 1-6.
Cruden, D. M., "The Static Fatigue of Brittle Rock Under Uniaxial Compression", *Int. J. Rock Mech. Min. Sci. & Geomech. Abstr.*, vol. 11, 1974, pp. 67-73.
da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-358.
Damzen, M. J. et al., "Stimulated Brillion Scattering", Chapter 8—SBS in Optical Fibres, OP Publishing Ltd, Published Institute of Physics, London, England, 2003, pp. 137-153.
Degallaix, J. et al., "Simulation of Bulk-Absorption Thermal Lensing in Transmissive Optics of Gravitation Waves Detector", *Appl. Phys.*, B77, 2003, pp. 409-414.
Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.
Dole, L. et al., "Cost-Effective Cementitious Material Compatible with Yucca Mountain Repository Geochemistry", a paper prepared by Oak Ridge National Laboratory for the US Department of Energy, No. ORNL/TM-2004/296, Dec. 2004, 128 pages.

(56) References Cited

OTHER PUBLICATIONS

Dutton, S. P. et al., "Evolution of Porosity and Permeability in the Lower Cretaceous Travis Peak Formation, East Texas", *The American Association of Petroleum Geologist Bulletin*, vol. 76, No. 2, Feb. 1992, pp. 252-269.

Ehrenberg, S. N. et al., "Porosity-Permeability Relationship in Interlayered Limestone—Dolostone Reservoir", *The American Association of Petroleum Geologists Bulletin*, vol. 90, No. 1, Jan. 2006, pp. 91-114.

Fertl, W. H. at al., "Spectral Gamma-Ray Logging in the Texas Austin Chalk Trend", *SPE of AIME*, a paper for Journal of Petroleum Technology, Mar. 1980, pp. 481-488.

Fuerschbach, P. W. et al., "Understanding Metal Vaporization from Laser Welding", Sandia Report No. SAND-2003-3490, a report prepared for DOE Sep. 2003, pp. 1-70.

Gardner, R. D. et al., "Flourescent Dye Penetrants Applied to Rock Fractures", *Int J. Rock Mech. Min. Sci.*, vol. 5, 1968, pp. 155-158 with 2 additional pages.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, pp. 761-770.

Grigoryan, V., "Separathion of variables: Neumann Condition", a lecture for Math 124A, Dec. 1, 2009, pp. 1-3.

Guo, B. et al., "Chebyshev Rational Spectral and Pseudospectral Methods on a Semi-infinite Interval", *Int. J. Numer. Meth. Engng*, vol. 63, 2002, pp. 66-84.

Hammer, D. X. et al., "Shielding Properties of Laser-Induced Breakdown in Water for Pulse Durations from 5 ns to 125 fs"*Applied Optics*, vol. 36, No. 22, Aug. 1, 1997, pp. 5630-5640.

Hareland, G. et al., "Drag-Bit Model Including Wear", *SPE*, No. 26957, a paper prepared for presentation at the Latin American/Caribbean Petroleum Engineering Conference, Apr. 1994, pp. 657-667.

Hashida, T. et al., "Numerical Simulation with Experimental Verification of the Fracture Behavior in Granite Under Confining Pressures based on the Tension-Softening Model"*International Journal of Fracture*, vol. 59, 1993, pp. 227-244.

Howells, G., "Super-Water [R] Jetting Applications from 1974 to 1999", paper presented st the Proceedings of the $10^{th}$ American Waterjet Confeence in Houston, Texas, 1909, 25 pages.

Huang, H. et al., "Intrinsic Length Scales in Tool-Rock Interaction", *International Journal of Geomechanics*, Jan./Feb. 2008; pp. 39-44.

Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.

Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.

Kiwata, T. et al., "Flow Visualization and Characteristics of a Coaxial Jet with a Tabbed Annular Nozzle", *JSME International Journal Series B*, vol. 49, No. 4, 2006, 906-913.

Agrawal, Govind P., "Nonlinear Fiber Optics", Chap. 9, Fourth Edition, Academic Press copyright 2007.

McElhenny, John E. et al., "Unique Characteristic Features of Stimulated Brillouin Scattering in Small-Core Photonic Crystal Fibers", *J. Opt. Soc. Am. B*. vol. 25, No. 4, 2008, pp. 582-593.

Mocofanescu, A. et al., "SBS threshold for single mode and multimode GRIN fibers in en all fiber configuration", *Optics Express*, vol. 13, No. 6, 2005, pp. 2019-2024.

U.S. Non-Provisional U.S. Appl. No. 12/706,576, filed Feb. 16, 2010 28 pgs.

Agrawal Dinesh et al., "Microstructural by TEM of WG/Co composites Prepared by Conventional and Microwave Processes", Materials Research Lab, The Pennsylvania State University, $15^{th}$ *International Plansee Seminar*, vol. 2, , 2001, pp. 677-684.

Ashby, M. F. et al., "The Failure of Brittle Solids Containing Small Cracks Under Compressive Stress States", *Acta Metall.*, vol. 34, No. 3, 1986, pp. 497-510.

Baird, Jerold et al., Phase 1 Theoretical Description, A Geological Formation Drill String Dynamic Interaction Finite Element Program (GEODYN), *Sandia National Laboratories*, Report No. Sand-84-7101-1984, 196 pgs.

BDM Corporation, Geothermal Completion Technology Life-Cycle Cost Model (GECOM), *Sandia National Laboratories*, for the U.S. Dept. of Energy, vols. 1 and 2, 1982, 222 pgs.

Browning, J. A. et al., "Recent Advances in Flame Jet Working of Minerals"*7th Symposium on Rock Mechanics*, Pennsylvania State Univ., 1965, pp. 281-313.

Cardenas, R., "Protected Polycrystalline Diamond Compact Bits for Hard Rock Drilling", Report No. DOE-99049-1361, *U.S. Department of Energy*, 2000, pp. 1-79.

Close, F et al., "Successful Drilling of Basalt in a West of Shetland Deepwater Discovery"; *SPE International 96575*, Society of Petroleum Engineers, 2006, pp. 1-10.

Cogotsi, G. A. et al., "Use of Nondestructive Testing Methods in Evaluation of Thermal Damage for Ceramics Under Conditions of Nonstationary Thermal Effects", *Institute of Strength Problems, Academy of Science, of the Ukrainian SSR*, 1985, pp. 52-56.

De Guire, Mark R., "Thermal Expansion Coefficient (start)", *EMSE 201—Introduction to Materials Science & Engineering*, 2003 pp. 15.1-15.15.

Dinçer, Ismail et al., "Correlation between Schmidt hardness, uniaxial compressive strength and Young's modulus for andesites, basalts and tuffs", *Bull Eng Geol Env*, vol. 63, 2004, pp. 141-148.

Dunn, James C., "Geothermal Technology Development at Sandia", *Geothermal Research Division Sandia National Laboratories*, 1987, pp. 1-6.

Eighmy, T. T. et al., "Microfracture Surface Charaterizatons: Implications to In Situ Remedial Methods in Fractured Rock", *Bedrock Bioremediation Centor, Final Report, National Risk Management Research Laboratory, Office of Research and Development, U. S. Environmental Protection Agency*, EPA/600/R-05/121, 2006, pp. 1-99.

Elsayed, M.A et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

Finger, John T. et al., "PDC Bit Research at Sandia National Laboratories", Sandia Report, *Geothermal Research Division 6252, Sandia National Laboratories*, SAND89-0079-UC-253, 1989, pp. 1-88.

Gahan, Brian C. et al. "Efficient of Downhole Pressure Conditions on High-Power Laser Perforation", *Society of Petroleum Engineers*, SPE 97093, 2005, pp, 1-7.

Gahan, B. C. et al., "Laser Drilling: Determination of Energy Required to Remove Rock", *Society of Petroleum Engineers International*, SPE 71466, 2001, pp. 1-11.

Glowka, David A., "Design Considerations for a Hard-Rock PDC Drill Bit", *Geothermal Technology Development Division 6241, Sandia National Laboratories*, SAND-85-0666C, DE85 006313, 1985, pp. 1-23.

Glowka, David A., "Development of a Method for Predicting the Performance and Wear of PDC Drill Bits", *Sandia National Laboratories*, SAND86-1745-UC-66c, 1987, 1-206.

Gurarie, V. N., "Stress resistance parameters of brittle solids under laser/plasma heating", *Materials Science and Engineering*, vol. A288, 2000, pp. 168-172.

Hall, Kevin, "The, role of thermal stress fatigue in the breakdown of rock in cold regions", *Geomorphology*, vol. 31, 1999, pp. 47-63.

Healy, Thomas E., "Fatigue Crack Growth in Lithium Hydride"; *Lawrence Livermore National Laboratory*, 1993, pp. 1-32.

Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998 pp. 3-15.

Hibbs, Louis E. et al., "Wear Machanisms for Polycrystalline-Diamond Compacts as Utilized fro Drilling in Geothermal Environments", *Sandia National Laboratories*, for The United States Government, Report No. SAND-82/7213, 1983, 287 pgs.

Hoek, E., "Fracture of Anisotropic Rock", *Journal of the South African Institute of Mining and Metallurgy*, vol. 64, No. 10, 1964, pp. 501-523.

(56) References Cited

OTHER PUBLICATIONS

Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.

Huff, C. F. et. al., "Recent Developments in Polycrystalline Diamond-Drill-Bit Design", *Drilling Technology Division-4741, Sandia National Laboratories*, 1980, pp. 1-29.

Jimeno, Carlos Lopez et al., Drilling and Blasting of Rocks, Balkerna Publishers, 1995, 30 pgs.

Kelsey, James R., "Drilling Technology/GDO", *Sandia National Laboratories*, SAND-85-1866c, DE85 017231, 1985, pp. 1-7.

Khan, Ovais U et al., "Laser heating of sheet metal and thermal stress development", *Journal of Materials Processing Technology*, vol. 156-156, 2004, pp. 2045-2050.

Kim, K. R. et al., "$CO_2$ laser-plume interaction in materials processing", *Journal of Applied Physics*, vol. 89, No. 1, 2001, pp. 681-688.

Klotz, K. et al., "Coatings with intrinsic stress profile: Refined creep analysis of (Ti,A1)N and cracking due to cyclic laser heating", *Thin Solid Films*, vol. 496, 2006, pp. 469-474.

Kujawski Daniel, "A fatigue crack driving force parameter with load ratio effects", *International Journal of Fatigue*, vol. 23, 2001, pp. S239-S246.

Lacy, Lewis L., "Dynamic Rock Mechanics Testing for Optimizer Fracture Designs", *Society of Petroleum Engineers International, Annual Technical Conference and Exhibition*, 1997, pp. 23-36.

Lau, John H., "Thermal Fatigue Life Prediction of Flip Chip Solder Joints by Fracture Mechanics Method", *Engineering Fracture Mechanics*, vol. 45, No. 5, 1993 pp. 643-654.

Leung, M. et al., "Theoretical study of heat transfer with moving phase-change interface in thawing of frozen food", *Journal of Physics D: Applied Physics*, vol. 38, 2008, pp. 477-482.

Lima, R. S. et al., "Elastic Modulus Measurements via Laser-Ultrasonic and Knoop Indentation Techniques in Thermally Sprayed Coatings", *Journal of Thermal Spray Technology*, vol. 14(1), 2005, pp. 52-60.

Lyons, K. David et al., "NETL Extreme Drilling Laboratory Studies High Pressure High Temperature Drilling Phenomena", *U.S. Department of Energy, National Energy Technology Laboratory*, 2007, pp. 1-8.

Marhsall, David B. et al., "Indentation of Brittle Materials", *Microindentation Techniques in Materials Science and Engineering, ASTM STP 889; American Society for Testing and Materials*, 1986, pp. 26-46.

Maurer, William C., "Novel Drilling Techniques", published by Pergamon Press, UK, copyright 1968, pp. 1-64.

Mazerov, Katie, "Bigger coil Sizes, hybrid rigs, rotary steerable. advances push coiled tubing drilling to next level", *Drilling Contractor*, 2008, pp. 54-60.

Medvedev, I. F. et al., "Optimum Force Characteristics of Rotary-Percussive Machines for Drilling Blast Holes", Moscow, Translated from *Fiziko-Tekhnicheskie Problemly Razrabolki Poleznykh Iskopaemykh*, No. 1, 1967, pp. 77-80.

Moradian, Z. A et al., "Predicting the Uniaxial Compressive Strength and Static Young's Modulus of Intact Sedimentary Rocks Using the Ultrasonic Test", *International Journal of Geomechanics*, vol. 9, No. 1, 2009, pp. 14-19.

Naqavi, I. Z. et al., "Laser heating of multilayer assembly and stress levels: elasto-plastic consideration", *Heat and Mass Transfer*, vol. 40, 2003, pp. 25-32.

Nara Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extenslon With Appilcation to Splitting, Exfoliation, and Rockburst", *Journal of Geophysical Research*, vol. 87, No. B8, 1982, pp. 6805-6821.

Ortega, Alfonso et al., "Frictional Heating and Convective Cooling of Polycrystalline Diamond Drag Tools During Rock Cutting", Report No. SAND 52-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80-2677, 1987, pp. 1-151.

Park, Un-Chul et al., "Thermal Analysis of Laser Drilling Processes", *IEEE Journal of Quantum Electronics*, 1972, vol. QK-8, No. 2, 1972, pp. 112-119.

Ping, CAO et al., "Testing study of subcritical crack growth rate and fracture toughness in difference rocks", *Transactions of Nonferrous Metals Society of China*, vol. 16, 2006, pp. 709-714.

Plinninger, Ralf J. et al., "Predicting Tool Wear in Drill and Blast", *Tunnels & Tunneling International Magazine*, 2002, pp. 1-5.

Qixian, Luo et al., "Using compression wave ultrasonic transducers to measure the velocity of surface waves and hence determine dynamic modulus of elasticity for concrete", *Construction and Building Materials*, vol. 10, No. 4, 1996, pp. 237-242.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 582 pgs.

Rossmanith, H. P. et al., "Wave Propagation, Damage Evolution, and Dynamic Fracture Extension. Part I Percussion Drilling", *Materials Science*, vol. 32, No. 3, 1996, pp. 350-358.

Sachpazis, C. I, M. Sc., Ph. D., "Correlating Schmidt Hardness With Compressive Strength and Young's Modulus of Carbonate Rocks", *International Association of Engineering Geology*, Bulletin, No. 42, 1990, pp. 75-83.

Schormair, Nik et al., "The influence of anisotropy on hard rock drilling and cutting", *The Geological Society of London, IAEG*, Paper No. 491, 2906, pp. 1-11.

Sousa, Luis M. O. et al., "Influence of microfractures and porosity on the physico-mechanical properties and weathering of ornamental granites", *Engineering Geology*, vol. 77, 2005, 153-168.

Stone, Charles M. et al., "Qualification of a Computer Program for Drill String Dynamics", *Sandia National Laboratories*, SAND-85-0633C, 1985, pp. 1-20.

Tanaka, K. et al., "Generalized Relationship Between the Parameters C and m of Paris' Law for Fatigue Crack Growth", *Scripta Metallurgica*, vol. 15 No. 3, 1981, pp. 259-264.

Tang, C. A et al., "Coupled analysis of flow, stress and damage (FSD) in rock failure", *International Journal of Rock Mechanics and Mining Sciences*, vol. 39, 2002, pp. 477-489.

Thorsteinsson, Hildigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.

U.S. Dept of Energy, "Chapter 6—Drilling Technology and Costs", from Report for the Future of Geothermal Energy, 2005, 53 pgs.

Varnado, S. G. et al., "The Design and Use of Polycrystalline Diamond Compact Drag Bits in the Geothermal Environment", *Society of Petroleum Engineers of AIME*, SPE 8378, 1979, pp. 1-11.

Wen-gui, CAO et al., "Damage constitultive model for strain-softening rock based on normal distribution and its parameter determination", *J. Cent. South Univ. Technol.*, vol. 14, No. 5, 2007, No. 719-724.

Williams, R. E. et al., "Experiments in Thermal Spallation of Various Rocks", *Transactions of the ASME*, vol. 118, 1996, pp. 2-8.

Xia, K. et al., "Effects of microstructures on dynamic compression of Barre granite", *International Journal of Rock Mechanics and Mining Sciences*, vol. 45, 2008, pp. 879-887, available at: www.sciencedirect.com.

Xu, Z et al. "Modeling of Laser Spallation Drilling of Rocks fro gas- and Oilwell Drilling", *Society of Petroleum Engineers*, SPE 95746, 2005, pp. 1-6.

Yamshchikov, V. S. et al., "An Evaluation of the Microcrack Density of Rock by Ultrasonic Velocimetric Method", *Moscow Mining Institute*. (Translated from *Fiziko-Tekhnicheskie Problemy Razrabotki Poleznykh Iskopaemykh*), 1985, pp. 363-366.

Yibas, B. S. et al., "Laser short pulse heating: Influence of pulse intensity on temperature and stress fields", *Applied Surface Science*, vol. 252, 2006, pp. 8428-8437.

(56) References Cited

OTHER PUBLICATIONS

Yilbas, B. S. et al., "Laser treatment of aluminum surface: Analysis of thermal stress field in the irradiated region", *Journal of Materials Processing Technology*, vol. 209, 2009, pp. 77-88.

Zeuch, D.H. et al., "Rock Breakage Mechanism Wirt A PDC Cutter", *Society of Petroleum Engineers, 60th Annual Technical Conference*, Las Vegas, Sep. 22-25, 1985, 11 pgs.

Zhai, Yue et al., "Dynamic failure analysis on granite under uniaxial impact compressive load", *Front. Archit. Civ. Eng. China*, vol. 2, No. 3, 2008, pp. 253-260.

Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3679, 1997, pp. 1-50.

* cited by examiner

SYSTEMS AND ASSEMBLIES FOR TRANSFERRING HIGH POWER LASER ENERGY THROUGH A ROTATING JUNCTION

This application: (i) claims, under 35 U.S.C. §119(e)(1), the benefit of the filing date of Mar. 1, 2012 of provisional application Ser. No. 61/605,401; (ii) is a continuation-in-part of U.S. patent application Ser. No. 13/210,581; (iii) is continuation-in-part of U.S. patent application Ser. No. 13/366,882; (iv) is a continuation-in-part of U.S. patent application Ser. No. 12/543,986; and, (iv) is a continuation-in-part of U.S. patent application Ser. No. 12/544,136, which claims under 35 U.S.C. §119(e)(1) the benefit of the filing date of Feb. 17, 2009 of provisional application Ser. No. 61/153,271 and the benefit of the filing date of Oct. 17, 2008 of Provisional Application Ser. No. 61/106,472, the entire disclosures of each of which are incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to high power laser conveyance and deployment systems for use with high power laser tools and systems and in high power laser operations. More particularly, the present inventions relate to systems, methods and structures for deploying equipment and conveying high power laser energy, alone or in conjunction with other items, such as, data, electricity, gases and liquids, to remote, difficult to access or hazardous locations, such as oil wells, boreholes in the earth, pipelines, underground mines, natural gas wells, geothermal wells, surface mines, subsea structures, or nuclear reactors. The delivered high power laser energy and other items may be used at the remote location for activities, such as, monitoring, cleaning, controlling, assembling, drilling, machining, powering equipment, milling, flow assurance, decommissioning, plugging, abandonment, drilling, perforating, work overs, completions, and fracturing.

As used herein, unless specified otherwise "high power laser energy" means a laser beam having at least about 1 kW (kilowatt) of power. As used herein, unless specified otherwise "great distances" means at least about 500 m (meter). As used herein, unless specified otherwise, the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein, unless specified otherwise, the term high power laser umbilical should be given its broadest possible meaning, and would generally include: a high power laser optical fiber; one, two, three, four or more high power laser optical fibers in a bundle or assembly; a high power laser fiber(s) in a protective covering(s), and a high power laser fiber(s) in a more complex conveyance structure(s) having other channels for conveying other materials such as fluids, wires, communication optical fibers, support structures and the like; and, would include without limitation all of the high power laser transmission structures and configurations disclosed and taught in the following US Patent Applications Publication Nos.: 2010/0044106; 2010/0215326; 2010/0044103; 2012/0020631; 2012/0068006; and 2012/0266803, the entire disclosures of each of which are incorporated herein by reference.

When operating in high power laser regimes, e.g., greater than 1 kW, greater than 10 kW, greater than 20 kW, greater 50 kW, greater than 80 kW, about 100 kW and greater, the difficulties and problems associated with transmitting this high power laser energy across a rotating junction increase by several orders of magnitude compared with telecommunications power levels, e.g., milliwatts.

SUMMARY

There is a need to deploy high power laser umbilicals over great distance from wound, coiled or compact configurations. This need extends to delivering high power laser energy from the umbilicals during deployment and recovery. The present inventions, among other things, solve these needs by providing the articles of manufacture, devices and processes taught herein.

Thus, there is provided herein a a rotational junction transmission device for transmitting very high power laser energy, the device having: a housing having a first end and a second end; a first plate rotatably affixed to the first end of the housing, and a second plate affixed to the second end of the housing, wherein the first and second plates and the housing define a rotation junction there between; a means for transferring a laser beam having at least about 20 kW of power across the rotation junction.

Further it is provided that this device may further have one or more of: a pair of optical blocks, wherein each pair of optical blocks is optically associated with a laser beam path, whereby the optical block pair is capable of transmitting the laser beam across a rotation junction; and at least one of the pair of optical blocks passes through a second laser beam path; an optical block having a plurality of transmissive reflective surfaces with in the block; at least four high power laser couplers; an optical block that has at least four transmissive reflective surfaces and each surface is optically associated with a high power optical fiber; and a ratchet mechanism.

Additionally there is provided a self adjusting optical slip ring for transmitting high power laser energy across a rotational transition, the slip ring having: a first connector defining a mechanical, optical and thermal tolerance; a second connector defining a mechanical, optical and thermal tolerance; a launching body optics defining a mechanical, optical and thermal tolerance; a receiving body optics defining a mechanical, optical and thermal tolerance tolerance; and all tolerances below a predetermined level, whereby the optical slip ring is self-aligning.

Still further there is provided an optical rotational coupling assembly, the assembly having: a continuous length of a high power umbilical having a first end section and a second end section; the end sections on either side of a rotational junction; wherein the first end is fixed in a non-rotatable manner; and, wherein the second end rotatable, in a manner that does not twist the umbilical; whereby the assembly is capable of delivering a laser beam across the rotational junction.

BRIEF DESCRIPTION OF THE DRAWINGS

FIG. 28A is a cutaway view of a structure of the embodiment of FIG. 28.

DESCRIPTION OF THE PREFERRED EMBODIMENTS

In general, the present inventions relate to systems, methods and equipment for deploying high power laser umbilicals from a wound, coiled or compact configuration to a deployed condition and for returning the umbilical from the deployed condition to the wound, coiled or compact configuration. In particular the present inventions relate to transmitting high power laser energy through the umbilical during deployment, during recovery and both.

Figure 1:
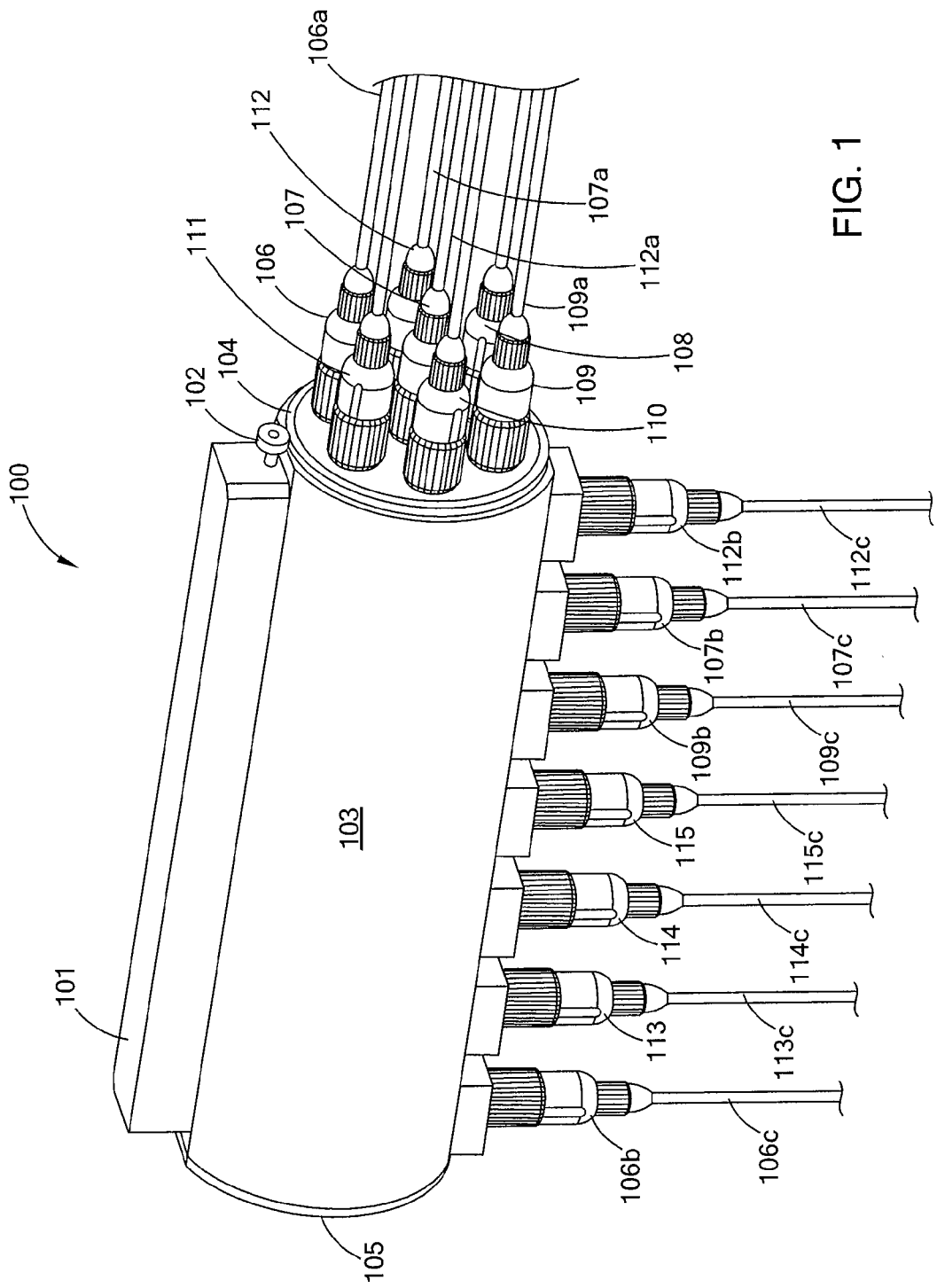
FIG. 1 is a perspective view of an embodiment of a rotational junction transmission device in accordance with the present inventions.

Turning to FIG. 1 there is shown a perspective view of an embodiment of an optical slip ring ("OSR"). The OSR 100 has a gear box 101, a drive wheel 102 and a housing 103. The housing 103 has a front plate 104, which moves, rotates, with respect to the housing 103. The housing has a back plate 105 that is fixed with the housing 103, i.e., it does not rotate with respect to housing 103. Drive wheel 102 drives front plate 104.

Front plate has high power laser connectors 106, 107, 108, 109, 110, 111, 112, which rotate with front plate 104. Each connector has a high power laser umbilical, e.g., 106a, 107a, 109a, 112a, respectively associated with it. Housing 103 has high power laser connectors 106b, 113, 114, 115, 109b, 107b, 112b. These connectors are fixed with the housing. Each connector has a high power laser umbilical 106c, 113c, 114c, 115c, 109c, 107c 112c respectively associated with it.

In this embodiment the connectors and fibers in one section, e.g., face plate 104, are rotationally associated with the connectors and umbilicals in another section, e.g., housing 103. Being rotationally associated either the face plate or the housing may be fixed with the other section rotating. Preferably, the fixed, non-rotating section is optically associated with the high power laser. Thus, in one configuration of the embodiment of FIG. 1 umbilicals, e.g., 106a, 107a, 109a, 112a are each optically associated with a high power laser, e.g., a 20 kW fiber laser; and umbilicals 106c, 113c, 114c, 115c, 109c, 107c, 112c are optically associated with one or more high power laser tools. In another configuration umbilicals 106c, 113c, 114c, 115c, 109c, 107c, 112c are each optically associated with a high power laser, e.g., a 20 kW fiber laser; and umbilicals, e.g., 106a, 107a, 109a, 112a are optically associated with one or more laser tools. The umbilicals in this embodiment may be, for example, high power optical fibers in a metal tube ("FIMT")

The OSR 100 may be associated with a reel having a long length of high power laser umbilical for use in deploying a high power laser tool. This umbilical may be at least about 500 feet, at least about 1,000 feet long, at least about 5,000 feet long, at least about 10,000 feet long and longer. As the long umbilical is unwound and deployed the OSR 100 permits the high power laser beams to be transmitted across rotating junctions that are contained within the housing 103. Thus, depending upon the diameter of the reel, the OSR 100 permits the seven about 20 kW laser beams to be transmitted and preferably continuously transmitted through, at least about 20 rotations, at least about 50 rotations, at least about 80 rotations, and more. These rotations may be in a first direction, e.g., unwinding and in the opposite direction, e.g., winding.

Figure 1A:
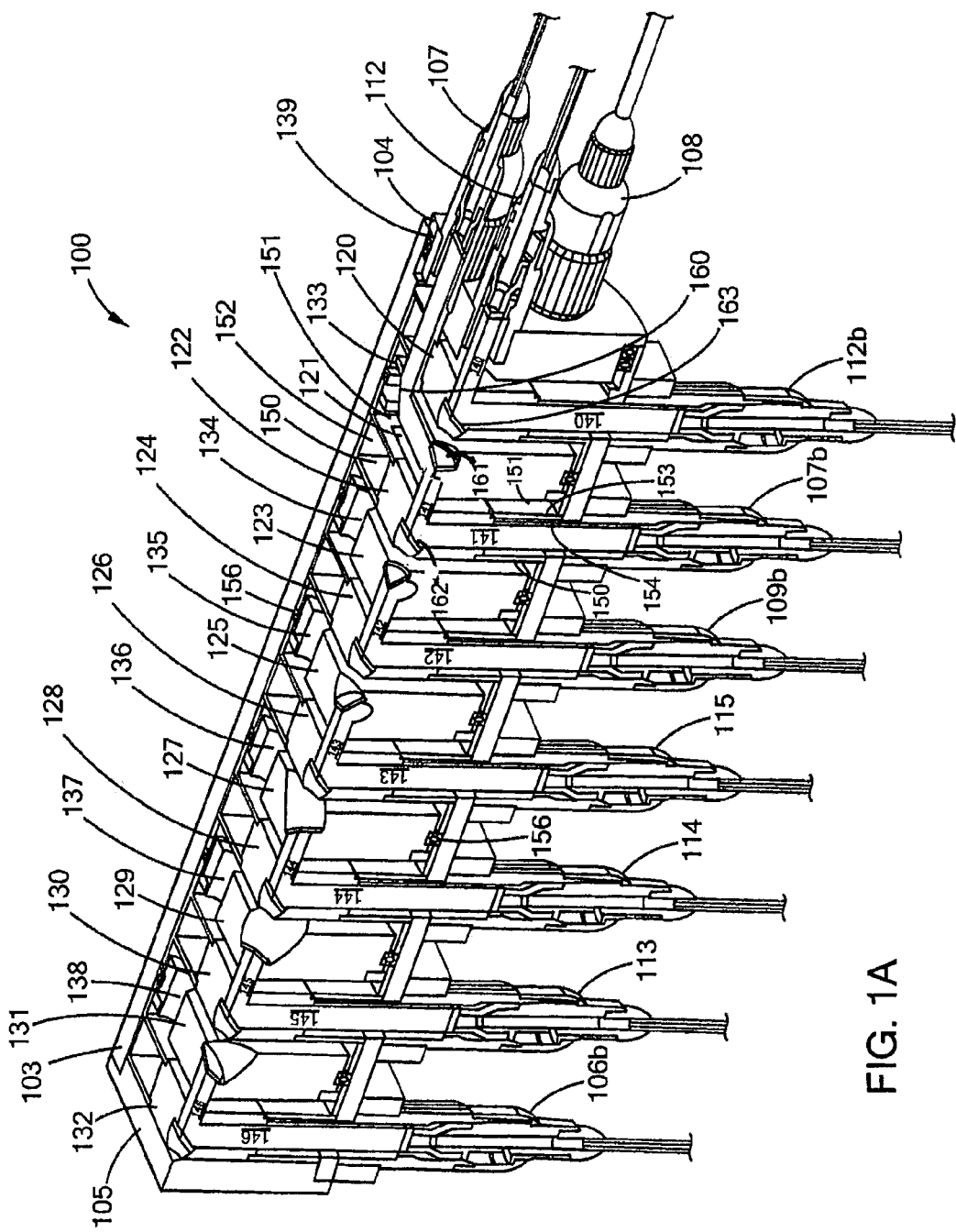
FIG. 1A is a ¼ cross sectional view of the embodiment of FIG. 1.

Turning to FIG. 1A there is shown a ¼ cross sectional view of the OSR of the embodiment of FIG. 1. Optical blocks 120, 121, 122, 123, 124, 125, 126, 127, 128, 129, 130, 131, 132 are located inside of housing 103. Optical blocks 131, 129, 127, 125, 123, 121 rotate with face plate 104, and have beam channels 133, 134, 135, 136, 137, 138. These blocks have bearings, e.g., 156, positioned between them and the housing 103. The face plate 104 has bearing assembly 139 between it and the housing 103. Optical blocks 120, 122, 124, 126, 128, 130, 132 rotate with the housing 103. These optical blocks further each have a first annular window, e.g., 150, a second annular window, e.g., 151 and a spacer band, e.g., 152 having a gap, e.g., 153. These optical blocks further each have a laser beam launch channel, e.g., 154.

Thus, the embodiment of FIG. 1, as seen in FIG. 1A provides for seven independent laser beam paths, 140, 141, 142, 143, 144, 145, 146. Beam path 140 is on the rotation axis of the OSR 100. Beam path 140 is the only beam path that is entirely on the axis from entering the housing until passing through its rotational junction. Beam path 140 leaves connector 112, travels to reflector 163, where it is directed into the laser beam launch channel and through the gap in the spacer band and into connector 112b. Beam path 141 enters the face plate in an off-axis manner. Beam path 114 travels from connector 107 through the annular windows associated with optical block 120 to reflector 160, where it is directed into optical block 121 and reflector 161. Upon leaving reflector 161 the laser beam path is now on axis, until it reaches reflector 162 and is then directed into the beam launch channel 154, through gap 153 in spacer band 152, and into connector 107b. Thus, the transition of the beam path between rotation and non-rotating blocks occurs when the beam path, and thus the beam, is on axis, i.e., on the axis of rotation of the OSR 100, and between optical block 121 (fixed with the front plate) and 122 (fixed with the housing).

Figure 1B:
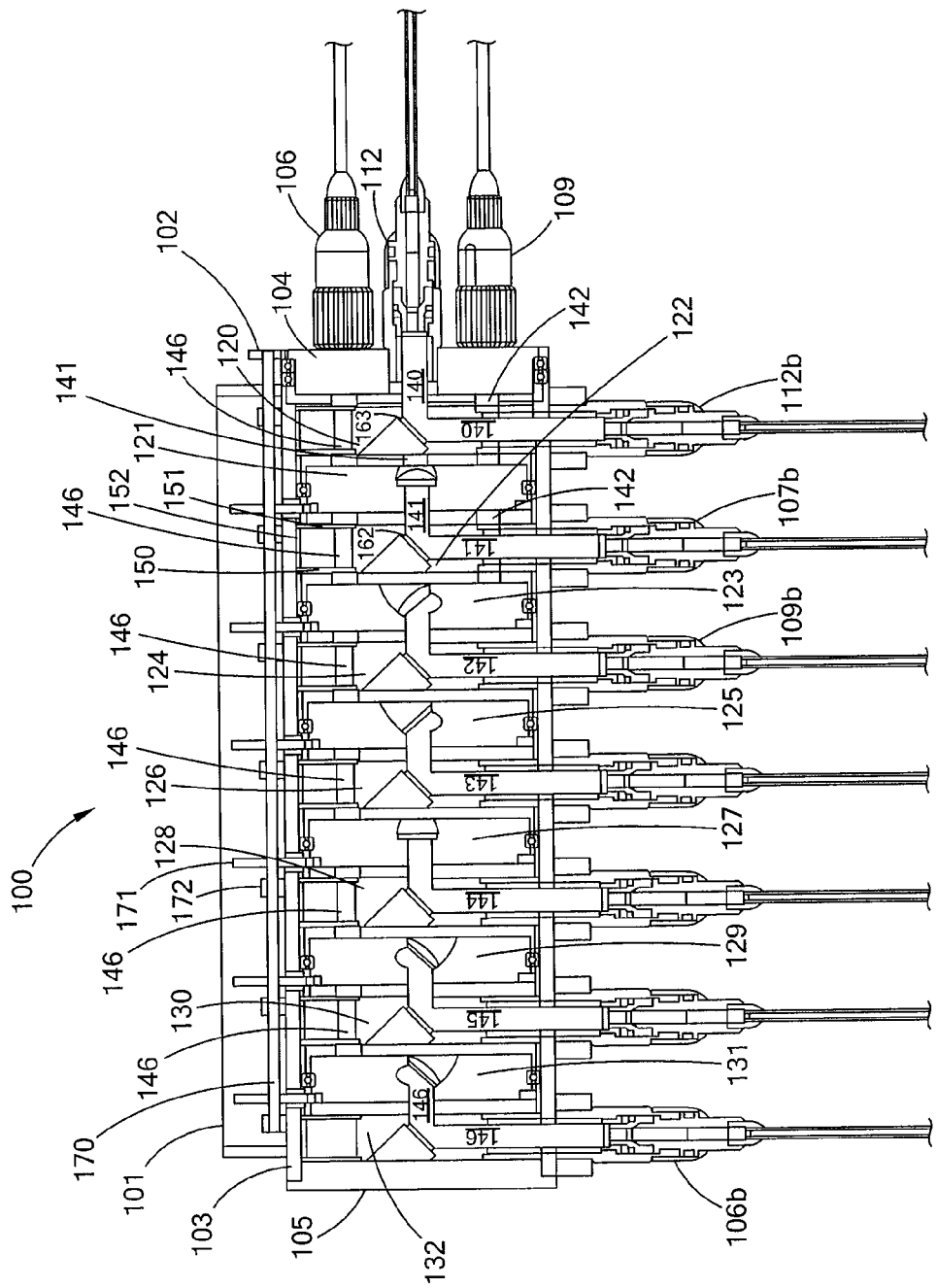
FIG. 1B is a cross sectional view of the embodiment of FIG. 1.

FIG. 1B is a cross sectional view of the embodiment of FIG. 1. Axle 170 has rotary supports, e.g., 172, and inner drive wheels, e.g., 171. The inner drive wheels rotate the optical blocks, e.g., 121, that are associated with the wheels maintain this rotation with the rotation of the front plate.

Figure 2:
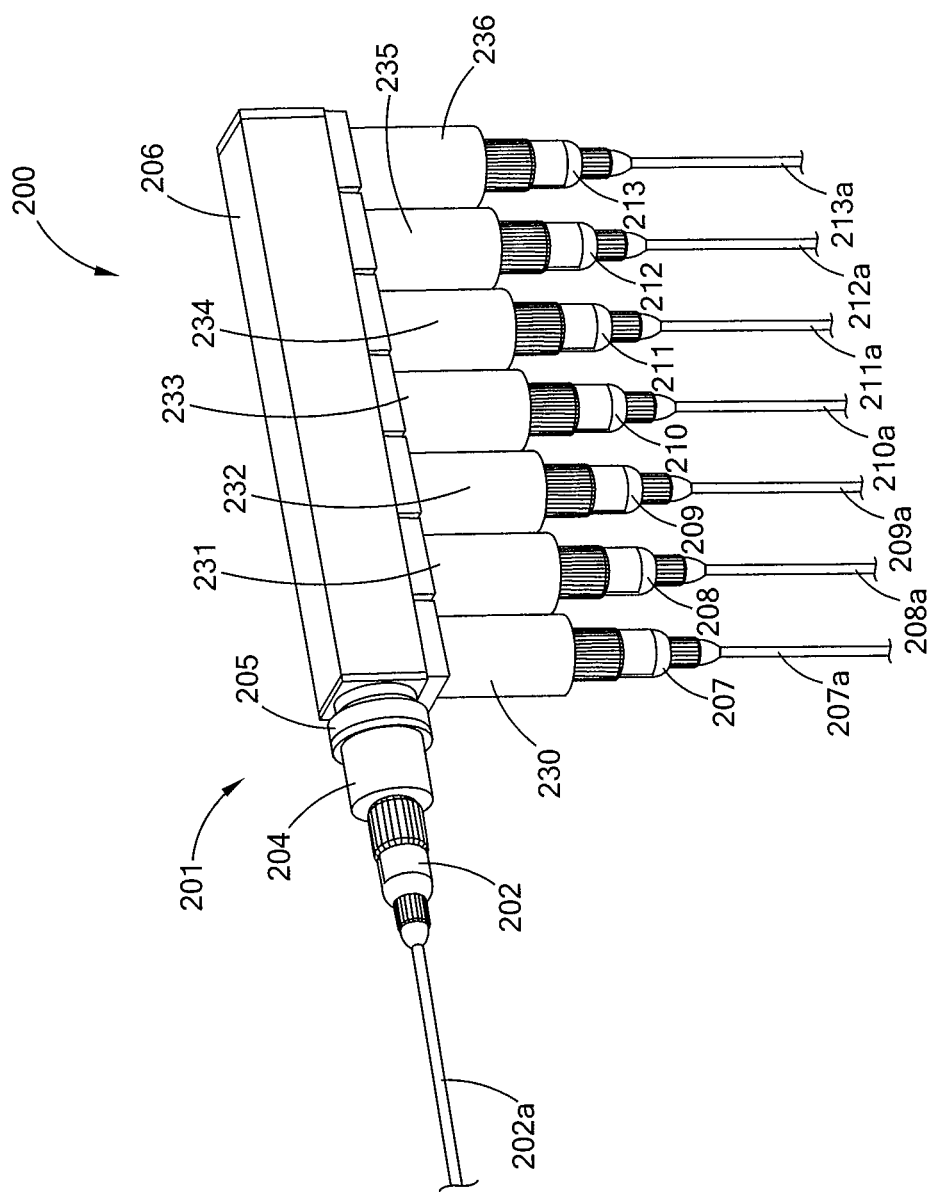
FIG. 2 is a perspective view of an embodiment of a rotational junction transmission device in accordance with the present inventions.

Turning to FIG. 2 there is shown a perspective view of an OSR 200. The OSR 200 that has a rotary junction 201 having a first housing 204 and a second housing 205. The first housing 204 has a high power connector 202. The second housing 205 is connected to a cover 206. The first housing and the second housing form rotation junction 201. In this manner the cover 206 section and the umbilical 202a section are rotatable with respect to each other. The cover has seven beam tubes, 230, 231, 232, 233, 234, 235, 236 optically and mechanically associated with it. Each beam tube has a high power connector 207, 208, 209, 210, 211, 212, 213, respectively, associated with it, and each connector has a high power umbilical 207a, 208a, 209a, 210a, 211a, 212a, 213a, respectively, associated with it.

Figure 2A:
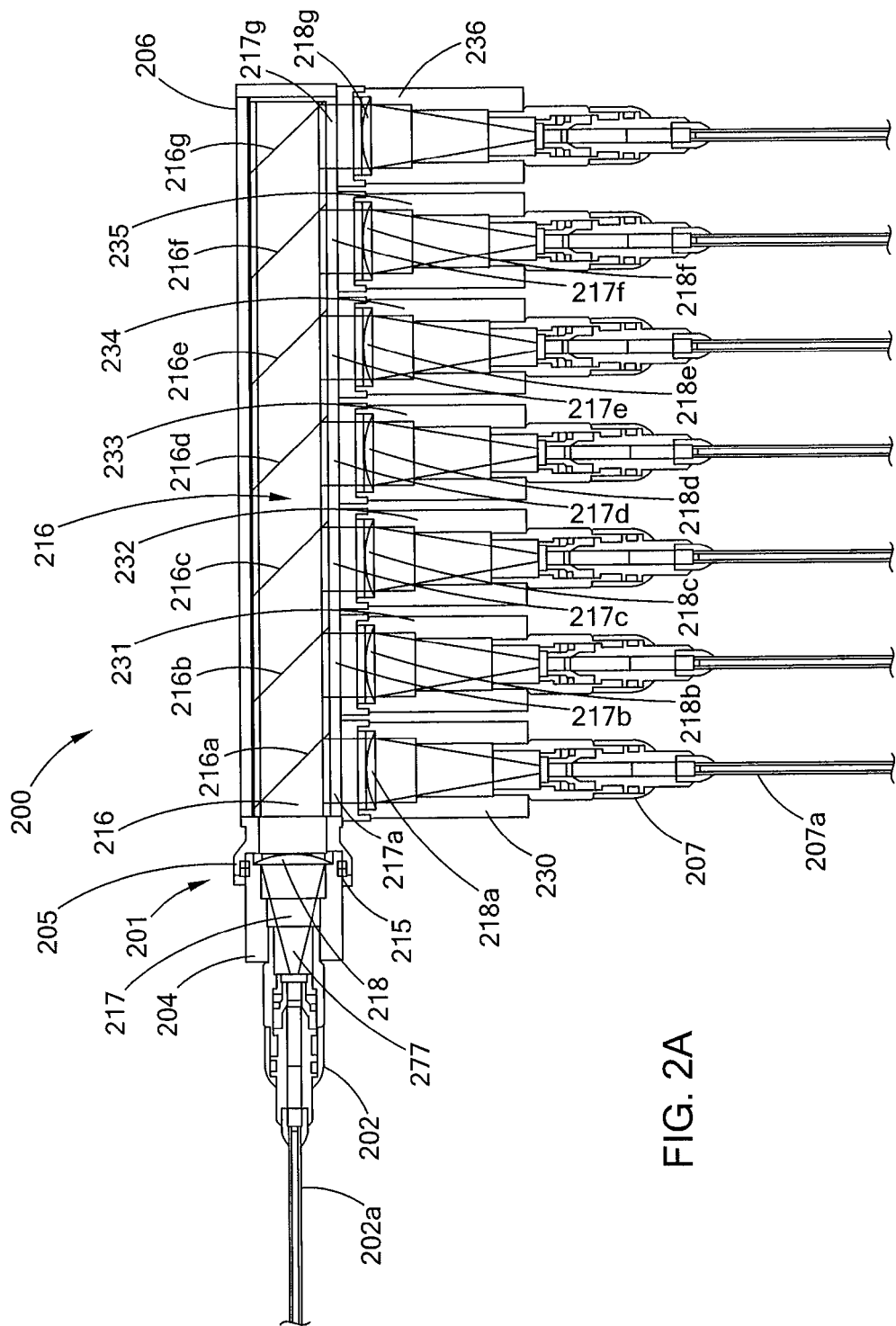
FIG. 2A is a cross sectional view of the embodiment of FIG. 2.

A cross sectional view of the embodiment of FIG. 2, is shown in FIG. 2A. The housings 204 and 205 (which form the rotation junction 201) have bearings 215. The laser beam 217 traveling along laser beam path 277 leaves the connector 202 and enters an optical element, e.g., collimating lens 218, and traveling in collimated space enters transmissive and reflective optical block assembly 216. Upon entering optical block assembly 216 the laser beam 217, traveling along the laser beam path, encounters a series of partially reflective and partially transmissive surfaces 216a, 216b, 216c, 216d, 216e, 216f, and a final reflective surface 216g. For each surface a predetermined amount, e.g., power, of the laser beam 217 is reflected into the beam tubes. Thus, surface 216a reflects a predetermined amount of laser beam 217, as laser beam 217a into beam tube 230 and lens 218a, which focuses and launches the laser beam 217a into connector 207. The remaining laser beam 217 is transmitted through surface 216a and reaches surface 216b, where the reflecting and transmitting process is repeated. This occurs on down the line until the last surface 216g, which is completely reflective, reflects the remaining laser beam 217 into the beam tube 236, lens 218g and into the associated connector. Thus, surface 216b reflects a predetermined amount of laser beam 217, as laser beam 217b into beam tube 231 and lens 218b, which focuses and launches the laser beam 217b into connector 208. Surface 216c reflects a predetermined amount of laser beam 217, as laser beam 217c into beam tube 232 and lens 218c, which focuses and launches the laser beam 217c into connector 209. Surface 216d reflects a predetermined amount of laser beam 217, as laser beam 217d into beam tube 233 and lens 218d, which focuses and launches the laser beam 217d into connector 210. Surface 216e reflects a predetermined amount of laser beam 217, as laser beam 217e into beam tube 234 and lens 218e, which focuses and launches the laser beam 217e into connector 211. Surface 216f reflects a predetermined amount of laser beam 217, as laser beam 217f into beam tube 235 and lens 218f, which focuses and launches the laser beam 217f into connector 212.

The percentage reflectance of each surface can be determined so that the incoming laser beam is split into seven laser beams of even power, or different and predetermined powers. Thus, for example, a 141 kW incoming beam could be split into seven 20 kW beams (the one lost kW accounting for losses through the optical block and lenses, and is merely provide to identify that losses in the optical block and lens assemblies in the OSR occur, and should preferably be kept to a minimum. If not, cooling means for the optical block and lens assemblies will be needed). Additionally, surface 216g may be less than completely reflective, allowing for a sensor to be placed on its other side to monitor if beam 217 travels the entire length of the optical block 216. These sensors allow for the input beam parameters to be monitored. The umbilicals in this embodiment may be, for example, high power optical fibers in a metal tube ("FIMT"). The surfaces could also be reflective and transmissive based upon specific wavelengths. In this manner the optical block and the OSR could function as a beam combiner or a beam splitter, depending upon the direction of travel of the laser beams. This would also, in certain situation, permit one channel or beam to be not operational, while the others could still be operating.

Figure 3:
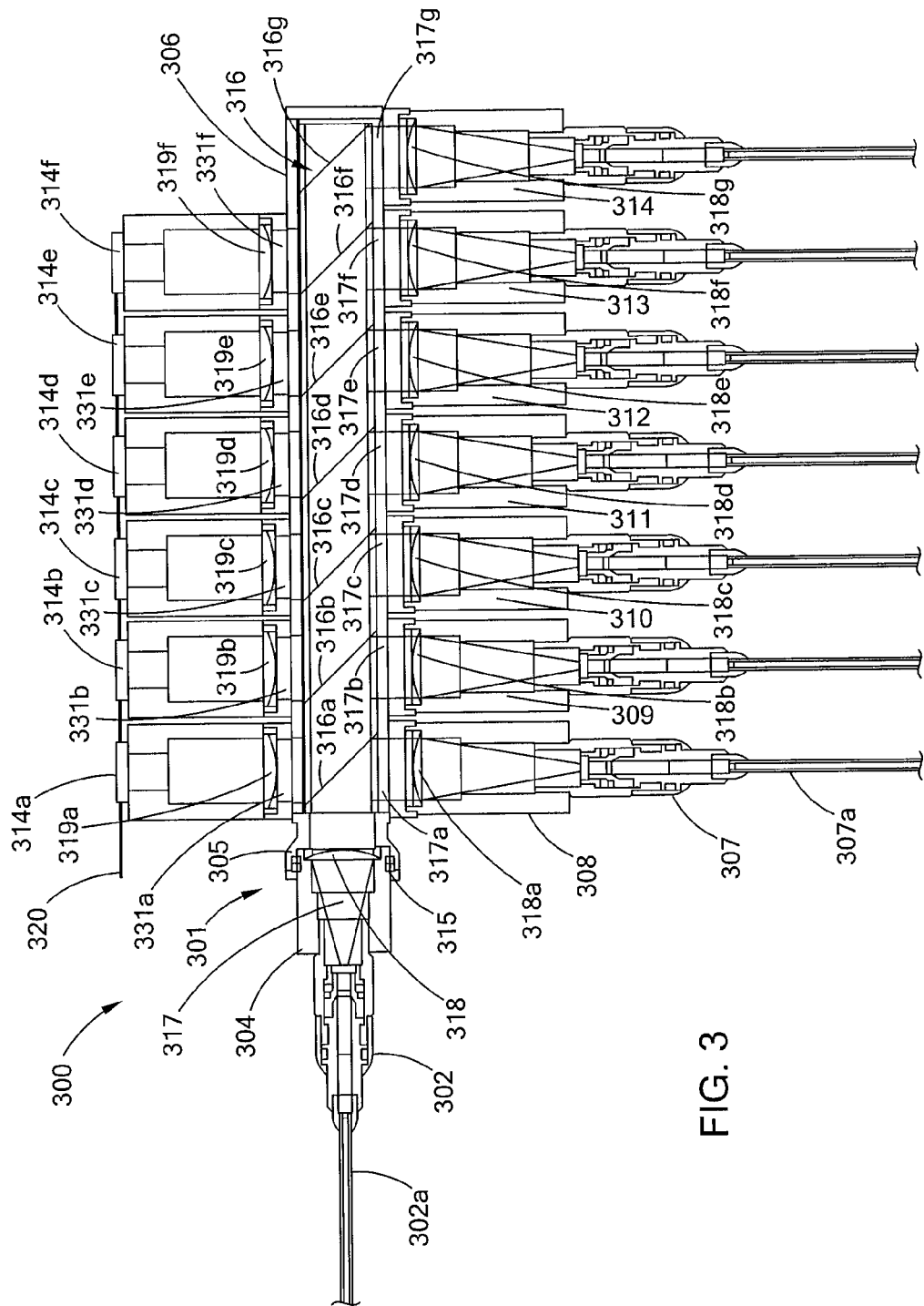
FIG. 3 is a cross sectional view of an embodiment of a rotational junction transmission device in accordance with the present inventions.

FIG. 3 is a cross sectional view of an embodiment of an OSR 300 that uses the splitting optical block concept of the embodiment of FIG. 2 to also provide for monitoring of back reflections and other information on a channel, i.e., split beam path, by channel basis. The OSR 300 that has a rotary junction 301 having a first housing 304 and a second housing 305. The first housing 304 has a high power connector 302. The second housing 305 is connected to a cover 306. The first housing and the second housing form rotation junction 301. In this manner the cover 306 section and the umbilical 302a section are rotatable with respect to each other. The cover has seven beam tubes, 308, 309, 310, 311, 312, 313, 314 optically and mechanically associated with it. Each beam tube has a high power connector, e.g., 307, respectively, associated with it, and each connector has a high power umbilical, e.g., 307a, respectively, associated with it.

The housings 304 and 305 (which form the rotation junction 301) have bearings 315. The laser beam 317 traveling along a laser beam path leaves the connector 302 and enters an optical element, e.g., collimating lens 318, and traveling in collimated space enters transmissive and reflective optical block assembly 316. Upon entering optical block assembly 316 the laser beam 317, traveling along the laser beam path, encounters a series of partially reflective and partially transmissive surfaces 316a, 316b, 316c, 316d, 316e, 316f, and a final reflective surface 316g. For each surface a predetermined amount, e.g., power, of the laser beam 317 is reflected into the beam tubes. Thus, surface 316a reflects a predetermined amount of laser beam 317, as laser beam 317a into beam tube 308 and lens 318a, which focuses and launches the laser beam 317a into connector 307. The remaining laser beam 317 is transmitted through surface 316a and reaches surface 316b, where the reflecting and transmitting process is repeated. This occurs on down the line until the last surface 316g, which is completely reflective, reflects the remaining laser beam 317 into the beam tube 314, lens 318g and into the connector. Thus, surface 316b reflects a predetermined amount of laser beam 317, as laser beam 317b into beam tube 309 and lens 318b, which focuses and launches the laser beam 317b into the connector. Surface 316c reflects a predetermined amount of laser beam 317, as laser beam 317c into beam tube 310 and lens 318c, which focuses and launches the laser beam 317c into the connector. Surface 316d reflects a predetermined amount of laser beam 317, as laser beam 317d into beam tube 311 and lens 318d, which focuses and launches the laser beam 317d into the connector. Surface 316e reflects a predetermined amount of laser beam 317, as laser beam 317e into beam tube 312 and lens 318e, which focuses and launches the laser beam 317e into the connector. Surface 316f reflects a predetermined amount of laser beam 317, as laser beam 317f into beam tube 313 and lens 318f, which focuses and launches the laser beam 317f into connector 313. The umbilicals in this embodiment may be, for example, high power optical fibers in a metal tube ("FIMT").

The reflective-transmissive surfaces, e.g., 316 provide the ability to have monitors, sensors and the like associated with them. Thus, for example, back reflections that are transmitted back up to the OSR by the umbilical would in be partially transmitted by the reflective surfaces 316a, 316b, 316c, 316d, 316e, 316f, and along monitoring beam paths 331a, 331b, 331c, 331d, 331e, 331f, respectively, through monitoring beam path optics, e.g., focusing lens, 319a, 319b, 319c, 319d, 319e, 319f, respectively, to sensors 314a, 314b, 314c, 314d, 314e, 314f respectively. Sensors are associated with data transmission assembly (e.g., optical, electric, or wireless) 320

In the embodiments of FIGS. 1, 2 and 3 seven umbilicals were used for illustrative purposes, and because that is the preferred number for packing in a circular configuration, based upon the size of the connector, e.g., one centered with six around it. Preferably a passively cooled connector of the type provided in U.S. Patent Application Publication No. 2013/0011102, the entire disclosure of which is incorporated herein by reference, can be used. The elimination of the water cooling lines simplifies the configuration of the system, increases reliability, and provides for potentially a smaller size OSR. Commercially available high power water cooled connectors may also be used. It should further be understood that more or less umbilicals may be used.

Figure 4:
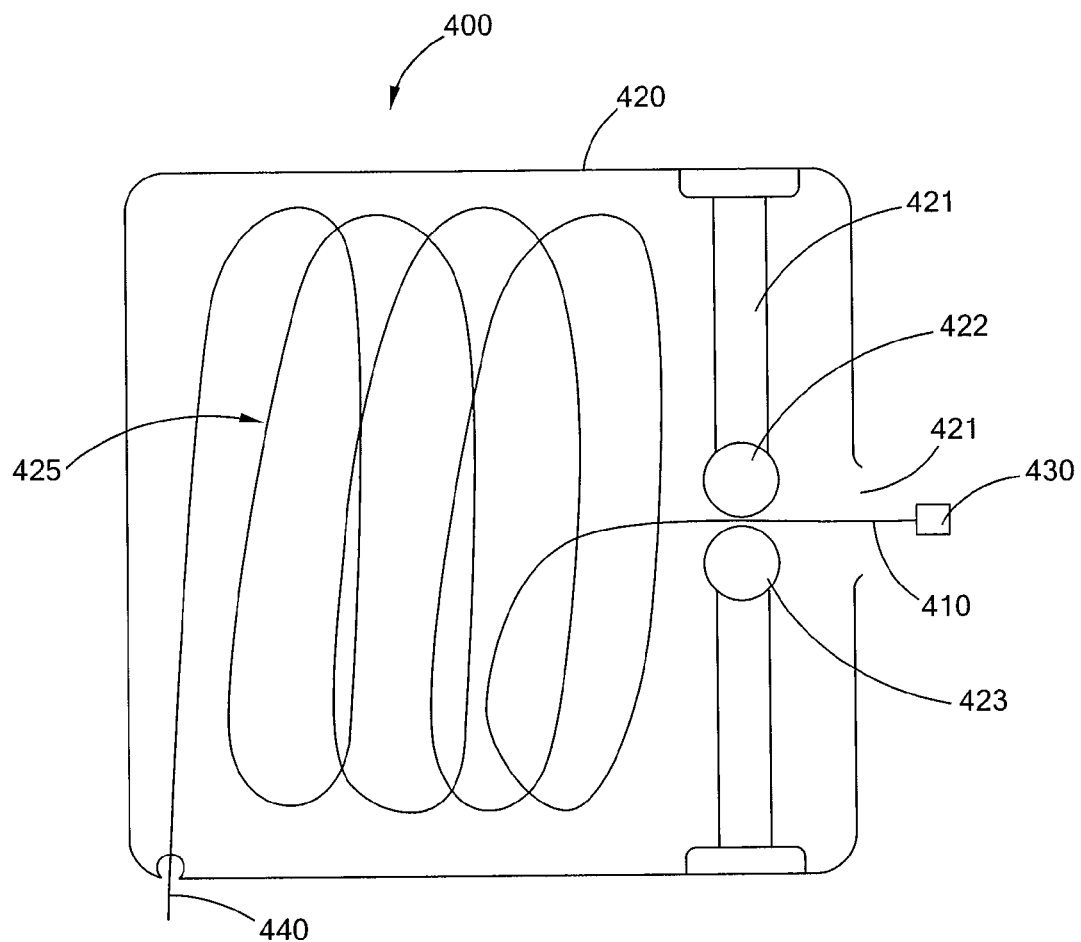
FIG. 4 is a schematic view of an embodiment of a rotational junction transmission device in accordance with the present inventions.

In FIG. 4 there is provided a conveyance structure handling apparatus 400 having a housing 420 and an opening 421. Apparatus 400 has an assembly 421 for winding and unwinding the high power conveyance structure 410. The assembly 421 has roller 422, 423. In this embodiment the structure is stored in a helix 425 that can be unwound and rewound as the tool is deployed and recovered. The distal end of the conveyance structure has a connecting apparatus 430, which could be a fiber that is fused to a fiber in a tool or other laser equipment, a fiber termination coupled to mechanical connecting means, a commercially available high power water cooled connecter, or more preferably a connector of the type provided in U.S. Patent Application Publication No. 2013/0011102, the entire disclosure of which is incorporated herein by reference. The proximal end 440 may be optically associated with a high power laser source. This type of device could be mounted with the laser as a modular system, an integrated system, a unified mobile system, or separate from and optically associable with a high power laser or laser cabin.

Figure 5:
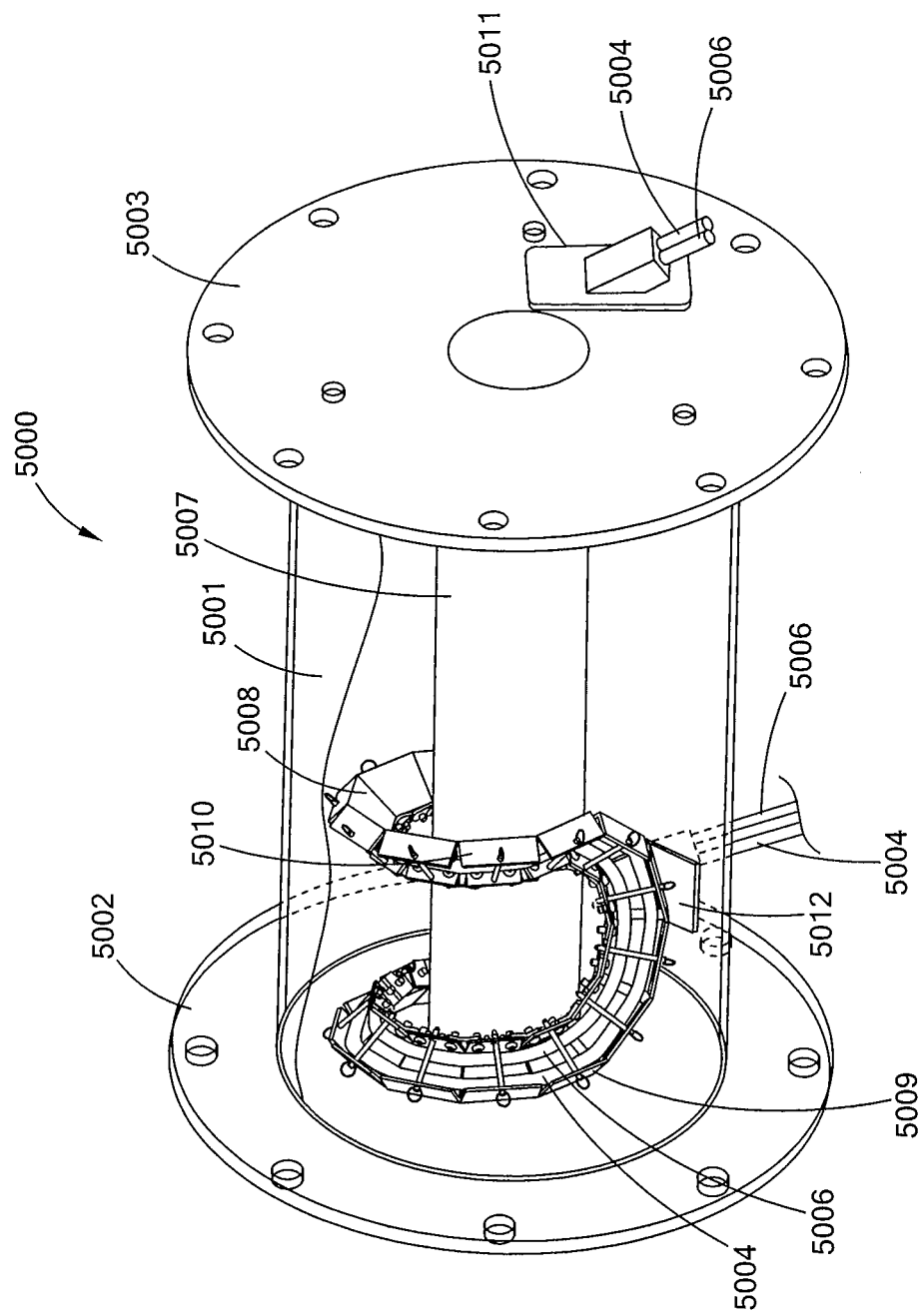
FIG. 5 is a perspective view of an embodiment of a rotational junction transmission device in accordance with the present inventions.

In FIG. 5 there is provided a prospective cutaway view of an embodiment of a wrapping type optical coupling rotation assembly ("ORCA"). In general, ORCAs enable the high power laser energy to be transmitted across a rotation junction without requiring the beam to be launched through free space, e.g., the laser beam can be transmitted across a rotating junction while remaining within the optical fiber or other total internal reflection optical transmission structure.

The ORCA 5000 has an outer housing 5001 that is affixed to plate 5002. An inner shaft member or central support 5007 is affixed to plate 5003. Two high power laser umbilicals 5004, 5006, e.g., optical fibers in protective outer coverings, enter plate 5003 through cable feed through assembly 5011. Plate 5003 and shaft 5007 rotate together and plate 5002 and outer housing 5001 rotate together. Inside of the outer housing 5001 and around shaft 5007 is wrap assembly section 5008. Wrap assembly section 5008 is made up of many links, e.g., 5009, 5010. There is also a second cable feed through 5012, 5001 and a second plate 5003.

Figure 5A:
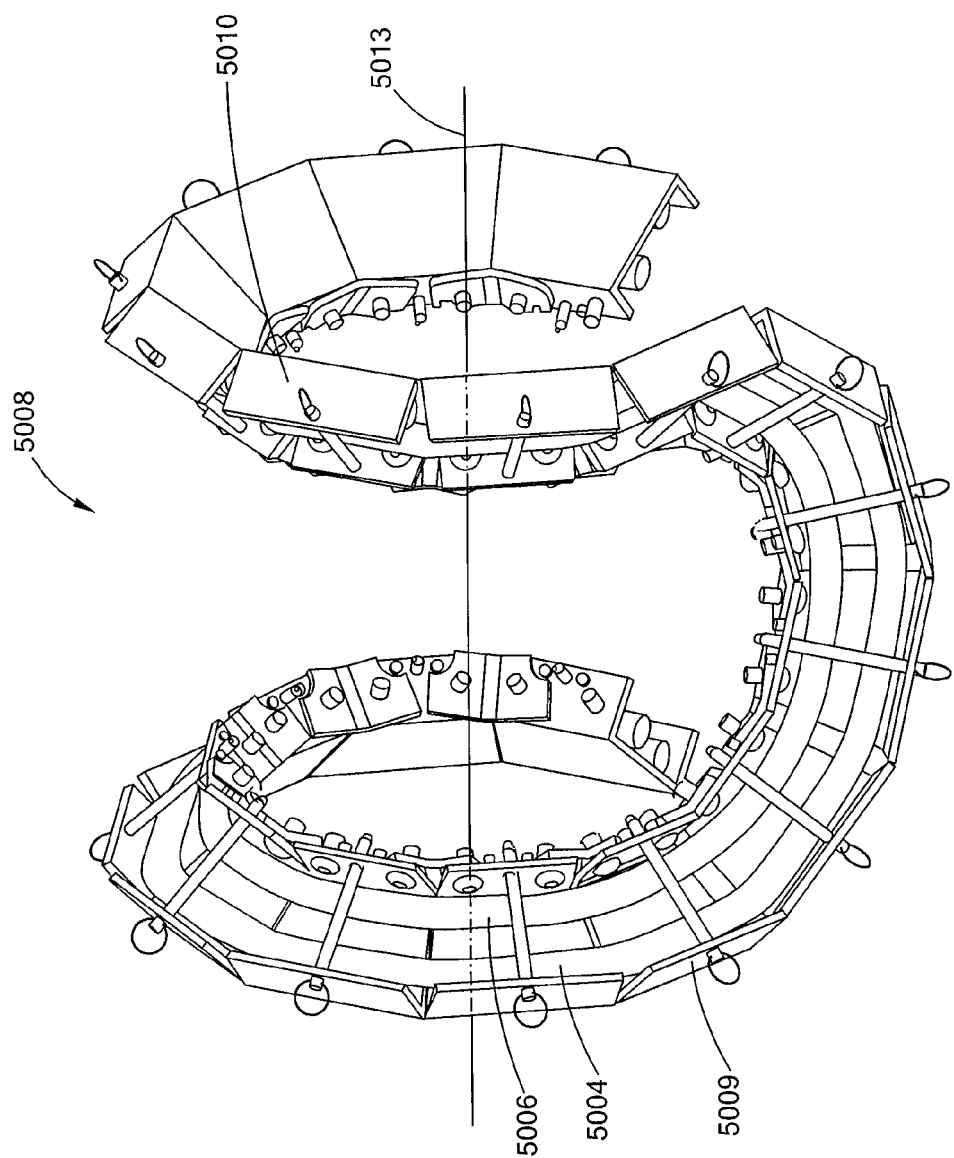
FIGS. 5A-5G are illustrations of the components of the embodiment of FIG. 5.
Figure 5B:
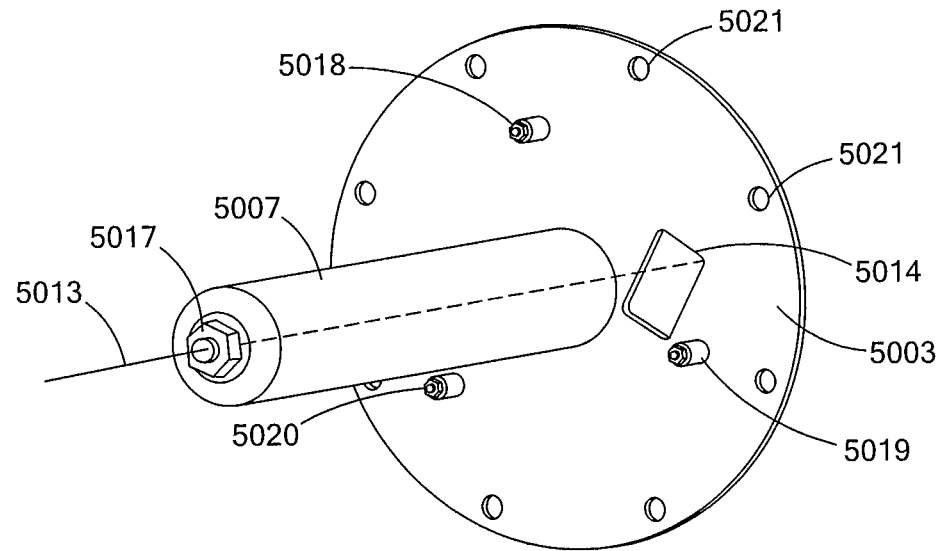
Figure 5C:
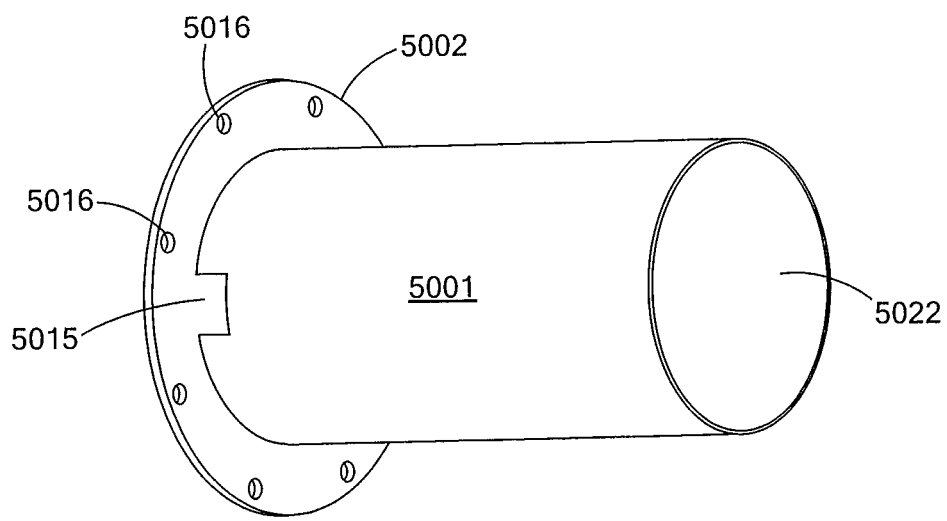
Figure 5E:
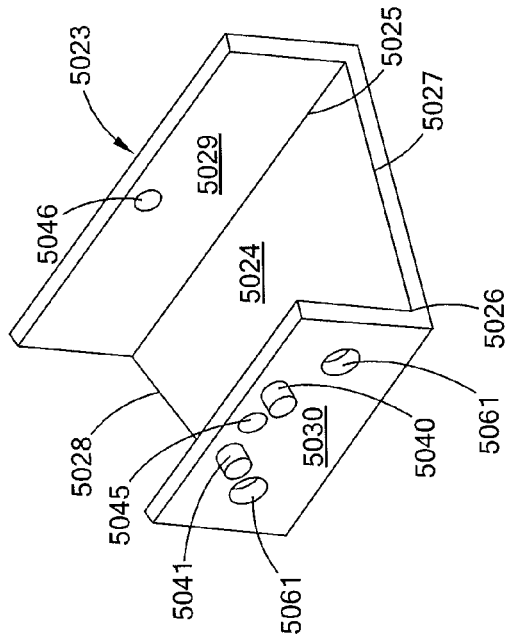
Figure 5G:
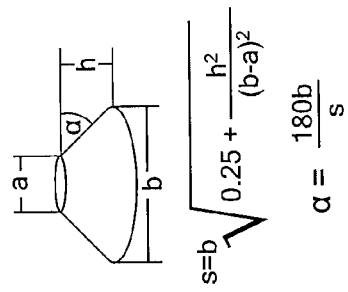
Figure 5D:
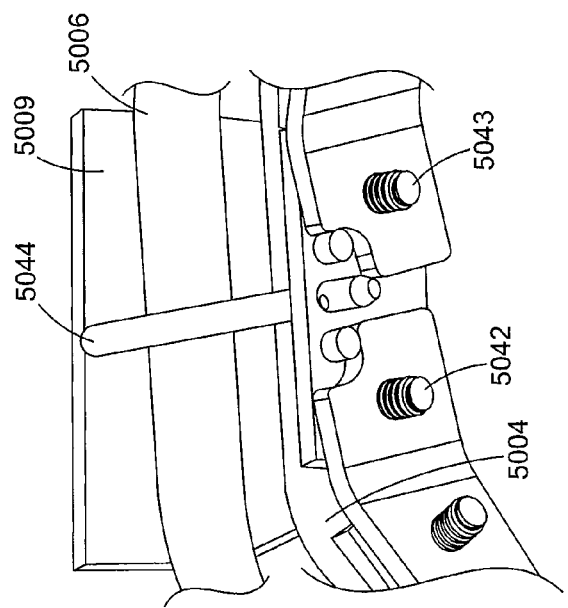
Figure 5F:
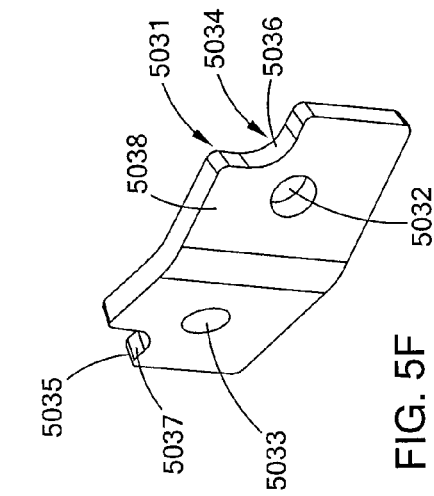

In FIG. 5A there is shown a perspective view of the wrap assembly section 5008, and the center axis 5013 around which the wrap is positioned. One, two, three, four or more of these wrap sections may be joined together in this embodiment of an ORCA to provide for a greater number of revolutions, and thus, longer deployment distance from an associated umbilical real. In FIGS. 5B and 5C there are shown the two rotating components of the ORCA 5000. The plate-shaft assembly 5003-5007 are shown with respect to the axis 5013. On the inner surface of plate 5003 there are PTFE (Teflon®) bearings 5018, 5019, 5020. These bearings engage the inner surface 5022 of outer housing 5001 and provide for smooth rotation. Bolt 5017 holds assembly 5003-5007 axially in place with respect to assembly 5001-5002, while still allowing relative rotation between 5007 and 5002. Bolt holes, e.g., 5021 are provided for attaching the ORCA, and in particular the rotation assembly 5003-5007 to a reel having the deployment umbilical. The plate-outer housing assembly 5002-5001 has bolt holes 5016 to affix the assembly and manage reaction torque as the components are rotated. Turning to FIGS. 5D, 5E and 5F there are provided perspective view of the linkages in the wrap section, and a diagram showing their preferred geometry. The link 5009, is shown with umbilicals 5004, 5006 positioned in the link. The link 5009 forms a trapezoidal tray 5023 that holds the fibers and other cables or conveyance structures. Base 2024 has a long side wall 5025 and a short side wall 5030, which are connected to the base 5024 short side 5026 and the base 5024 long side 5025 respectively. The tray 5023 has angled sides 5027, 5027 for connecting to an adjacent link. FIG. 5G provides a diagram and formula for determining an example of the shape of the tray and its angled sides. During operation, a multitude of trapezoidal trays 5023 form an approximation of a conical frustrum. The geometry of the frustrum in addition to other parameters, predetermines the minimum bend radius that the umbilicals 5004 and 5006 will experience during operation. One, two, three, four or more of these conical frustrum wrap sections may be joined together in this embodiment of an ORCA to provide for a greater number of revolutions, and thus, longer deployment distance from an associated umbilical real.

The short side wall 5030 has pins 5041, 5040 and holes 5060, 5061. These holes and pins are used to connect the tray 5023 to connecting hinge plate 5031. Bolts 5042, 5043 extend through holes 5032, 5061 and 5033, 5061 when the hinge is positioned with links (see FIG. 5D). Holes 5045 and 5046 are used to hold tie down bar 5044. Hinge plate 5031 has a first arcuate cut out 5034, and a second arcuate cut out 5035, which function with pins 5041, 5040. Surface 5036, 5037 of arcuate cut outs 5034, 5035, engage the pins, e.g., 5041, 5040.

Self-aligning high power OSRs overcome the problems of contamination, e.g., dirt in the high power laser beam path, that can occur when adjustments are made, and in particular when adjustments are made in the field. Further, adjustment mechanisms, because they are adjustable, by their nature go out of adjustment over time and with use, which can be problematic in high power regimes. For example, a 20 kW laser beam that moves out of alignment by only a few microns can destroy the entire OSR. Thus, these self-aligning embodiments overcome these problems. (ORCAs also overcome these problems, because the beam is kept contained in the optical fiber through the rotation junction.) By self-aligning it is meant that the optical components are configured in the OSR such that no adjustment mechanisms are necessary after the OSR has been assembled and sealed. Thus, as assembled in the OSR the optical components are aligned to transmit high power laser energy, e.g., 10 kW, 20 kW, 50 kW or more, across the free space of a rotation junction. During use and through multiple revolutions in one direction of rotation and then in the other, and under environment conditions and vibrations, the optical components remain aligned, without the need for adjustment.

Thus, for example, an self aligning OSR may have the following operating parameters of Table I (below) and remain self aligning over that entire range of parameters.

| | |
|---|---|
| Max Laser power | 20 kW |
| Wavelength | 1060-1080 nm |
| NA | .2-.24 |
| Max loss | 2% |
| Max operational vibration | 5G rms |
| Shock | 9G |
| Temperature | 0-140 F. |
| Humidity | 0-100% |

Figure 6A:
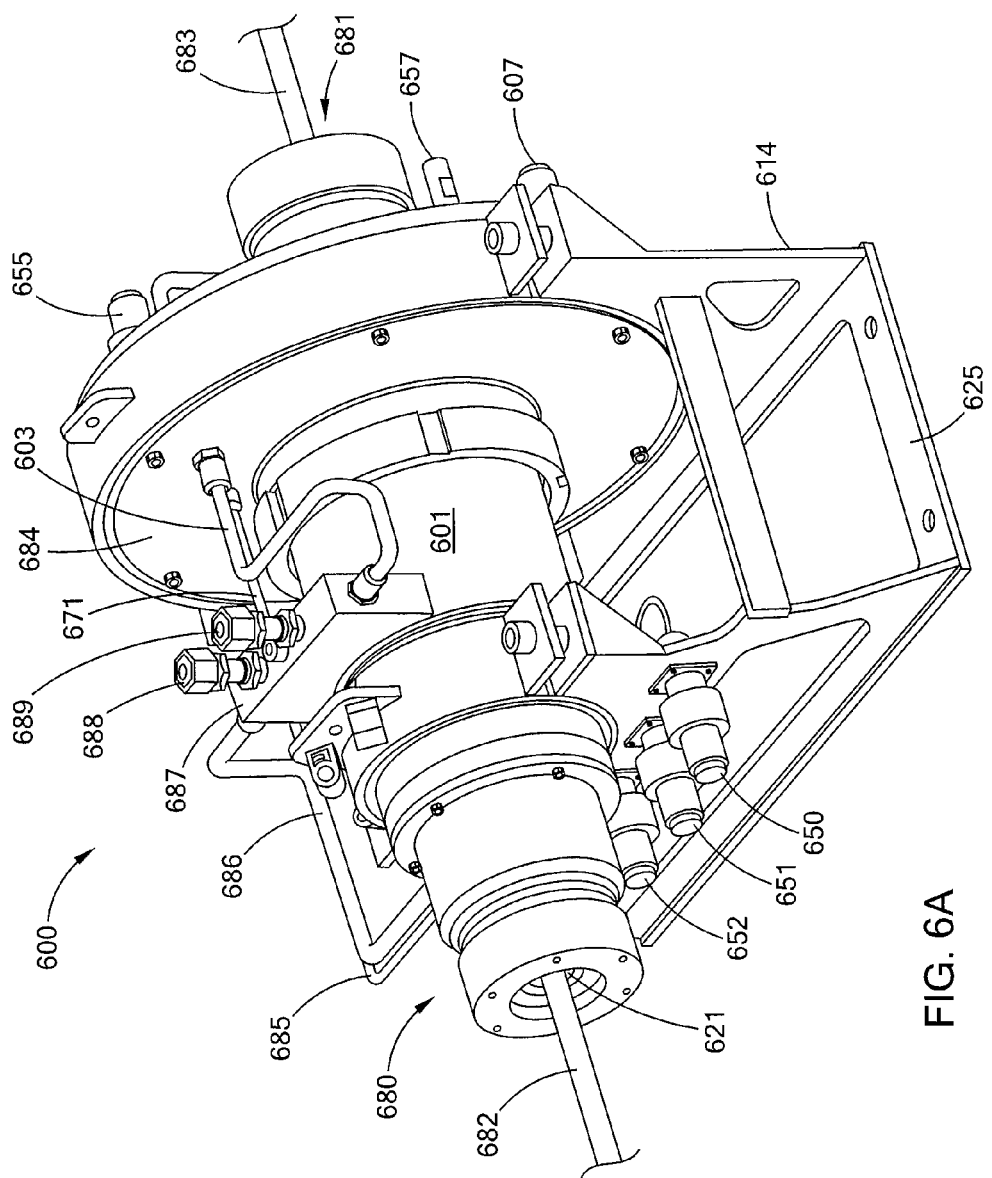
FIGS. 6A & 6B are perspective views of an embodiment of a rotational junction transmission device in accordance with the present inventions.
Figure 6B:
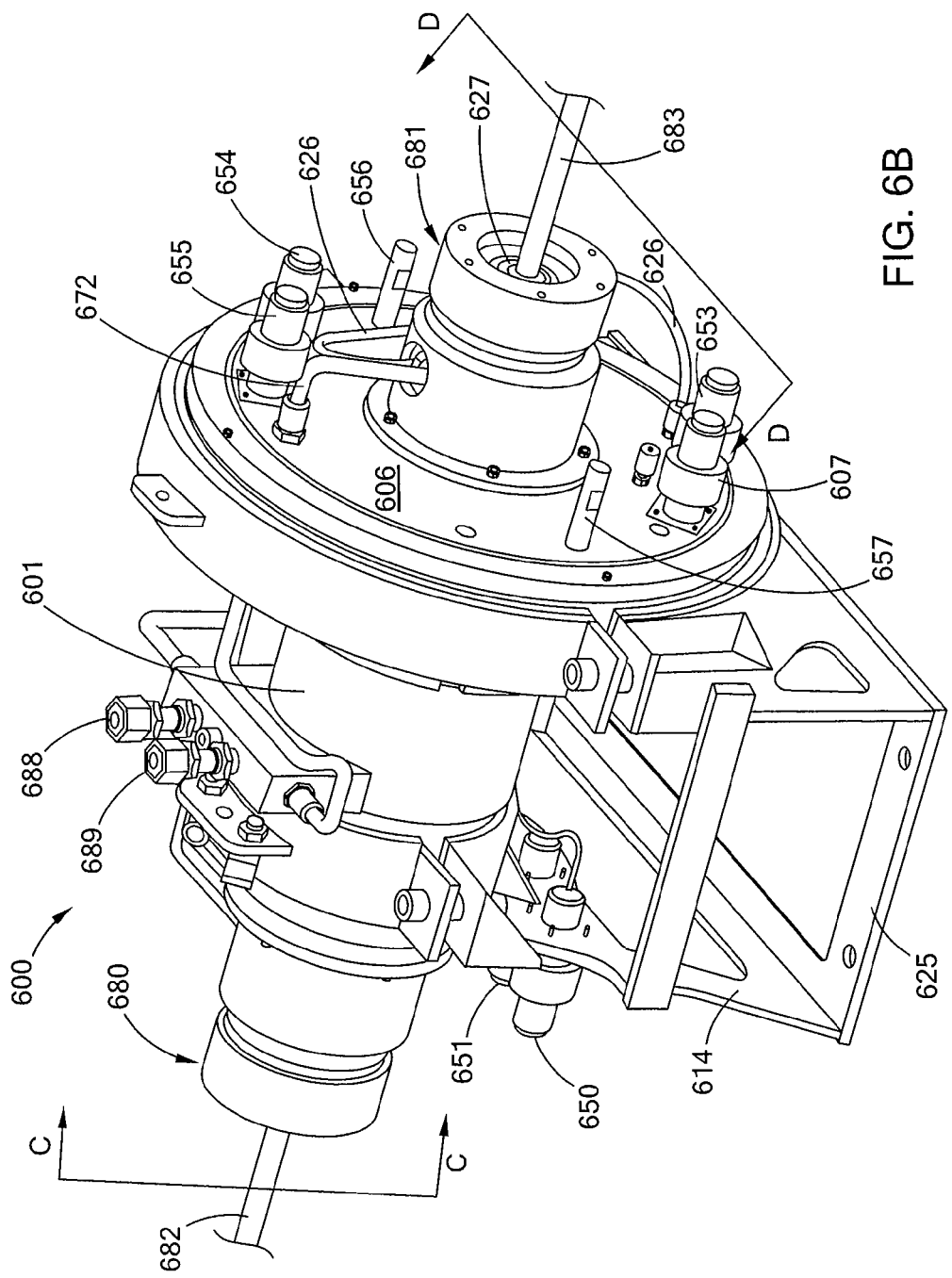

Turning to FIGS. 6A and 6B there is provided an embodiment of a self-aligning high power OSR 600, having optical assembly 680 for receiving the high power laser beam from the laser, and optics assembly 681 which rotates and launches the high power laser beam from the OSR 600. Optics assembly 680 has an umbilical, e.g., shielded optical fiber 682 and an associated strain relief clamp 621. Optical assembly 681 has an umbilical, e.g., shielded optical fiber 683 and an associated strain relief clamp 627. Housing 601 has a first end that is attached to back plate 613 having a back plate surface 684 and a second end that is attached to optics assembly 680. The housing 601 is attached to and supported by frame 614 of base 625. Back plate 684 and housing 601 are fixed to base 625, which preferably does not rotate. Front plate 606 rotates. The OSR has cooling lines 685, 686, 671, 626, 672, 603, electric lines, e.g., 617 electrical or sensor inputs or connectors 650, 651, 652, (the fourth connector 652a is obscured from view in FIG. 6A), electrical or sensor outputs or connectors 607, 653, 655, 654, as well as, pins 657, 656, (which can be used to engage a reel) and ports 688, 689, which are associated with a manifold 687.

Further, thermal lensing affects may be avoided by using materials such as Suprasil.

Figure 6C:
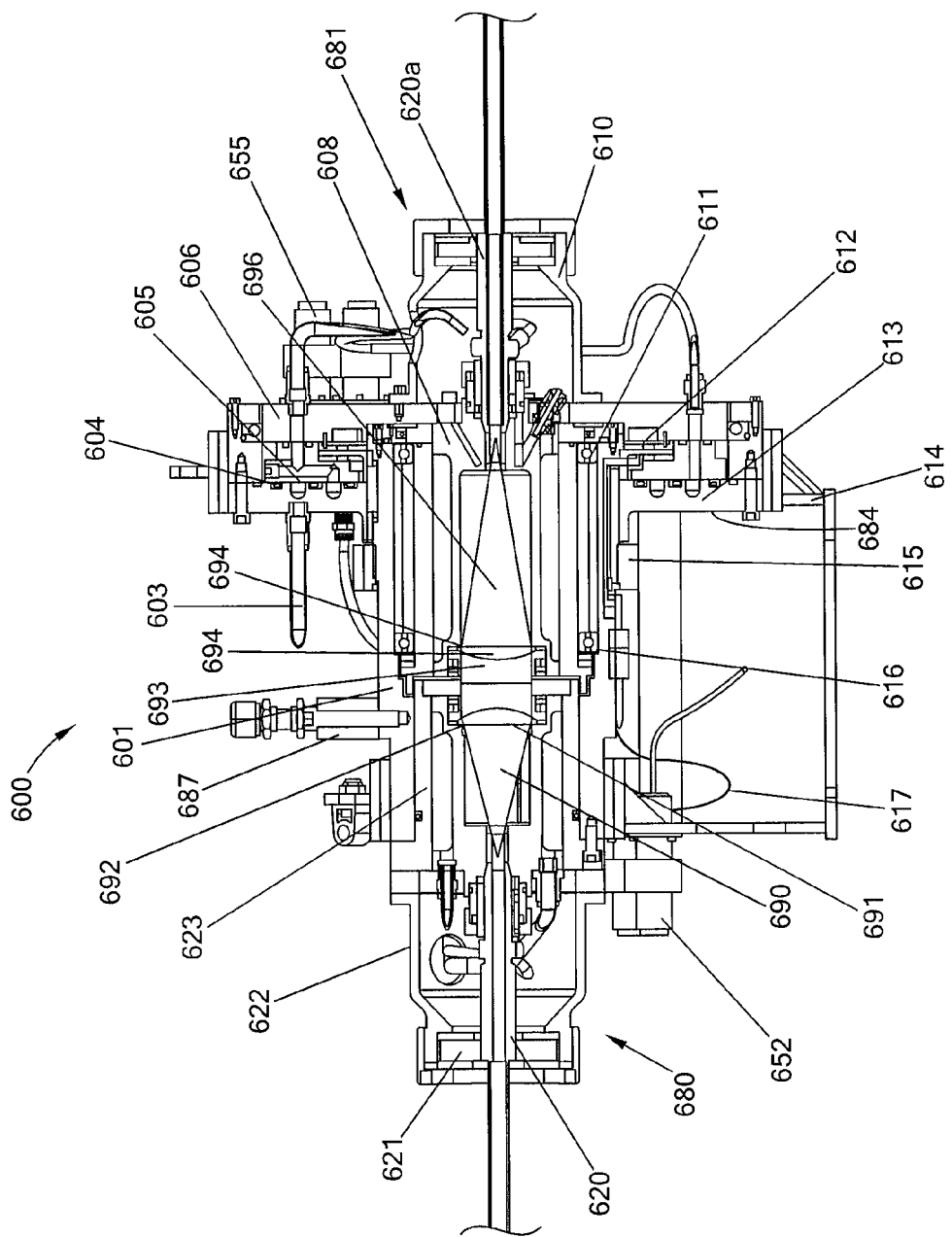
FIGS. 6C & 6D are cross sectional view of the embodiment of FIGS. 6A and 6B.
Figure 6D:
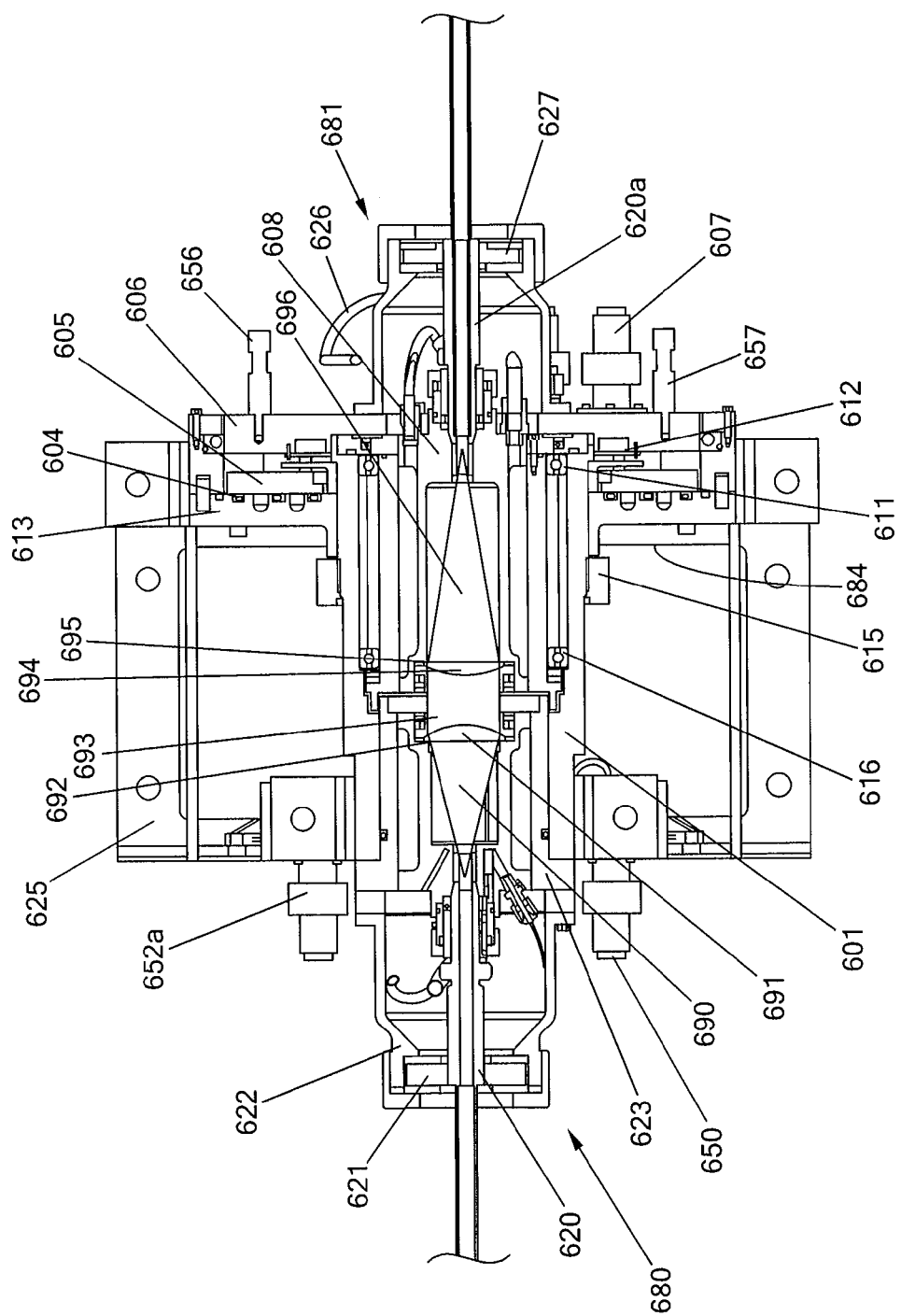

Turning to FIGS. 6C and 6D there are provided cross sectional views of OSR 600 along lines C-C and D-D of FIG. 6B, respectively. Thus, the OSR has a housing 601 that is fixed to back plate 684. The other, i.e., non-high power, slip ring components, such as electrical, data, fluid, are positioned on the interior of back plate 684 and between back plate 684 and rotating plate 606. Thus contained in the area between the back plate 684 and the rotating plate 606 are an electrical slip ring 612, a rotating plate 605 for a fluid slip ring and a stationary plate 613 that together make up a fluid slip ring.

The main rotary plate 606 has a preload nut 615, and bearings 616, 611, which are on an optical tube body 608 connected to the rotary plate 606. A rotary seal 604 is provided for the fluid slip ring.

The path of the laser beam through the OSR and the rotation junction is as follows. A fiber connector 620 is optically associated with fiber 682 and is positioned in body 623 of optics assembly 680. A strain relief housing 622 surrounds a portion of the connector 620. The fiber connector 620 launches high power laser beam 690 along a beam path toward non-rotating optic 692. Optic 692 collimates the laser beam and launches the collimated beam 693 across the rotational junction and to the rotating optic 694, which focuses the laser beam 696 into the receiving fiber connector 620a that is in optical tube body 608 of rotating optics assembly 681. Ledges 692 and 695 hold optics 692 and 694 respectively.

Figure 6E:
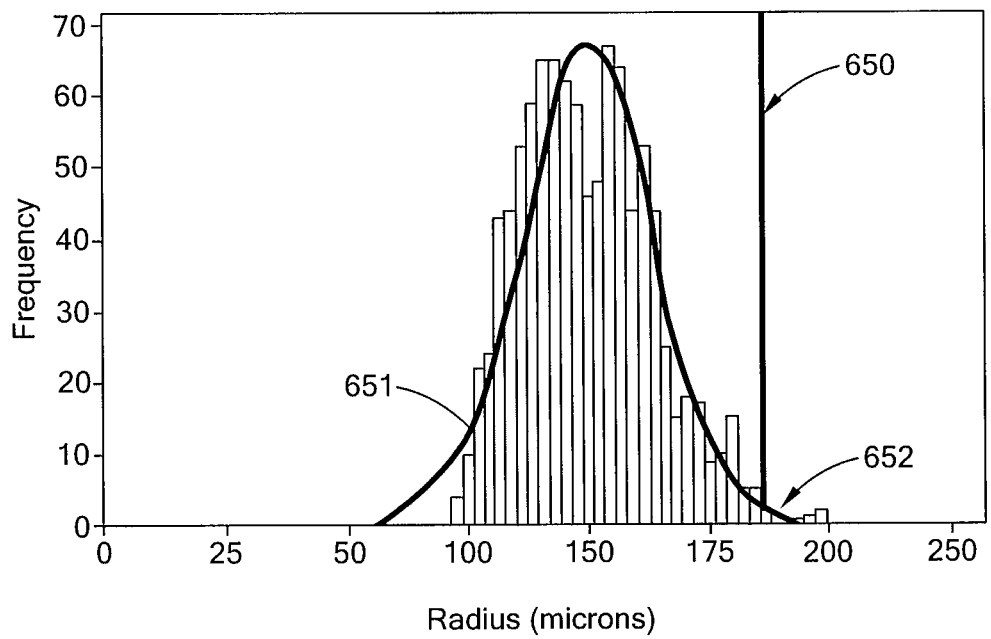
FIG. 6E is a histogram of an embodiment of a self-adjusting optical slip ring of the present inventions.

To obtain a self-aligning OSR all key tolerances in the system must be analyzed, and optimized, to provide for the laser beam 696 to be targeted in correct location and within a predetermined acceptable limit. These tolerances include, for example, mechanical component manufacturing tolerances, optical component tolerances, worst case NA, worst case thermal effects, worst case vibration effects, and others. These tolerances are then evaluated under a Monte Carlo analysis, and as seen in FIG. 6E provide distribution curve 651 of likely spot size variability. A predetermined point is selected 650 at which a remainder 652 of variability is acceptable. As long as the total system remains below line 650 the OSR will be self-aligning. Thus, for example, line 650 represents the receiving fiber Ø, and the amount of the curve to the right of 650 is the risk of the OSR not working.

Figure 7:
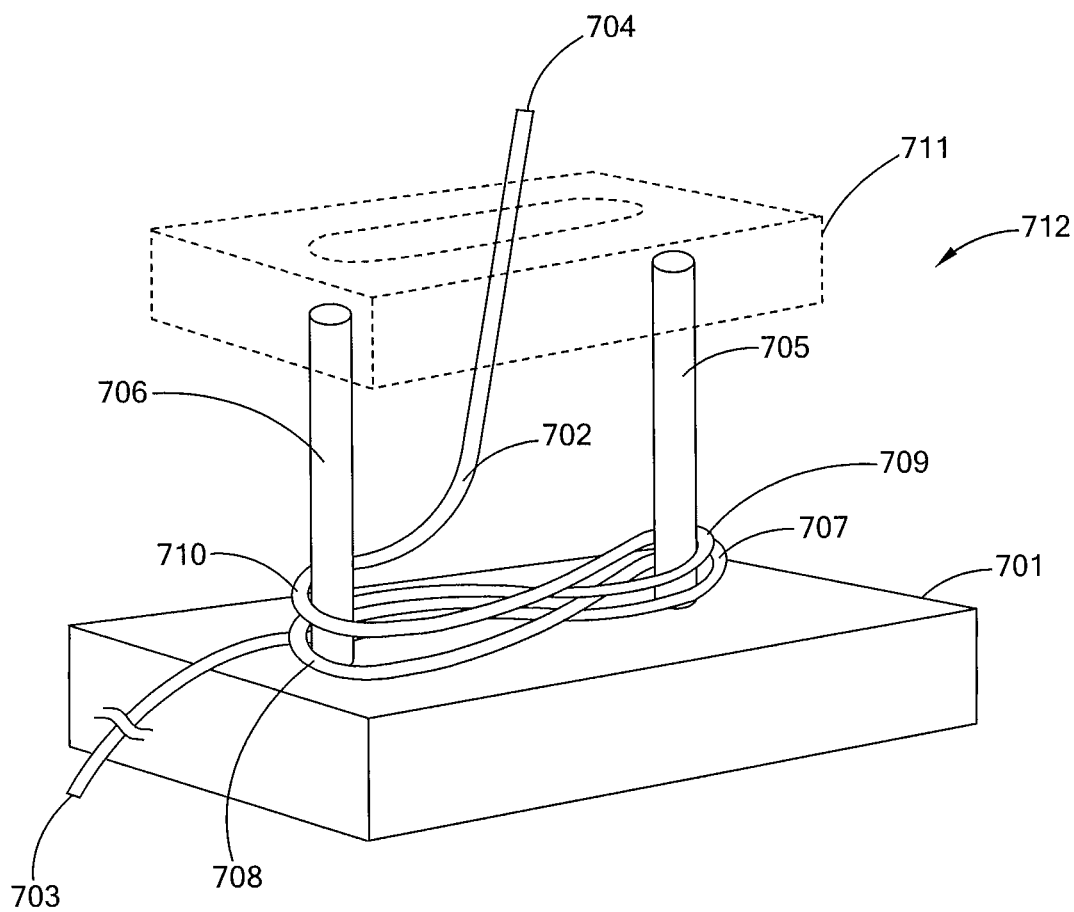
FIG. 7 is a perspective view of an embodiment of a rotational junction transmission device in accordance with the present inventions.
Figure 8:
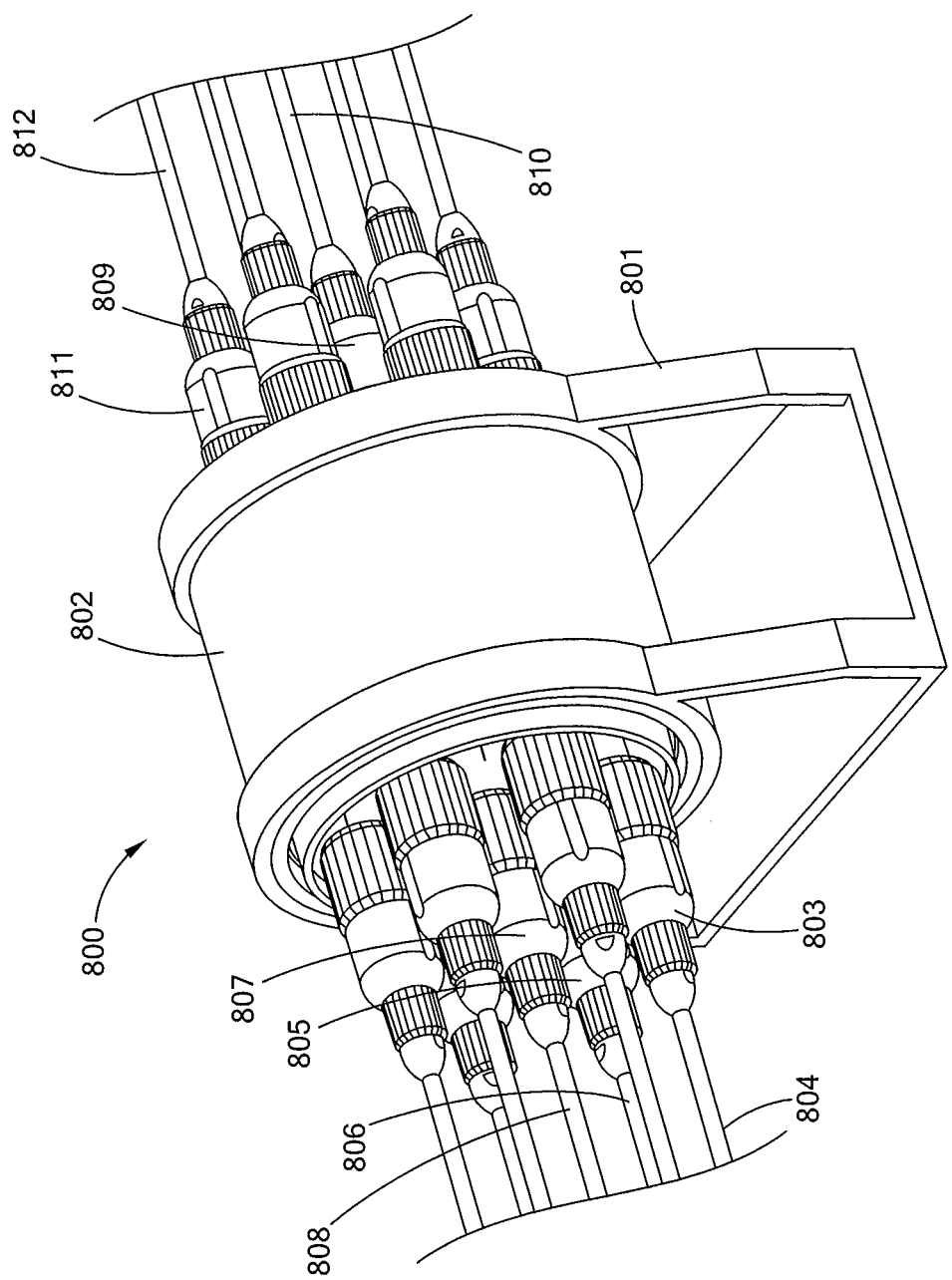
FIG. 8 is a perspective view of an embodiment of a rotational junction transmission device in accordance with the present inventions.

In FIG. 7 there is provided an embodiment of a handling apparatus that is configured to provide figure-8 looped wraps. This configuration does not require an optical slip ring and does not place twist in the conveyance structure. Thus, in FIG. 7 there is provided a figure-8 looping apparatus 712 having a base 701. The base has two wrapping posts 705, 706. The umbilical, e.g., a conveyance structure 702 has a proximal end 703, which may be connected to a high power laser or laser cabin, and a distal end 704, which is paid out and may be associated with a laser tool. As shown in FIG. 7, the conveyance structure is formed into several figure-8 loops, one located above the next. Thus, for purpose of illustration, four such loops are shown: a first loop 707 which is lowest and adjacent the base 701; a second loop 708, which is generally above the first loop 707, a third loop 709, which is generally above the second loop 708, and a fourth loop 710, which is generally above the third loop 709. Although four loops are shown, it is understood that for a conveyance structure a km or longer, many more, hundreds and potentially thousands, of such figure-8 loops will be present.

Figure 8A:
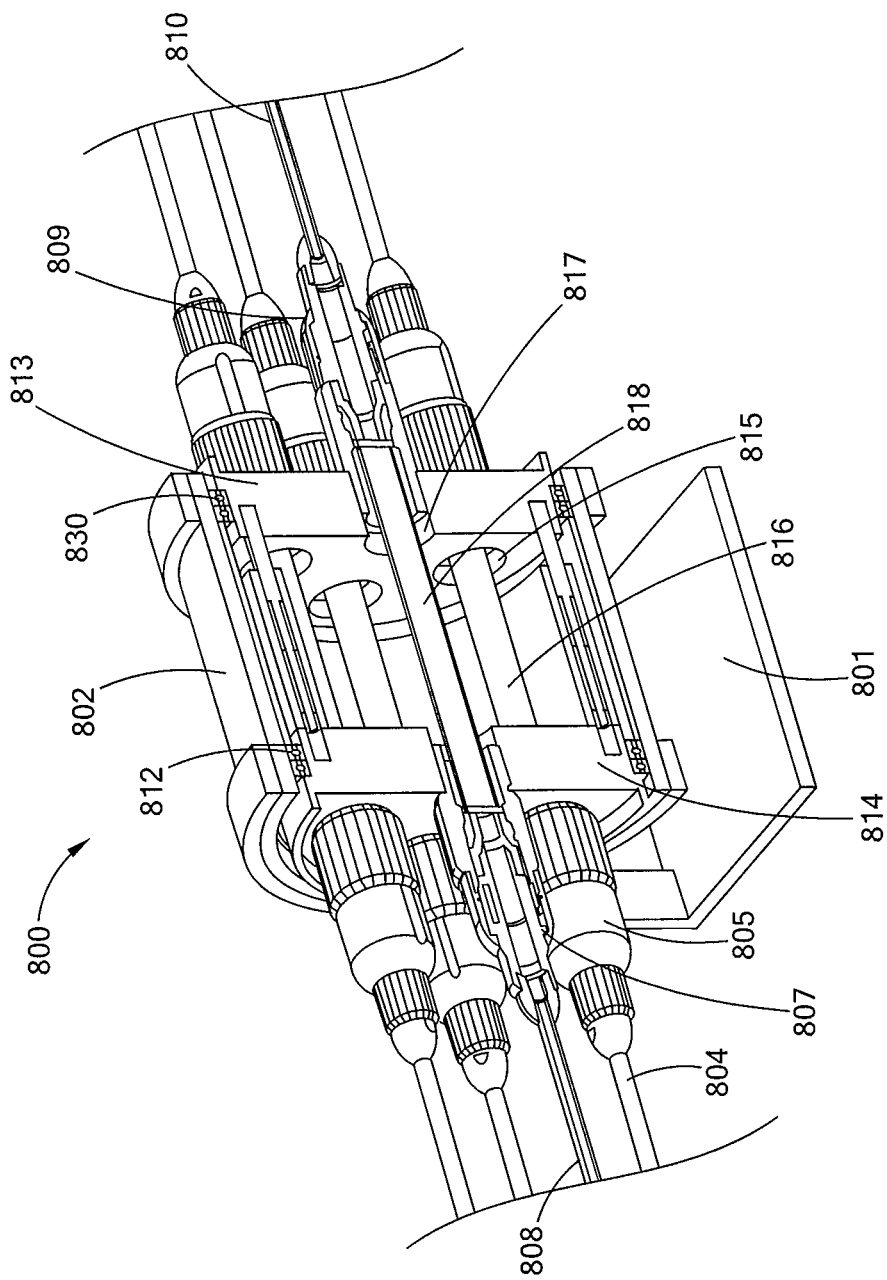
FIG. 8A is a cross section of the embodiment of FIG. 8

In FIG. 8 there is provided a perspective view of a ratchet type optical transmission system 800 for transmitting laser energy across a rotation junction. One one side of the drum 802 there are seven connectors, e.g., 803, 805, 807, that have high power optical fibers e.g., 808, 806, 804 associated with them. On the other side of drum 802 are also seven connectors, e.g., 809, 811, that have high power laser fibers, e.g., 810, 812 associated with them. Turning to FIG. 8A, which shows a cross section of the transmission device 800, two rotating discs 813, 814, are positioned within the drum 802 and supported by bearing assemblies 830, 812. The drum 802 is held by support 801.

In operation the laser beams are fired and travel along laser beam paths, e.g., 818, 816 that travel through openings, e.g., 815, 817 in the disks. In operation disks 814 and 813 rotate together as the laser beams are fired, when the disks have rotated to a point where the twisting of the fibers is at a predetermined maximum, the outer lasers, e.g., 816, are shut off, and the disks whose fibers are attached to the laser (or other non-rotating component of the system) is rotated in the reverse direction to relieve the stress from twisting. When the reverse rotation is taking place, the other disk can continue to rotate in a forward direction, additionally the center laser beam 817 can continue to be fired. Once the twisting stress has been released, the two disks can then rotate together with all lasers firing.

Figure 9:
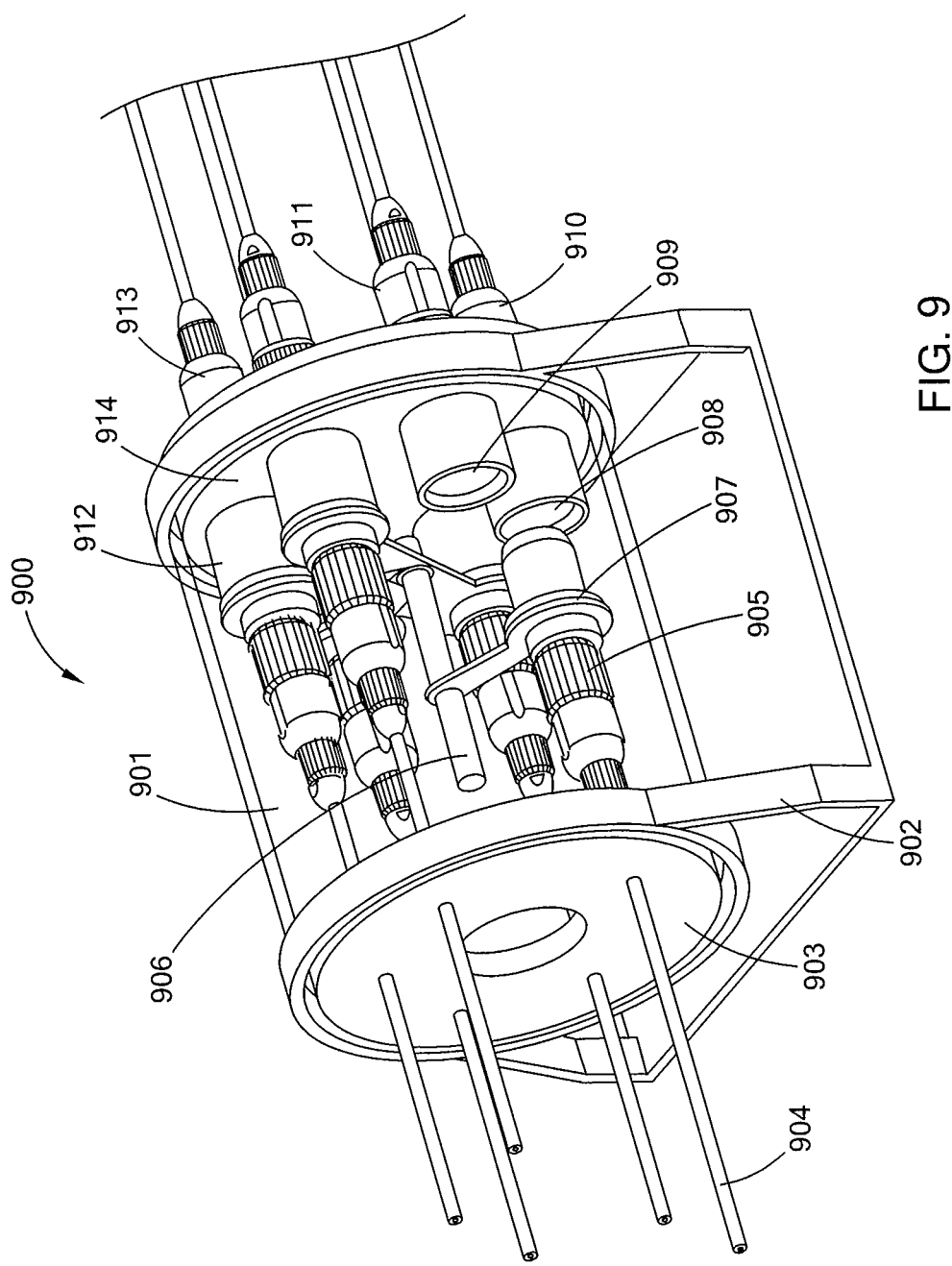
FIG. 9 is a cut away perspective view of an embodiment of a rotational junction transmission device in accordance with the present inventions.
Figure 9A:
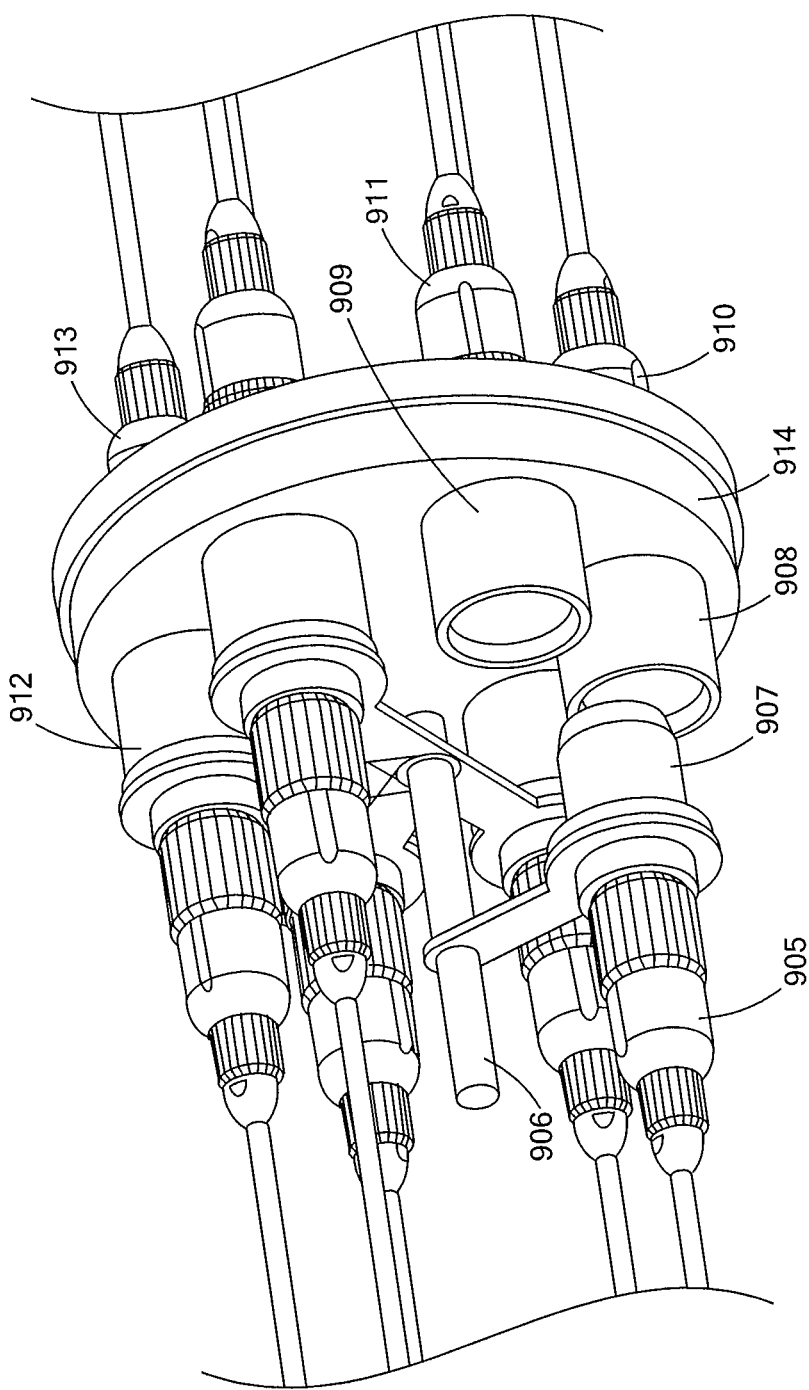
FIG. 9A is a perspective view of a component of the embodiment of FIG. 9.

Turning to FIG. 9 there is shown a cutaway perspective view of a ratchet type optical transmission system 900 for transmitting laser energy across a rotation junction. The system 900 has frame 902 that supports a non-rotating disc 903 and a rotating disc 914. Disc 903 has five fibers and connectors, e.g., 904, 905 associated with it. Disc 914, which rotates, has six optical fibers and connectors, e.g., 911, 913, 910 associated with it, and a receptacle 908, 909, 912 associated with each. In operation as disc 914 rotates the mechanism 906 will move socket 907, having a connector 905 from one receptacle 908 to an adjacent receptacle 909. During the movement of the socket the laser beam for that particular connector will have to be turned off, leaving the other four lasers to be fired. This process can then be repeated over again in a step wise operation where at least four laser beams are always firing as the rotation disc 914 is rotated. FIG. 9A is a detailed perspective view of the ratchet mechanism without the frame 902 and non-rotating disc 903.

Generally the reels that may be used with the rotational junction transmission devices can be for example any reel that has a laser umbilical wound around its axle or central hub so that the umbilical is capable of being unwound, e.g., deployed, from the reel and wound onto the reel, e.g., retrieved. The umbilicals may have lengths of greater than about 0.5 km, about 1 km, about 2 km, about 3 km and greater and may have: a core; a cladding; a coating; a first protective layer; and, a second protective layer as well as other passages and wires. The umbilicals may be capable of transmitting high power laser energy for its length with a power loss of less than about 2 dB/km and more preferably less than about 1 dB/km and still more preferably less than about 0.5 dB/km and yet more preferably about 0.3 dB/km. The outer diameter of the reel when wound is preferably less than about 6 m (meters) to facilitate transporting of the spool by truck.

Figure 11:
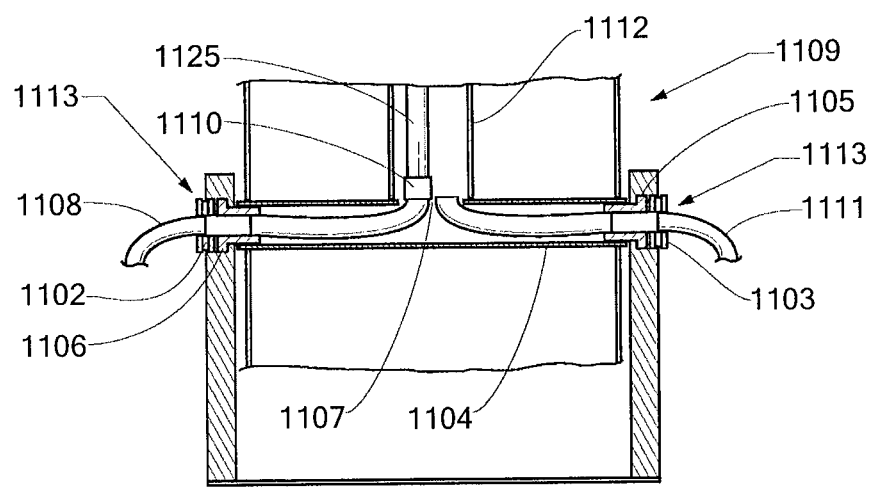
FIG. 11 is a cross sectional view of an embodiment of a rotational junction transmission device in accordance with the present inventions.

An embodiment of an OSR incorporated into the hollow axle of a spool has the spool in a configuration that has a hollow central axis, or such an axis is associated with the spool, where the optical power is transmitted to the input end of the optical fiber, e.g., as shown in FIG. 11. The beam will be launched down the center of the spool, the spool rides on precision bearings in either a horizontal or vertical orientation to prevent any tilt of the spool as the fiber is spooled out. It is optimal for the axis of the spool to maintain an angular tolerance of about +/−10 micro-radians, which is preferably obtained by having the optical axis isolated and/or independent from the spool axis of rotation. The beam when launched into the fiber is launched by a lens which is rotating with the fiber at the Fourier Transform plane of the launch lens, which is insensitive to movement in the position of the lens with respect the laser beam, but sensitive to the tilt of the incoming laser beam. The beam, which is launched in the fiber, is launched by a lens that is stationary with respect to the fiber at the Fourier Transform plane of the launch lens, which is insensitive to movement of the fiber with respect to the launch lens. The spool's outer plate may be mounted to the spool support using a Delrin plate, while the inner plate floats on the spool and pins rotate the assembly. The optical fiber slip ring is attached to the stationary fiber, and communicates power across the rotating spool hub to the rotating fiber.

A general type of spool embodiment is to use a stationary spool similar to a creel and rotate the distal end of the structure or the laser tool attached to the distal end of the fiber in the structure, as the conveyance structure spools out to keep the conveyance structure and thus the fiber from twisting as it is extracted from the spool. The fiber can be designed to accept a reasonable amount of twist along its length. Using this type of the approach if the conveyance structure, and thus, the fiber could be pre-twisted around the spool then as the conveyance structure and the fiber are extracted from the spool, the conveyance structure straightens out and there is no need for the fiber and in particular its distal end to be rotated as the conveyance structure is paid out. There may be a series of tensioners that can suspend the fiber down the hole, or if the hole is filled with water to extract the debris from the bottom of the hole, then the fiber can be encased in a buoyant casing that will support the weight of the fiber and its casing the entire length of the hole. In the situation where the distal end does not rotate and the fiber is twisted and placed under twisting strain, there will be the further benefit of reducing SBS.

Figure 10:
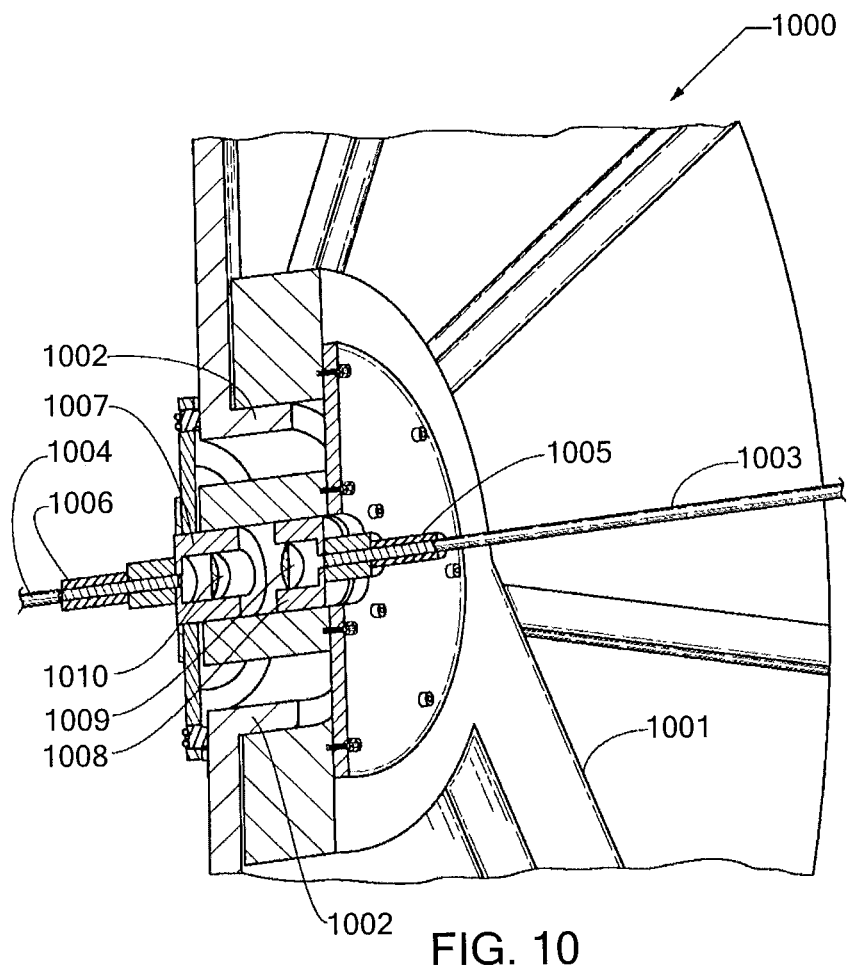
FIG. 10 is a perspective view of an embodiment of a rotational junction transmission device in accordance with the present inventions.

A further illustration of an optical connection for a rotation spool is provided in FIG. 10, wherein there is illustrated a spool 1000 and a support 1001 for the spool 1000. The spool 1000 is rotatable mounted to the support 1001 by load bearing bearings 1002. An input optical cable 1003, which transmits a laser beam from a laser source (not shown in this figure) to an optical coupler 1005. The laser beam exits the connector 1005 and passes through optics 1009 and 1010 into optical coupler 1006, which is optically connected to an output optical cable 1004. The optical coupler 1005 is mounted to the spool by a preferably non-load bearing 1008 (e.g., the bearing 1008 is not carrying, or is isolated or at least partially isolated from, the weight of the spool assembly), while coupler 1006 is mounted to the spool by device 1007 in a manner that provides for its rotation with the spool. In this way as the spool is rotated, the weight of the spool and coiled tubing is supported by the load bearing bearings 1002, while the rotatable optical coupling assembly allows the laser beam to be transmitted from cable 1003 which does not rotate to cable 1004 which rotates with the spool.

A cross sectional view of an embodiment of a rotational junction transmission device used with a spool of coiled tubing 1109 is shown in FIG. 11. The device has two rotating coupling assemblies 1113. One of said coupling assemblies has an optical rotating coupling assemblies 1102 and the other has a fluid rotating coupling assemblies 1103. The optical rotating coupling assemblies 1102 can be in the same structure as the fluid rotating coupling assemblies 1103 or they can be separate. Thus, preferably, two separate coupling assemblies are employed. Additional rotating coupling assemblies may also be added to handle other cables, such as for example cables for downhole probes.

The optical rotating coupling assembly 1102 is connected to a hollow precision ground axle 1104 with bearing surfaces 1105, 1106. The laser transmission assemblies 1108 is optically coupled to the hollow axle 1104 by optical rotating coupling assemblies 1102, which permits the laser beam to be transmitted from the laser transmission assemblies 1108 into the hollow axle 1104. The optical rotating coupling assemblies for example may be made up of a QBH connector, a precision collimator, and a rotation stage, for example a Precitec collimator through a Newport rotation stage to another Precitec collimator and to a QBH collimator. To the extent that excessive heat builds up in the optical rotating coupling cooling should be applied to maintain the temperature at a desired level.

The hollow axle 1104 then transmits the laser beam to an opening 1107 in the hollow axle 1104, which opening contains an optical coupler 1110 that optically connects the hollow axle 1104 to the long distance high power laser beam transmission assemblies 1125 that may be located inside of a tubing 1112. Thus, in this way the laser transmission assemblies 1108, the hollow axle 1104 and the long distance high power laser beam transmission assemblies 1125 are rotatably optically connected, so that the laser beam can be transmitted from the laser to the long distance high power laser beam transmission assemblies 1125.

Figure 12:
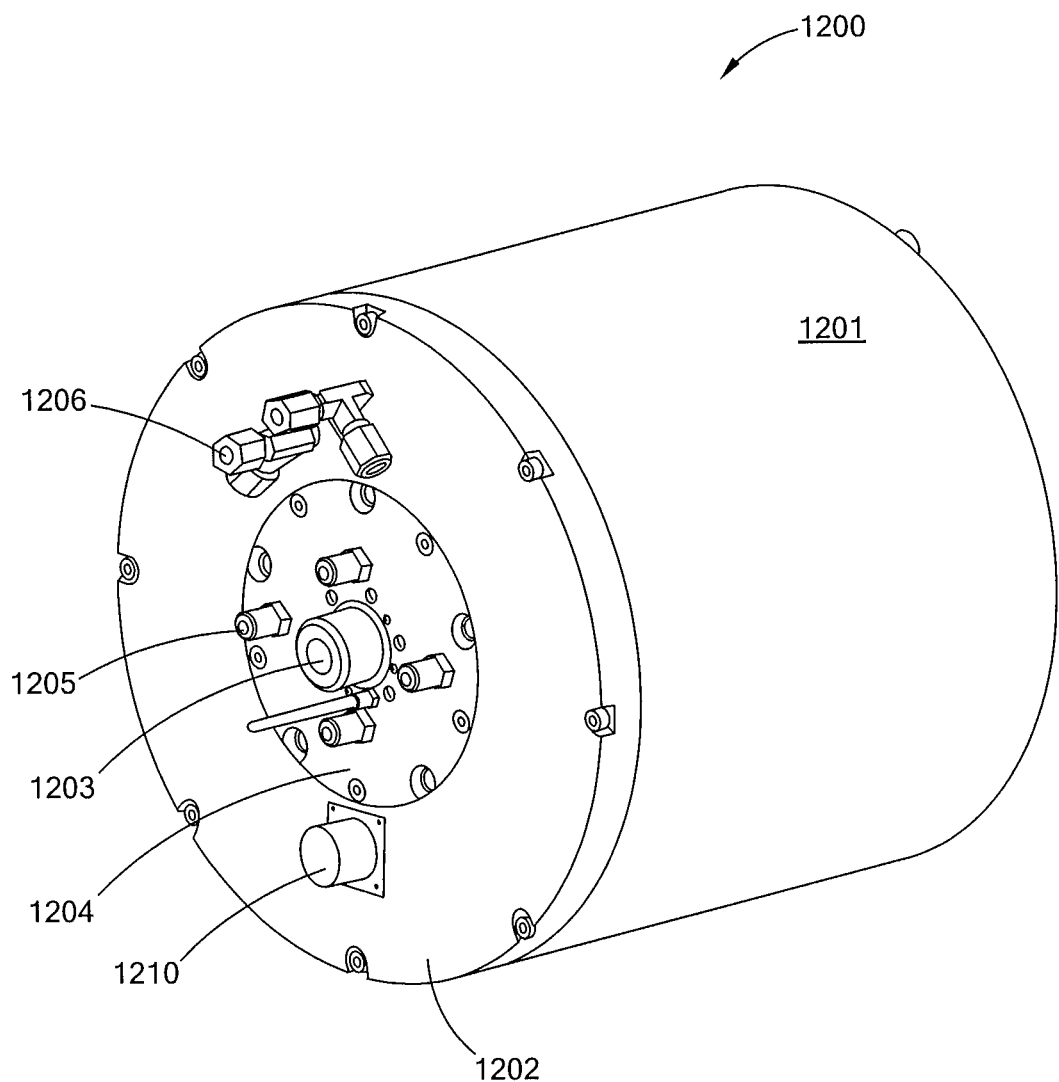
FIG. 12 is a perspective view of an embodiment of a rotational junction transmission device in accordance with the present inventions.
Figure 12A:
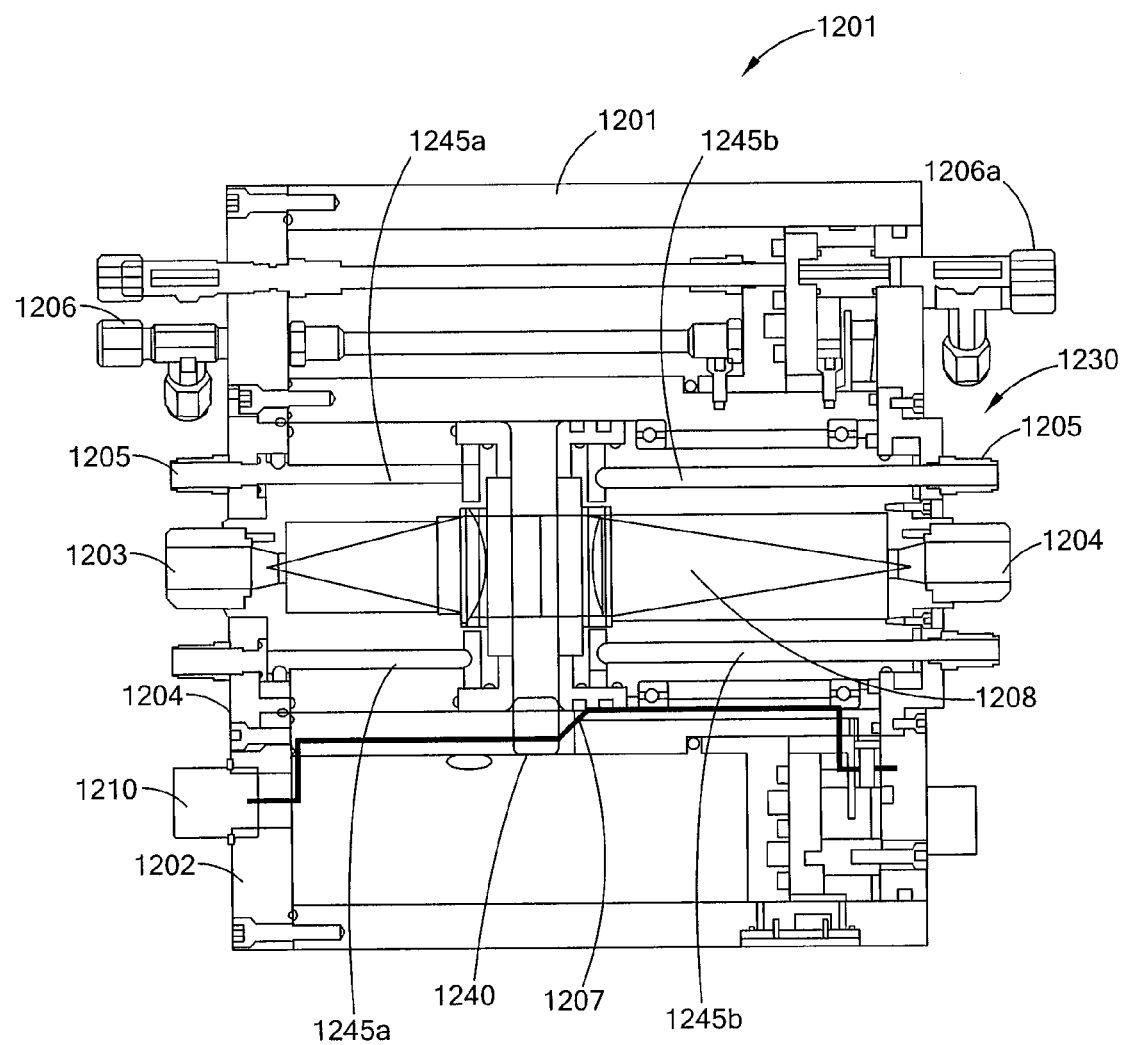
FIG. 12A is a cross sectional view of the embodiment of FIG. 12.

Turning to FIGS. 12 and 12A there is shown an embodiment of an OSR 1200. The OSR 1200 has a housing 1201 that has a non-rotating plate 1202, which is bolted to the housing 1201. The plate 1202 has fluid fittings, e.g., 1206 and an electrical connector 1210. There is a non-rotating optical assembly face 1204 that has a fitting for a connector 1203, and fluid fittings, e.g., 1205. On the rotating side 1230, there are fluid fittings, e.g., 1205a, a rotating receptacle 1204 for a connector. The laser beam path 1208 travels from receptacle 1203 to receptacle 1204. An electrical line 1207 is also provided. A light detector or other type of sensor 1240 may be positioned in the area where the laser beam is in free space in the rotational junction. This sensor can be used to monitor the conditions of the OSR, laser beam and potentially the laser operation and down stream parameters. Cooling chambers 1245a and 1245b are a series of drilled holes that encompass the optical assemblies. Cooling chamber 1245a is non-rotating and cooling chamber 1245b is rotating. These cooling chambers may have a flowing fluid such as water, other cooling liquids and well as additives to e.g., prevent freezing. They may also have solid materials that readily transmit heat for the area, such as copper rods or they may use heat pipes.

Figure 13:
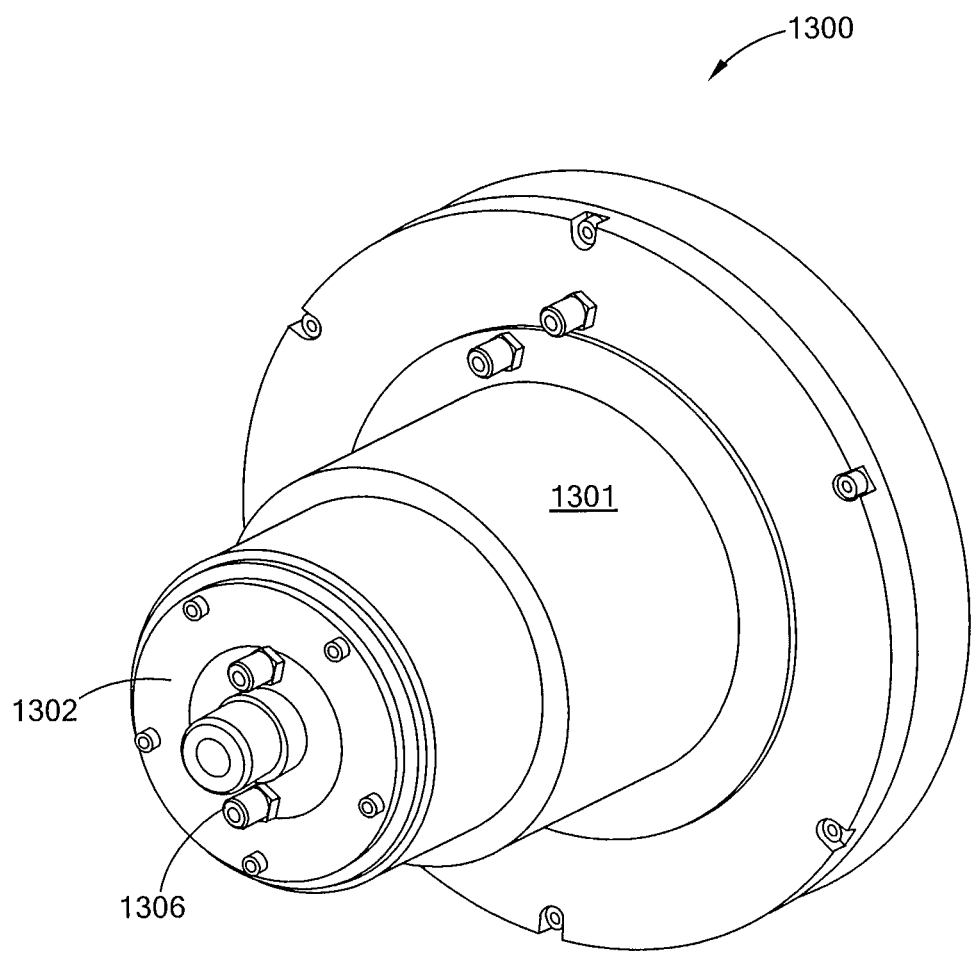
FIG. 13 is a perspective view of an embodiment of a rotational junction transmission device in accordance with the present inventions.
Figure 13A:
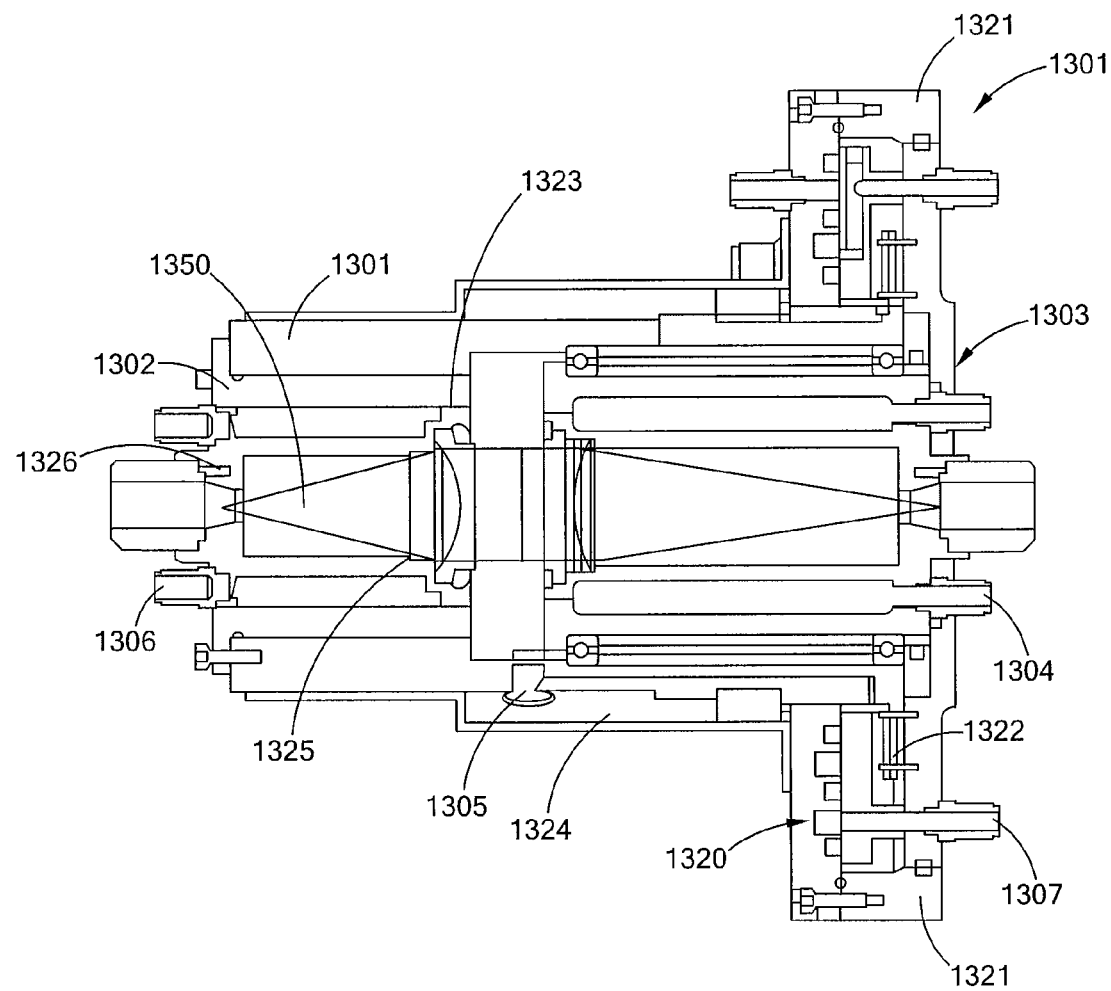
FIG. 13A is a cross sectional view of the embodiment of FIG. 13.

Turning to FIGS. 13 and 13A there is shown an OSR 1300 that has a non-rotating housing 1301, having cooling fluid ports, e.g, 1306 and an optical assembly body 1302. The OSR 1300 has a rotating plate 1303, with fluid ports, e.g., 1306, 1307. There is also provided a fluid slip ring 1320 and an electrical slip ring 1322. The rotating plate 1303 has a non-rotating cap 1321. A lens spacer 1323 is used in this embodiment. There is also provided a ledge 1325 for the positioning of a monitoring fiber (not shown) that is preferably generally parallel to the laser beam and beam path 1350, to detect back reflections. There is a temperature sensor 1326, and a beam monitoring sensor 1305. There is further provided an annulus 1324 for the placement of a desiccant, as well as to provide water sealing and other environmental protections. This monitoring system may also be designed and configured to provide cut verification.

Figure 14A:
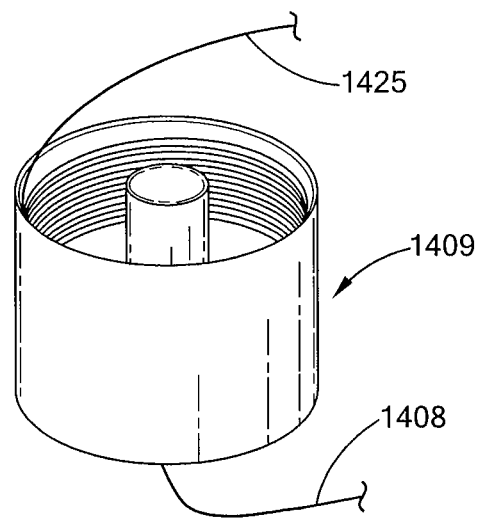
FIG. 14A is a perspective view of an embodiment of a rotational junction transmission device in accordance with the present inventions.
Figure 14B:
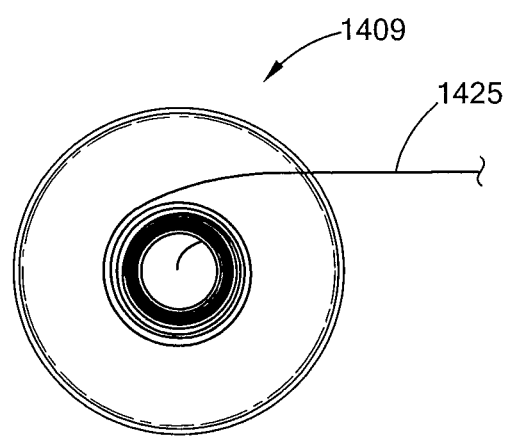
FIG. 14B is a plan view of the embodiment of FIG. 14B.

An embodiment of a rotational junction transmission device to pay out and retrieve, or for extending and retrieving, the umbilical is a stationary spool or creel. As illustrated, by way of example, in FIGS. 14A and 14B there is provided a creel 1409 that is stationary and which contains coiled within the long distance high power laser beam transmission means 1425. That means is connected to the laser beam transmission umbilical 1408, which is connected to the laser (not shown in this figure). In this way the laser beam may be transmitted into the long distance high power laser beam transmission fiber associated with, or being, the umbilical and that structure may be deployed down a borehole, or to a remote location where the high power laser energy may be utilized, by for example a high power laser tool. The long distance high power laser beam transmission umbilical may be for example, a coiled tubing, line structure, or composite tube, on the creel. The optical fiber associated therewith may preferably be an armored optical fiber of the type provided herein. In using the creel consideration should be given to the fact that the umbilical and thus the optical fiber will be twisted when it is deployed. To address this consideration the distal end of the fiber, the umbilical, the bottom hole assembly, or the laser tool, may be slowly rotated to keep the optical cable untwisted, the umbilical may be pre-twisted, the umbilical and optical fiber may be designed to tolerate the twisting and combinations and variations of these.

Figure 15A:
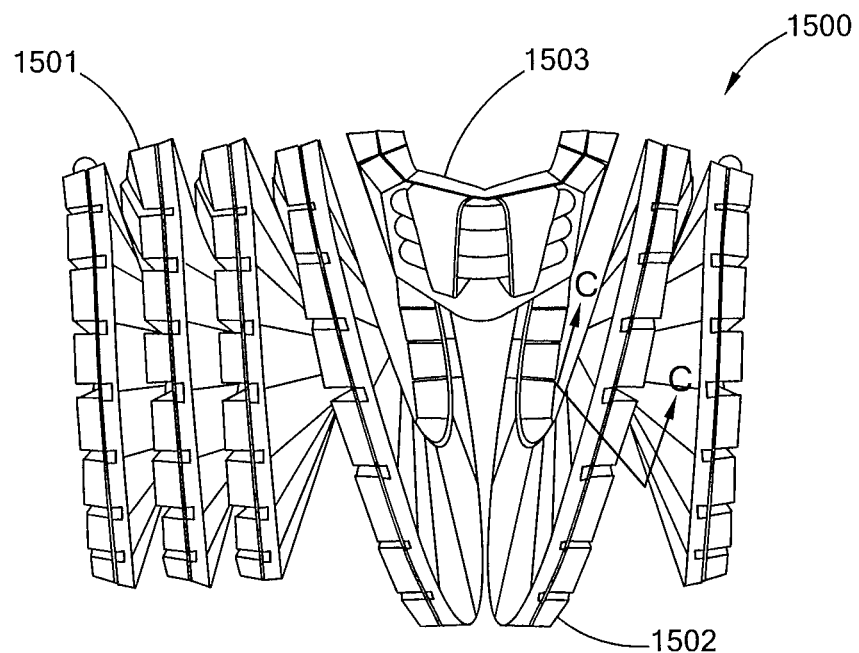
FIGS. 15A & 15B are perspective views of an embodiment of a rotational junction transmission device in accordance with the present inventions.
Figure 15B:
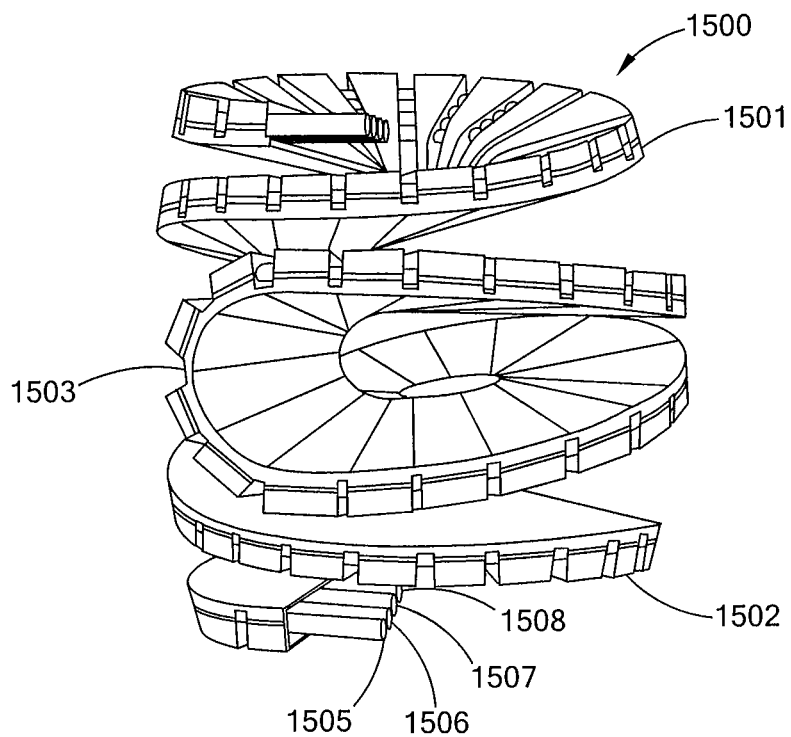
Figure 15C:
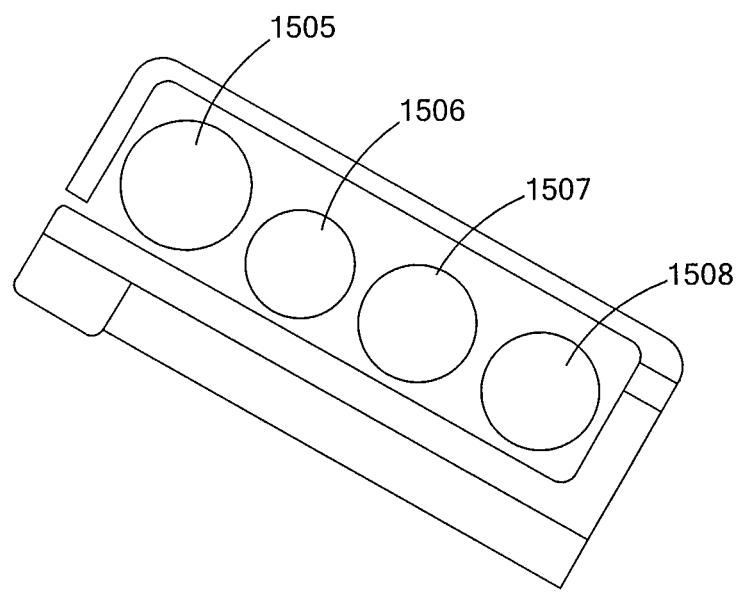
FIG. 15C is a cross sectional view of the embodiment of FIGS. 15A and 15B.

In FIGS. 15A, 15B, and 15C there is provided an embodiment of a handling apparatus. In this embodiment a reverse wrap conveying structure is utilized. Thus, there is a reverse wrap conveying structure 1500 having a first preformed helical section 1501, a second helical section 1502, which is an opposite helix from the first. These sections are connected by a flip back hinge like section 1503. Several passages may be contained within this structure, for example a high pressure air conduit 1505, a high power laser fiber 1506, an electrical cable 1507, and a monitoring laser fiber 1508. The hardware and outer components for this type of reverse wrap conveying structure may be obtained from Igus, under the trade name TWISTERBAND. This type of reverse wrap conveying structure is an example of a conveying structure that can also function as a handling apparatus.

Figure 16:
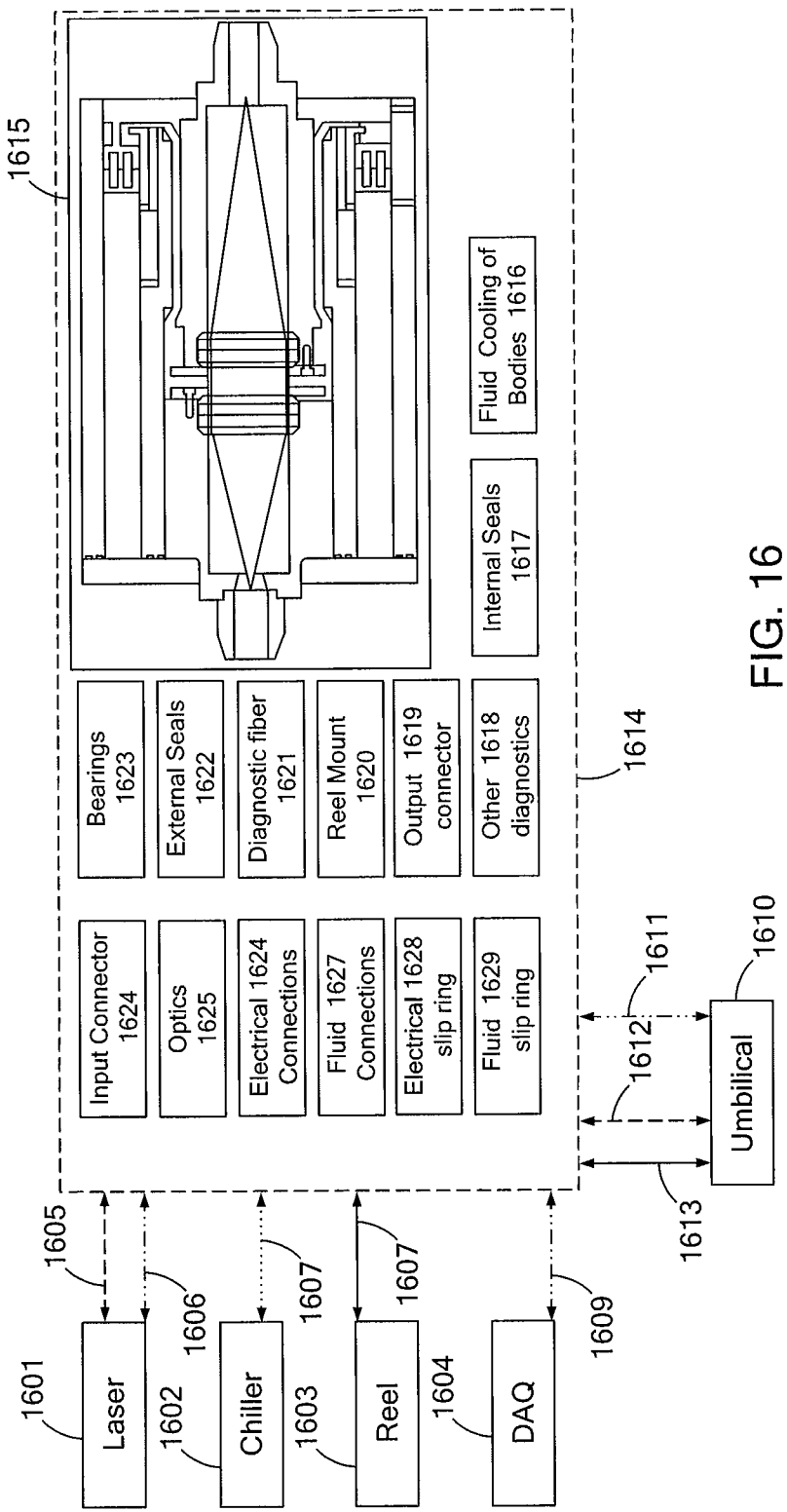
FIG. 16 is a schematic of an embodiment of a rotational junction transmission system in accordance with the present inventions.

Turning to FIG. 16 there is shown a schematic for the integration of a rotational junction transmission assembly 1614 into or with a laser system, and preferably a field laser system. The laser 1601 provides energy transfer 1605 to the assembly 1614 and is in data/information communication 1606 with the assembly 1614. A chiller 1602 is in material exchange 1607, e.g., cooling water, with the assembly 1614. A reel 1603 is physically touching 1607 the assembly 1614. A data acquisition system 1604 is in data/information communication 1609 with the assembly 1614. The umbilical 1610 is in physical contact 1613, energy transfer 1612, and data/information communication 1611 with the assembly 1614. The assembly 1614 includes a input connector 1624, optics 1625, electrical connections 1624, fluid connections 1627, an electrical slip ring 1628, a fluid slip ring 1629, bearings 1623, external seals 1622, diagnostic fiber 1621, real mount 1620, output connector 1619, additional diagnostics 1618, internal seals 1617, and fluid cooling 1616. An OSR is used by way of example, in this FIG. 16, but could be an ORCA or any of the other rotational junction transmission devices of this specification.

Figure 17:
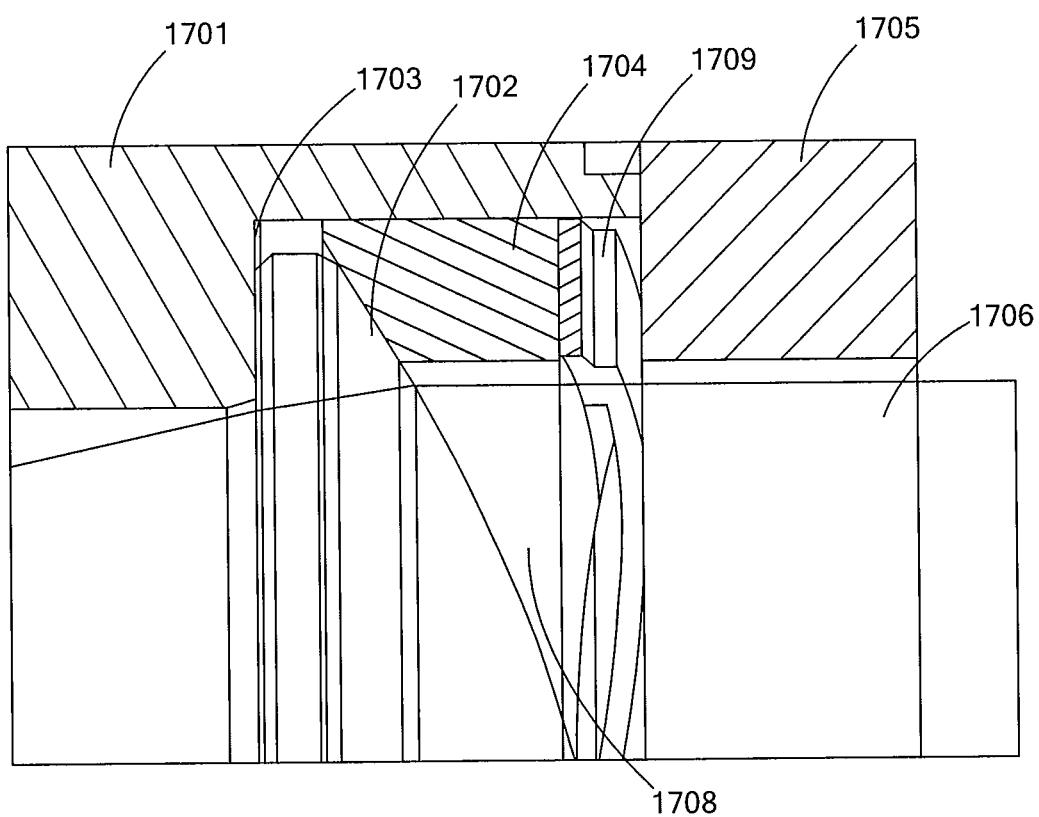
FIG. 17 is a cross sectional view of an embodiment of a rotational junction transmission device in accordance with the present inventions.

Turning to FIG. 17 there is provided an embodiment of a lens mounting assembly for providing alignment free optics. The lens 1702 is positioned in body 1701. Spacer 1704 is shaped with a surface that tracks the shape of the lens 1702 and held in place by retaining member, spring, 1709 and locking member 1705. The laser beam 1706 travels along a beam path, which includes free space 1708.

Figure 18:
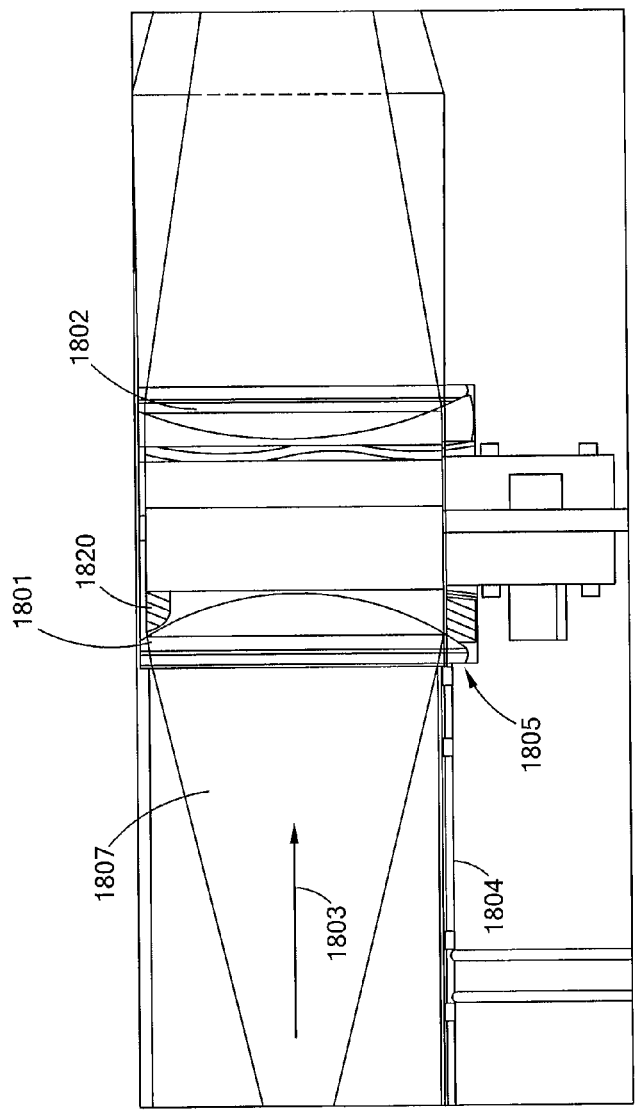
FIG. 18 is a cross sectional view of an embodiment of a rotational junction transmission device in accordance with the present inventions.
Figure 18A:
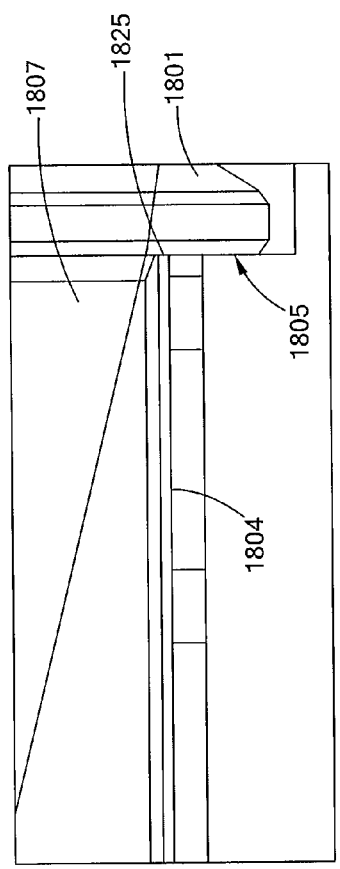
FIG. 18A is an enlarged cross sectional view of a section of the embodiment of FIG. 18.

Turning to FIG. 18 there is provided an OSR assembly having a lens 1801 spacer 1820 and a second lens 1802. The beam path 1807 and direction 1803 of the forward propagating beam is shown. In this embodiment a fiber 1804 is used as a back reflection monitor or detection device. Turning to FIG. 18A the fiber face 1825 is located near to, and preferably adjacent the back 1805 of lens 1801, but out side of the beam path and beam 1807. In this manner if back reflections emanate from lens 1802, in the direction of lens 1801 they will enter the fiber face 1825 and go into the fiber 1804 where they can be detected by a suitable monitor.

Figure 19:
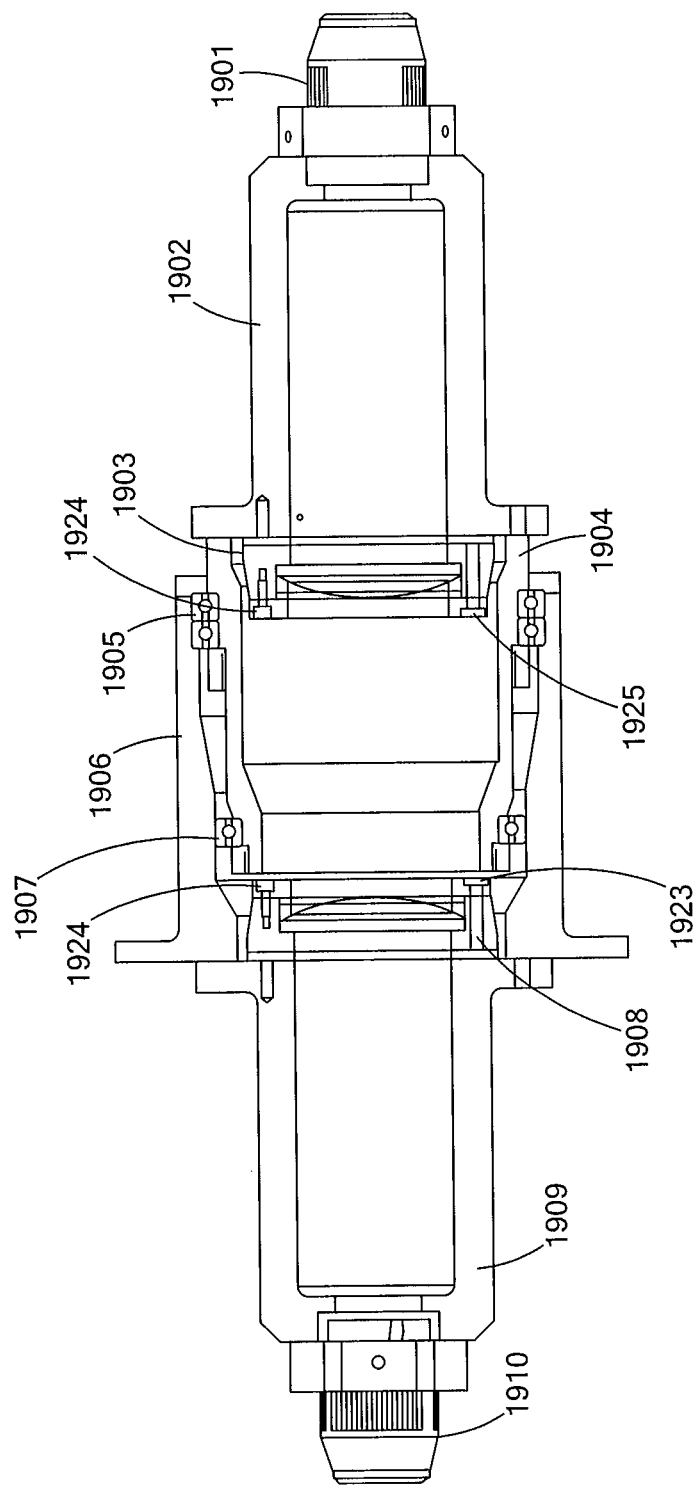
FIG. 19 is a cross sectional view of an embodiment of a rotational junction transmission device in accordance with the present inventions.
Figure 19A:
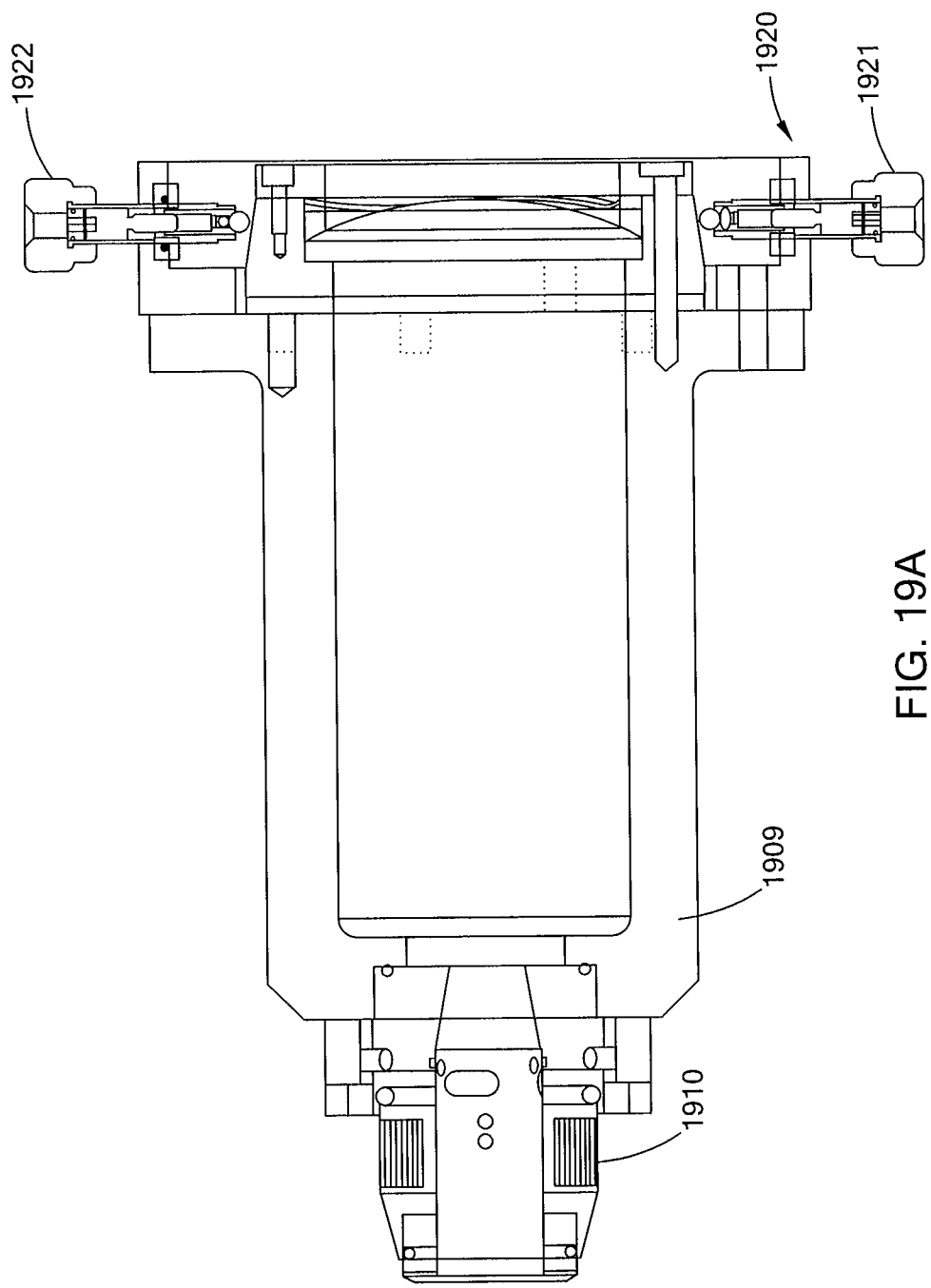
FIG. 19A is a cross sectional view of the embodiment of FIG. 19 as shown during assembly.

Turning to FIG. 19 there is provided a OSR having a connector receptacles 1910, 1901, metering tubes 1909, 1902 (for setting or adjusting the focal length), a lens cell 1908 that is positioned against a metering tube 1909. A flange 1923 is also provided. The lens cell is held in place by screw 1923. There are provided bearings 1907, 1905 that provide for the rotation of housing 1906 with respect to shaft 1904. There is also provided a sensor 1925 and a locking means 1924 for lens cell 1903. Turing to FIG. 19A there is shown an alignment and adjustment mechanism 1920 having alignment nobs 1922 and 1921 for aligning the lens cell, before the OSR is completely assembled. In this embodiment there is also provide a shim to adjust focus.

Figure 20:
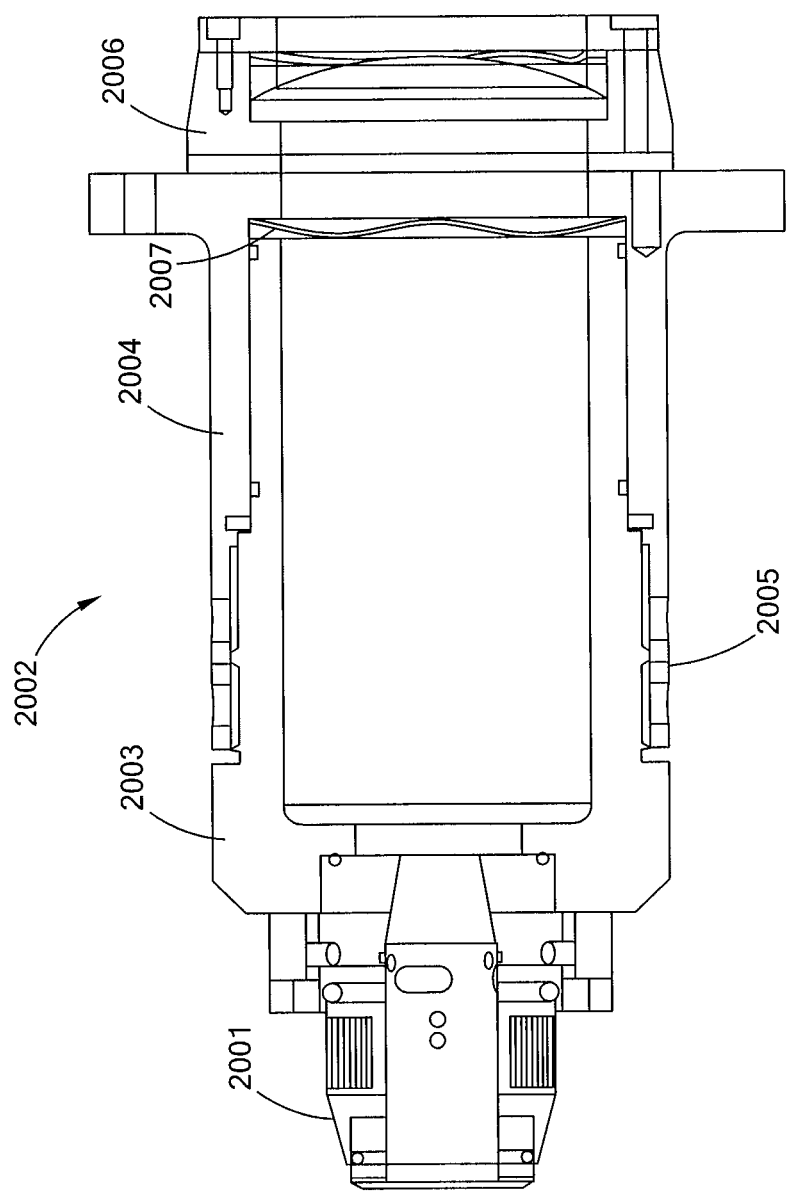
FIG. 20 is a cross sectional view of an embodiment of a rotational junction transmission device in accordance with the present inventions.

Turing to FIG. 20 there is provided a section 2002 of an OSR having a connector receptacle 2001 an inner tube 2003, an outer tube 2004, which is biased against inner tube 2003 by wave spring 2007. The outer tube 2004 has a lens cell 2006. The relative positions of inner tube 2003 and outer tube 2004 can be adjusted by focus adjustment assembly 2005. Thus, as the inner tube is move in and out the focus can be changed and adjusted.

Figure 21:
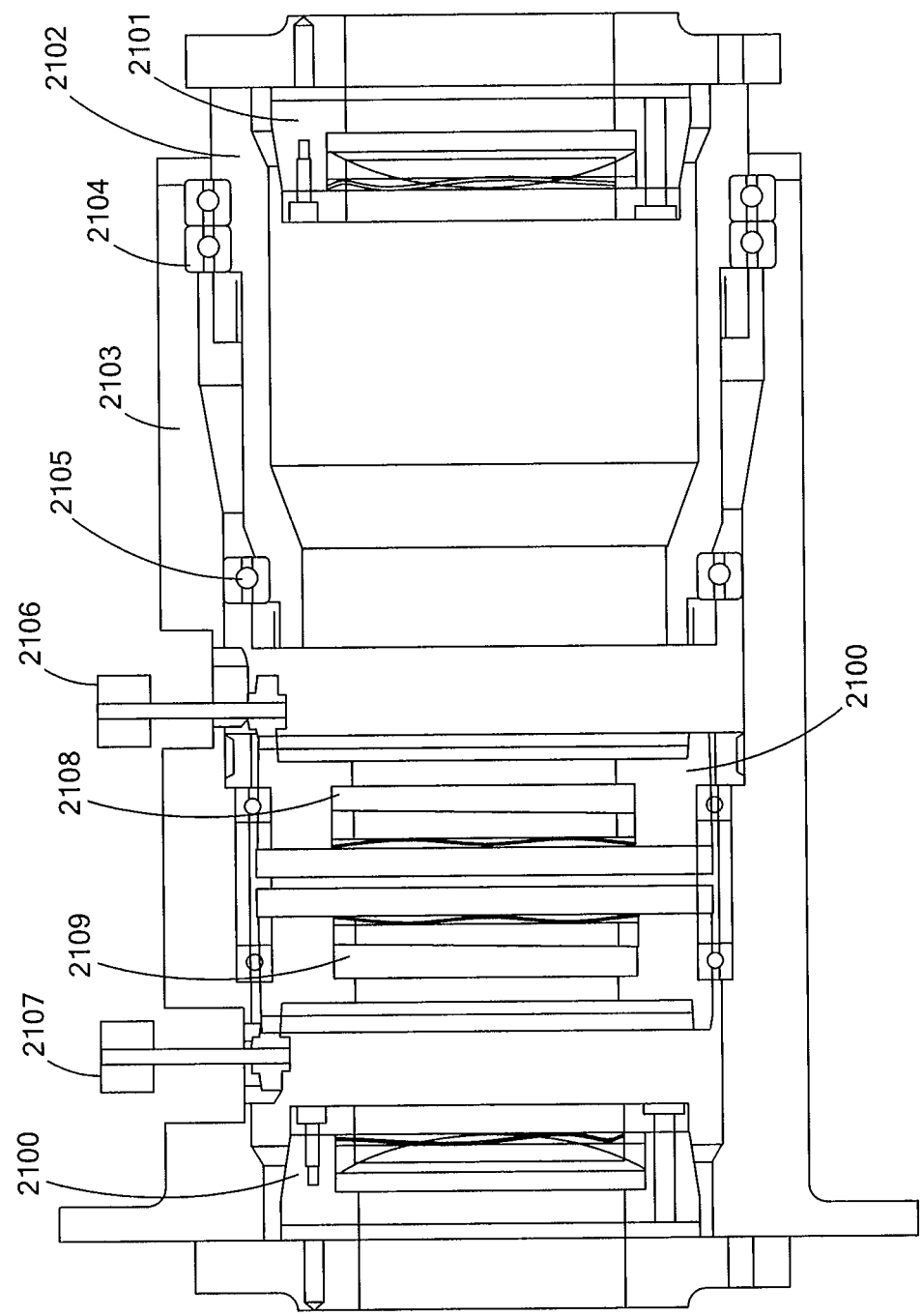
FIG. 21 is a cross sectional view of an embodiment of a rotational junction transmission device in accordance with the present inventions.

Turning to FIG. 21 there is provided an OSR having a Risley prism adjustment mechanism. Thus, the assembly has a first lens cell 2100 that can rotate with respect to the second lens cell 2101. A Risley prism assembly, having a first prism 2109, a second prism 2108 and adjustment knobs 2107 and 2106 is located between the lens cells. By adjusting the knobs the positions of the Risley prisms are changed and the laser beams path can be adjusted or directed. Housing 2013 has bearings 2105, and 2104 to facilitate rotation.

Figure 22:
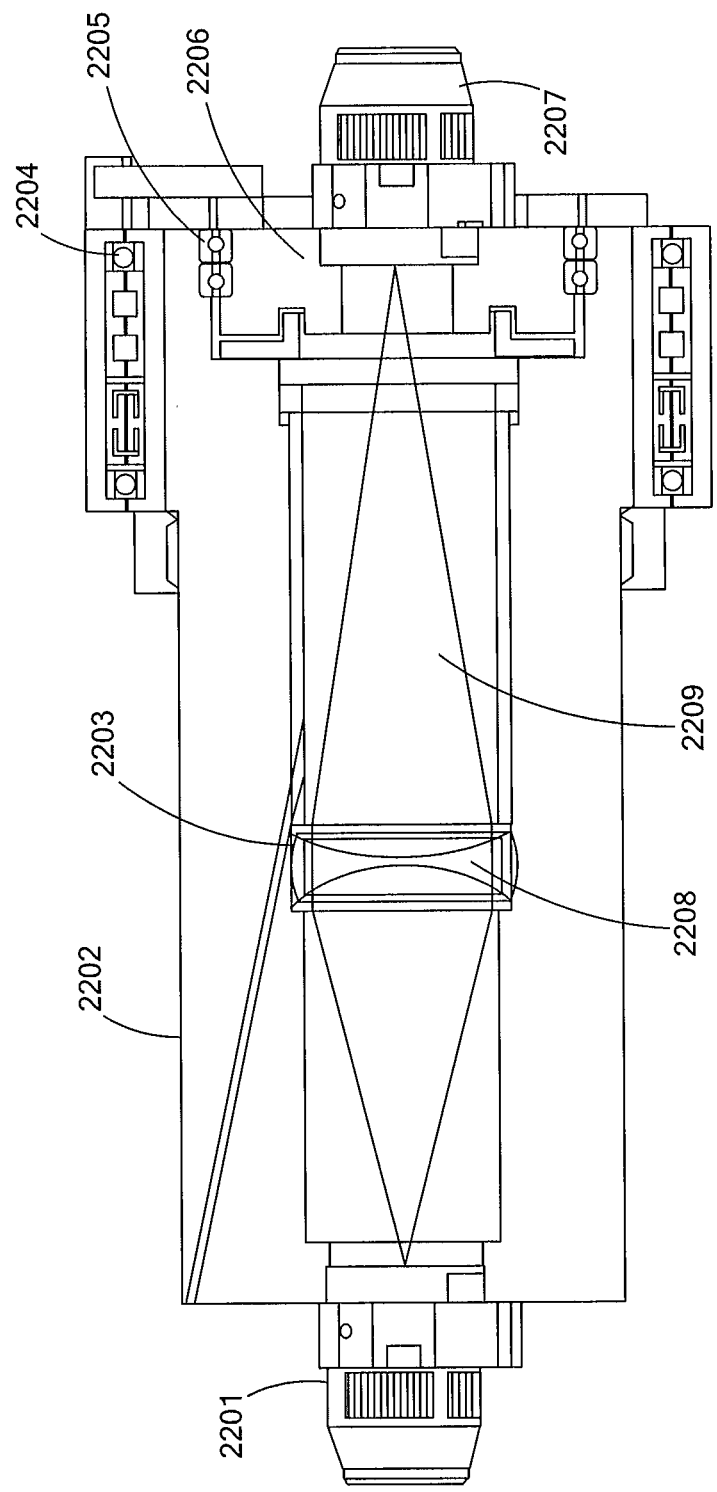
FIG. 22 is a cross sectional view of an embodiment of a rotational junction transmission device in accordance with the present inventions.

Turning to FIG. 22 there is provided an embodiment of a bore sight OSR. In this embodiment the laser beam is not in collimated space as it crosses the rotational junction. Thus, OSR has a connector receptacle 2201 a diagnostics passage 2203, an optics package 2208, which receives and focuses the laser beam 2209 toward connector receptacle 2207. An electronic and fluid slip ring assembly 2204 is provided. Bearing assemblies 2205 permits the rotating plate 2206 having the connector receptacle 2207 to rotate with respect to the focused laser beam 2209. In this embodiment the fluid and electrical slip ring assemblies have there own bearings, so that they do not affect optical performance.

Figure 23:
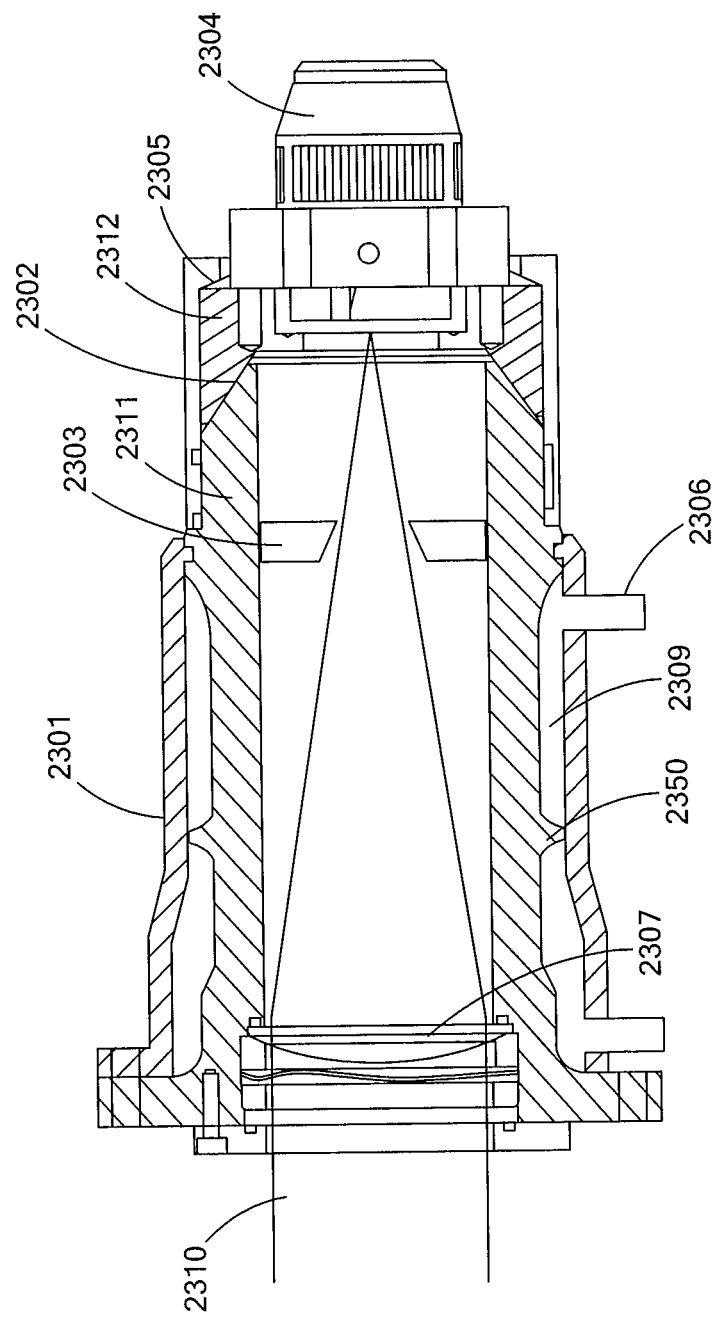
FIG. 23 is a cross sectional view of an embodiment of a rotational junction transmission device in accordance with the present inventions.

Turning to FIG. 23 there is shown an embodiment of a section of an OSR. The connector receptacle 2304 has optical baffles 2303 that are associated with the laser beam path 2310. The connector receptacle 2304 is held in position by spring 2305 and aluminum member 2312 and steel member 2311, which join at interface 2302 and collectively provide for athermlization (along with the specific determination of the angle at which they meet) over a specified temperature range. There is a lens cell 2307 that is located in body 2301. Body 2301 has a fluid flow passage 2309 that is fed by fluid ports, e.g., 2306. There is a baffle 2350 positioned in the fluid flow passage to increase dwell time of the cooling fluid, and improve the movement of the fluid through the cooling fluid flow passage by requiring it to take have a longer flow path.

Figure 24:
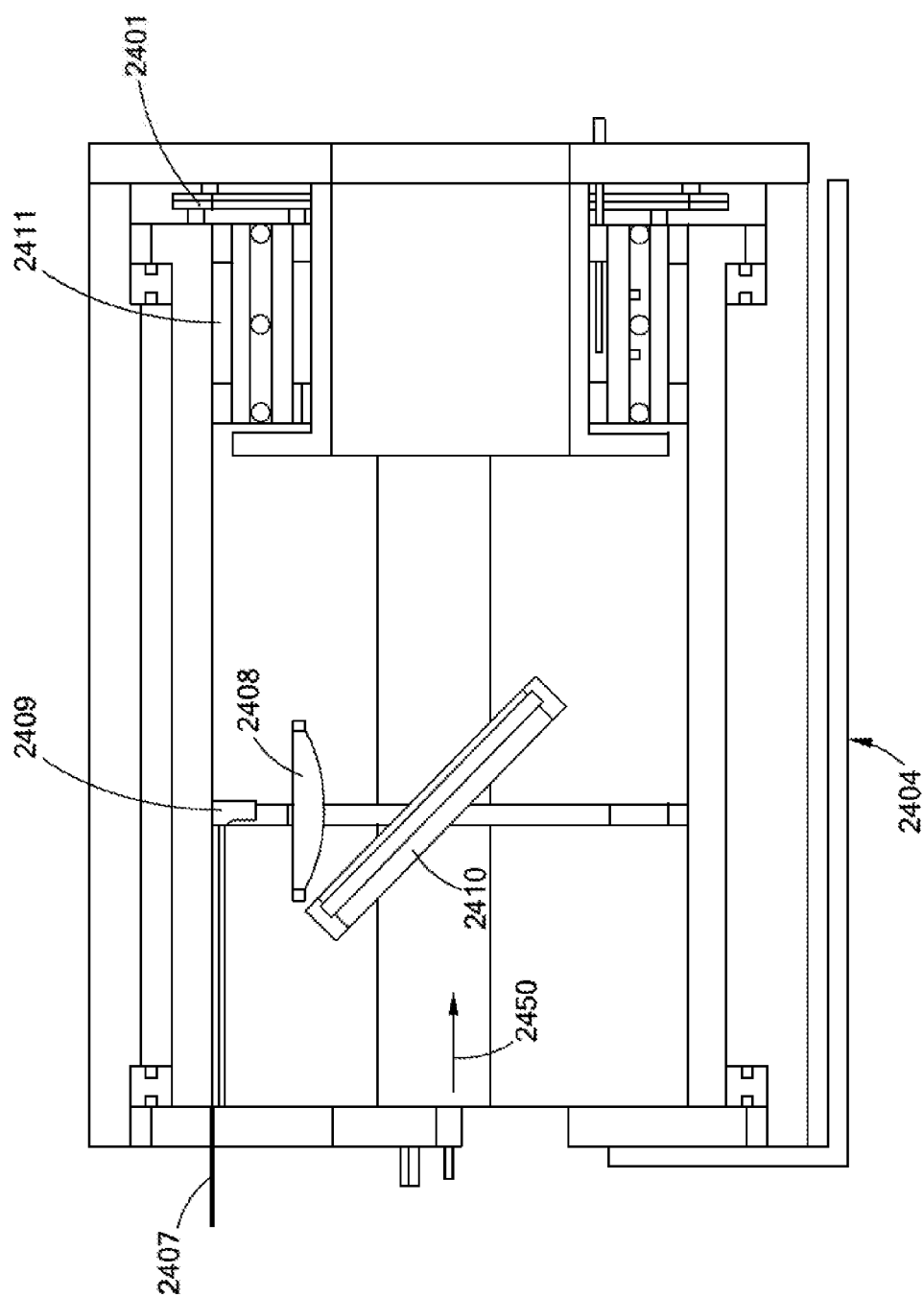
FIG. 24 is a cross sectional view of an embodiment of a rotational junction transmission device in accordance with the present inventions.

In FIG. 24, there is provided an embodiment of an OSR 2404 that has a partially reflective and transmissive optical element 2410 that is placed in the laser beam path. This element 2410 will reflect back reflected light to lens 2408 which focused the back reflected light on detector 2409 with sends a signal along a wire 2407. There is also provided a fluid slip ring 2411 and an electrical slip ring 2401. The direction of the forward propagating laser beam path is shown by arrow 2450.

Figure 25:
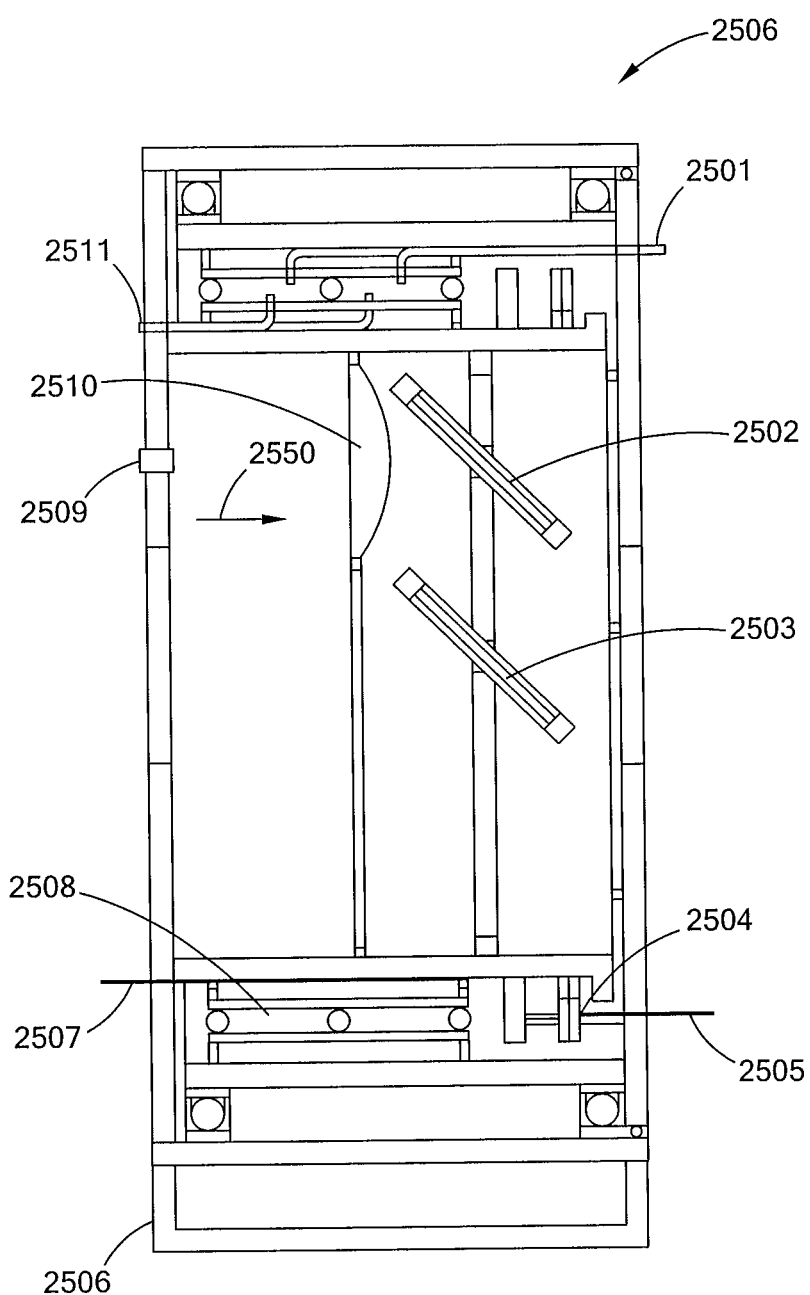
FIG. 25 is a cross sectional view of an embodiment of a rotational junction transmission device in accordance with the present inventions.

In FIG. 25 there is provided an embodiment of an OSR 2506 that has a partially reflective and transmissive optical element 2503 that is placed in the laser beam path. The element 2503 will reflect back reflected light into a reflective element 2502 that directs the back reflected light to a lens 2510 and a detector 2509. The direction of the forward propagating laser beam is shown by arrow 2550. There is also provided a fluid slip ring 2508 and fluid ports 2511, 2501 and an electrical slip ring 2504 with electrical lines 2505, 2507.

Figure 26:
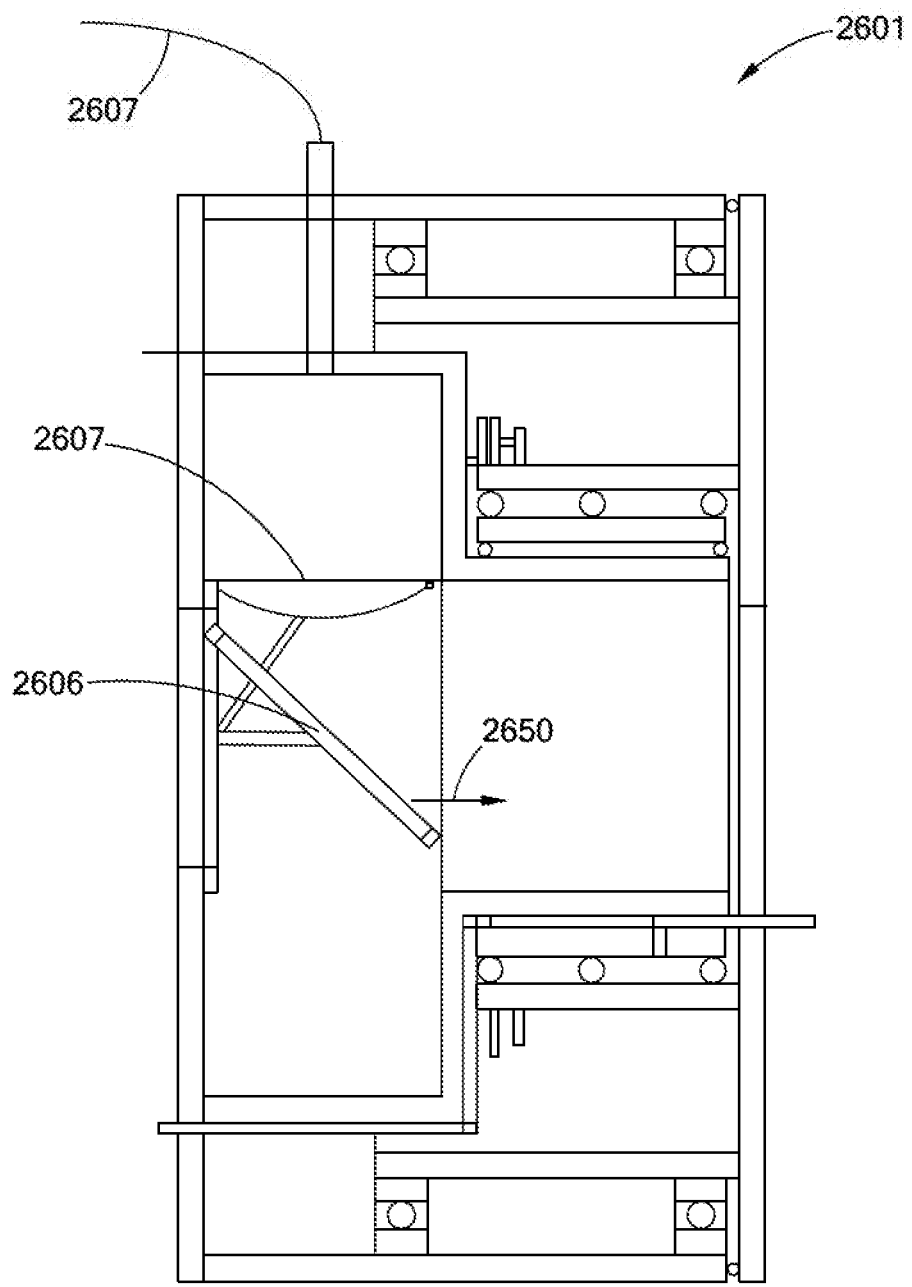
FIG. 26 is a cross sectional view of an embodiment of a rotational junction transmission device in accordance with the present inventions.

In FIG. 26 there is provided an embodiment of an OSR 2601 that has a partially reflective and transmissive optical element 2606 that is place in the laser beam path. The element 2606 will reflect back reflected light into lens 2607 which focuses the back reflect light to sensor assembly 2607. The direction of the forward propagating laser beam is shown by arrow 2650.

Figure 27:
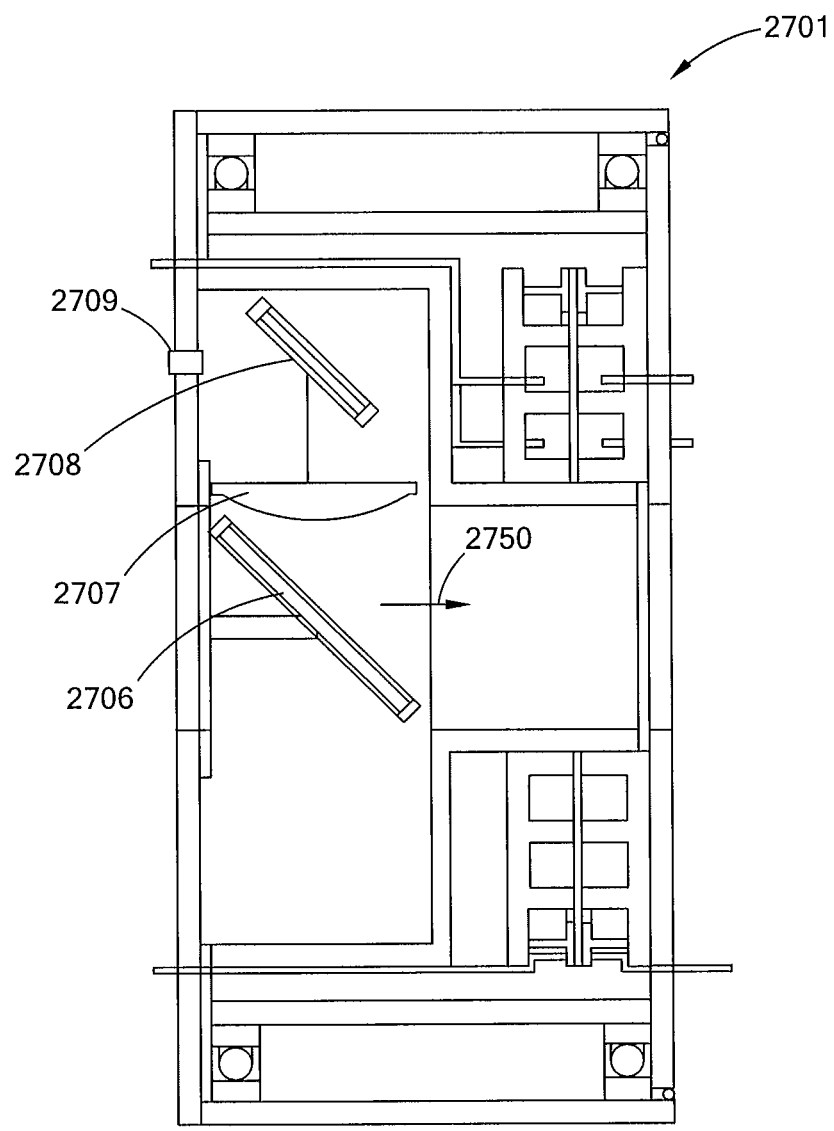
FIG. 27 is a cross sectional view of an embodiment of a rotational junction transmission device in accordance with the present inventions.

In FIG. 27 there is provided an embodiment of an OSR 2701 that has a partially reflective and transmissive optical element 2706 that is place in the laser beam path. The element 2706 will reflect back reflected light into lens 2707 which focuses the back reflect light to a reflector 2708, which then directs the back reflected light to a sensor 2709. The direction of the forward propagating laser beam is shown by arrow 2750.

Figure 28:
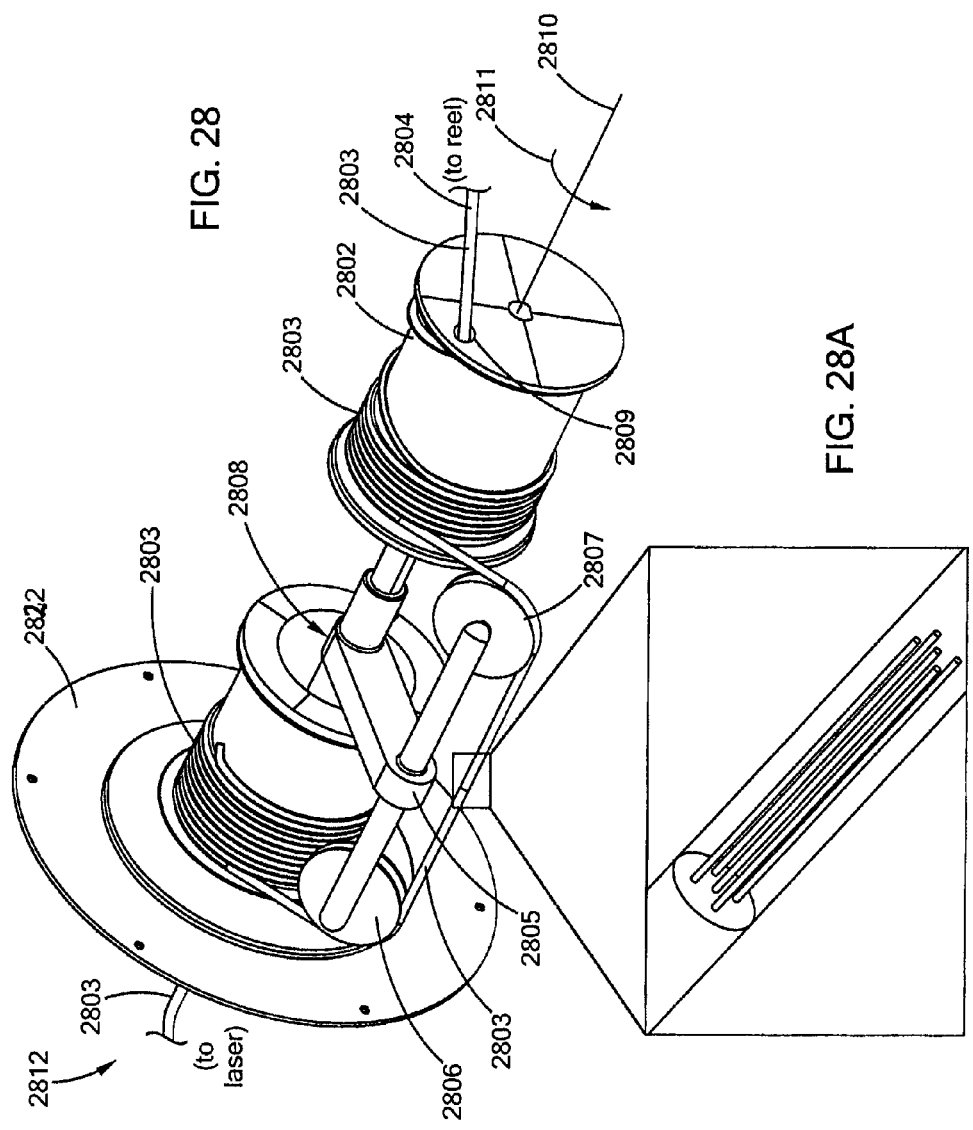
FIG. 28 is a perspective sectional view of an embodiment of a rotational junction transmission device in accordance with the present inventions.

Turning to FIG. 28 there is provided an embodiment of an ORCA utilizing a dual drum assembly. The ORCA 2800 has a first drum 2801 and a second drum 2802. Drum 2801 is attached to plate 2822 and is fixed, e.g., it does not rotate. Drum 2802 rotates and rotates at the same speed as the umbilical deployment reel (not shown in the figure). The umbilical 2803 enters the plate 2822 and wraps around stationary drum 2801. The umbilical then goes over the revolving arm assembly 2805 having rollers 2806, 2807. A gear box 2808 provide for the revolving arm assembly 2805 to revolve in the same direction as rotating drum 2802 but to do so at a slower speed. Thus, for example, if rotating drum were to make 2 complete rotations, revolving arm assembly would have made 1 complete rotation. This has the effect of unwinding the umbilical from stationary drum 2801 and winding it onto rotating drum 2802 while that drum is rotating. (Similarly if revolving and rotating in the other direction the umbilical 2803 will be unwrapped from drum 2802 and wrapped onto drum 2803). Further, while this wrapping process is occurring on drum 2802 the length 2804 of umbilical 2803 extending out from opening 2809 does not change; and this length is rotating (e.g., the direction of arrow 2811, which is showing retrieval) around axis 2810, which axis is also the axis of the umbilical deployment reel. Thus, end 2812 of the umbilical does not rotate and end 2804 of the umbilical rotates, without the need for the laser beam to be launched through free space. FIG. 28A shows a more detailed cut away view of the umbilical 2803, as having five FIMTs.

The relative speeds of the revolving arm assembly and the rotating drum can vary as needed, in accordance with the anticipated speed of the deployment reel, the length of the deployment umbilical, the bending capability of the umbilical and the optical fibers, the relative diameters of the drums, and other considerations. However, it should be noted that when the diameter of two drums are the same the revolving arm must be twice as fast as the rotating drum, i.e., when the drum makes one rotation, the arm as revolved around twice.

Figure 29:
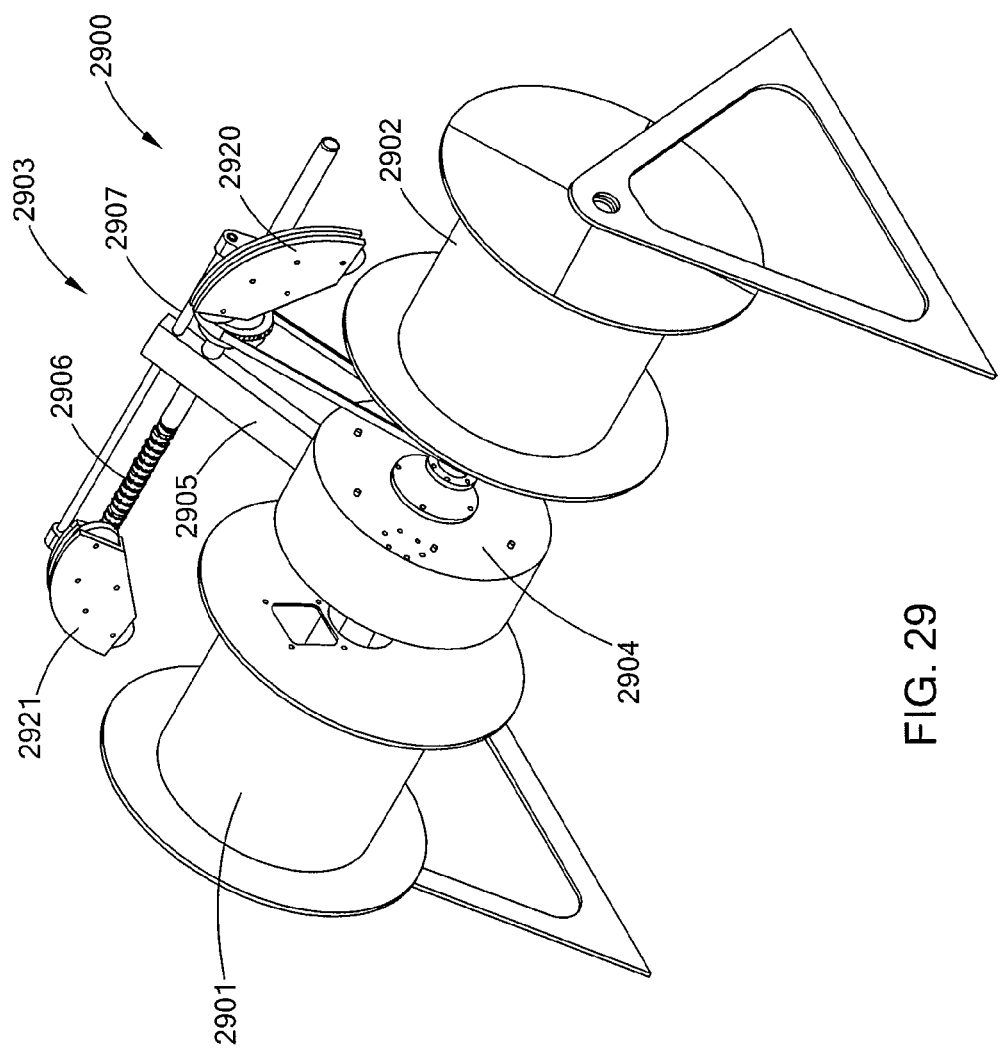
FIG. 29 is a perspective view of an embodiment of a rotational junction transmission device in accordance with the present inventions.
Figure 29A:
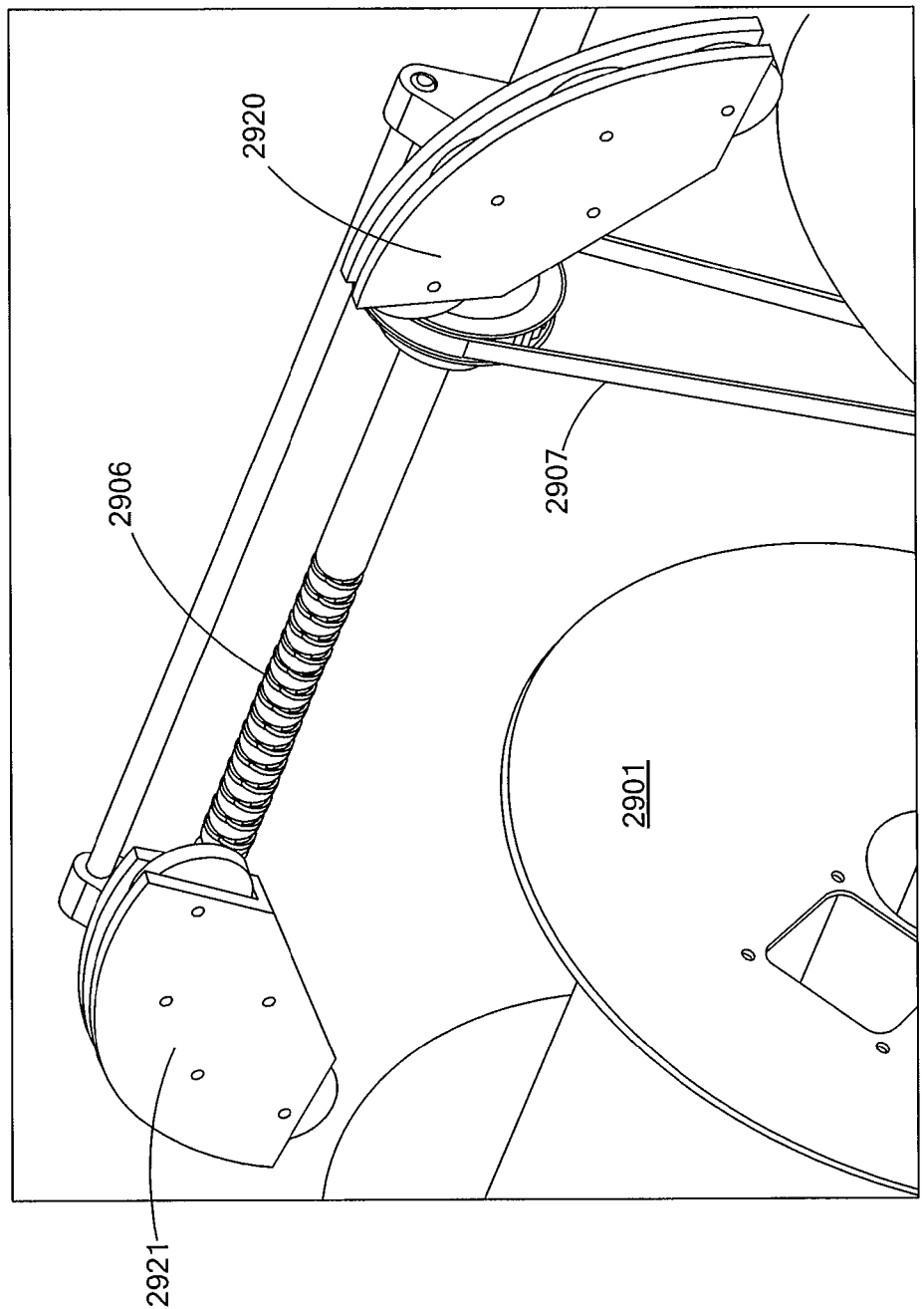
FIG. 29A is a perspective view of an embodiment of a rotational junction transmission device in accordance with the embodiment of FIG. 29.
Figure 29B:
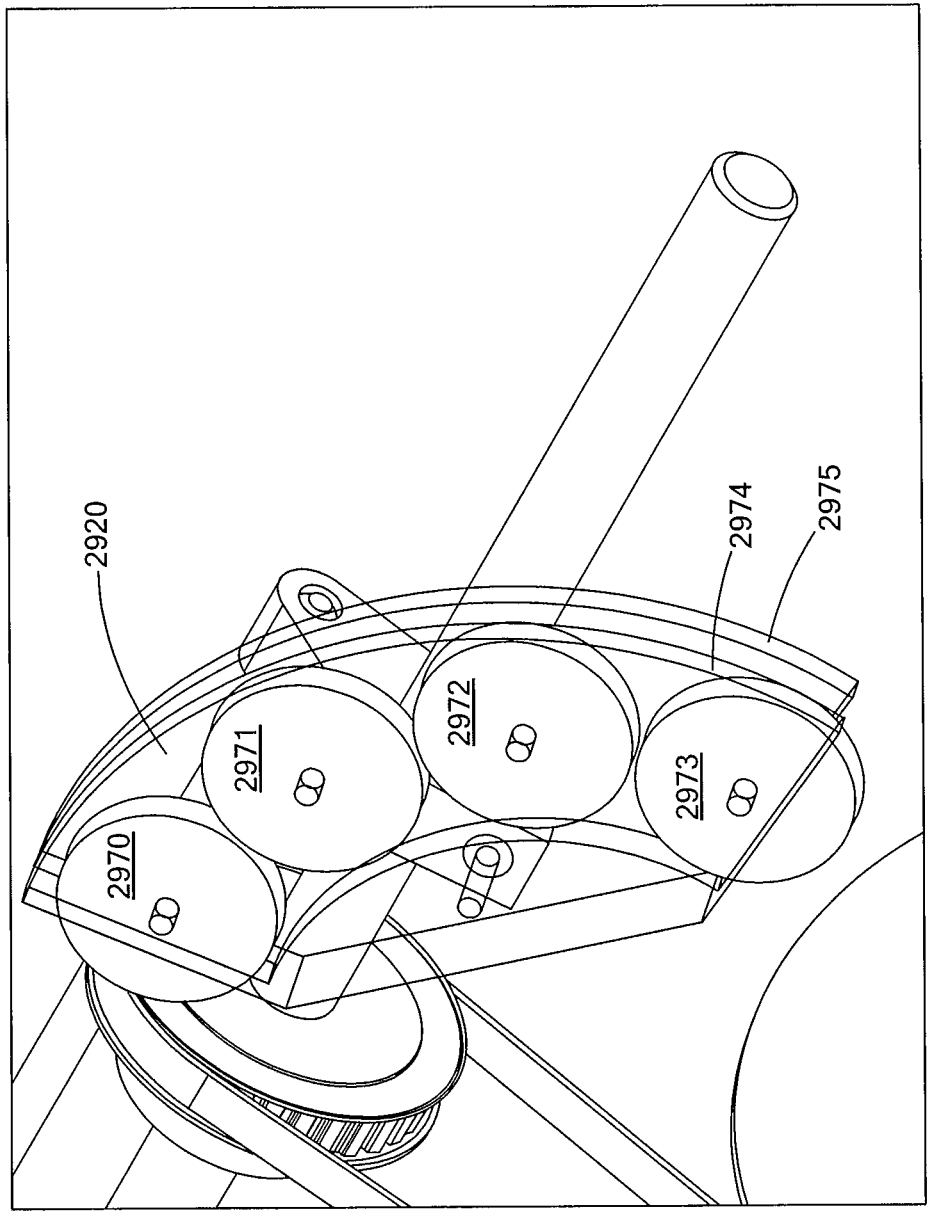
FIG. 29B is a perspective view of an embodiment of a rotational junction transmission device in accordance with the embodiment of FIG. 29.
Figure 29C:
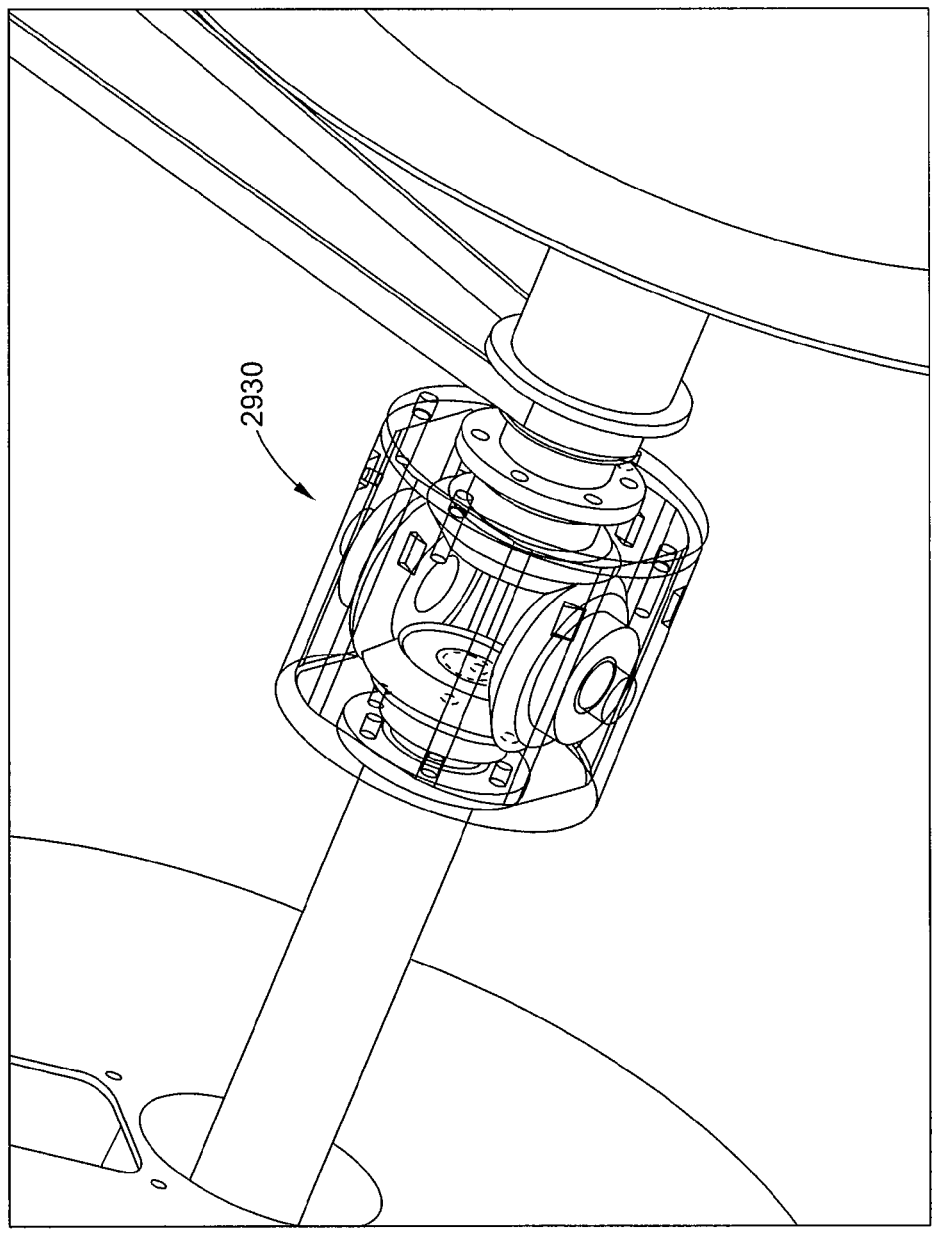
FIG. 29C is a perspective view of an embodiment of a rotational junction transmission device in accordance with the embodiment of FIG. 29.
Figure 29D:
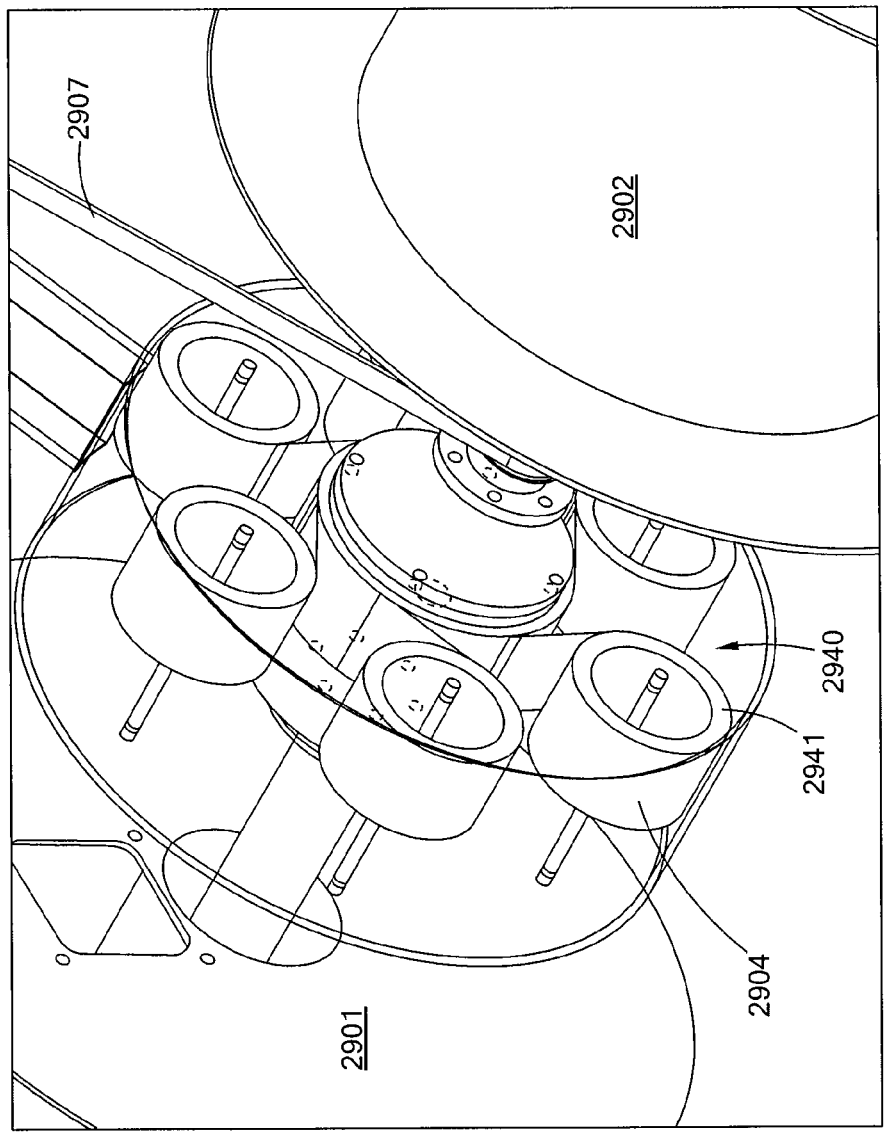
FIG. 29D is a perspective view of an embodiment of a rotational junction transmission device in accordance with the embodiment of FIG. 29.

In FIG. 29 there is shown an embodiment of a two drum ORCA having an embodiment of the revolving arm assembly with a level winder mechanism. The OCRA 2900 has a stationary drum 2901, a rotating drum 2902, and a revolving arm assembly 2903. The revolving arm assembly 2903 has a gearbox housing 2904, an arm 2905 and a winder mechanism 2906, which is driven by belt 2907. The revolving arm assembly 2903 also has roller guide mechanisms 2920, 2921. Thus, as the umbilical is wound to and from the drums 2901, 2902 the winder mechanism 2906 moves the guide mechanisms back and forth so as to evenly, or uniformly, wind and unwind the umbilical from the drums. This prevents bunching and tangling of the umbilical during the winding and unwinding process. A more detailed view of the winding mechanism 2906 is provided in FIG. 29A. A more detailed view of roller guide mechanism 2920 is provided in FIG. 29B, where there are four guide wheels 2970, 2971, 2972, 2973 held between plates 2974, 2975. The gear box assembly 2930 is shown in FIG. 29C (with the gear box housing 2904 and the tensioner assembly 2940 not shown). A tensioner assembly 2940 is shown in FIG. 29D. This assembly has a series of wound band springs, e.g., 2941 that provide tension during winding and unwinding so as to keep the rotations and revolutions under control. The tensioner assembly 2940 also provides a rotational reserve capacity that allows for differential winding of stationary drum 2901 and rotating drum 2902 as needed due to the fact that a full reel has a slightly larger diameter than an empty reel.

The rotational junction transmission devices, e.g., a rotating coupler, an OSR, an ORCA, a ratchet type optical transmission system, and others may find applications in activities such as: off-shore activities; subsea activities; decommissioning structures such as, oil rigs, oil platforms, offshore platforms, factories, nuclear facilities, nuclear reactors, pipelines, bridges, etc.; cutting and removal of structures in refineries; civil engineering projects and construction and demolitions; concrete repair and removal; mining; surface mining; deep mining; rock and earth removal; surface mining; tunneling; making small diameter bores; oil field perforating; oil field fracking; well completion; window cutting; well decommissioning; well workover; precise and from a distance in-place milling and machining; heat treating; drilling and advancing boreholes; workover and completion; flow assurance; and, combinations and variations of these and other activities and operations.

A single high power laser may be utilized in the system, tools and operations, or there may be two or three high power lasers, or more. High power solid-state lasers, specifically semiconductor lasers and fiber lasers are preferred, because of their short start up time and essentially instant-on capabilities. The high power lasers for example may be fiber lasers, disk lasers or semiconductor lasers having 5 kW, 10 kW, 20 kW, 50 kW, 80 kW or more power and, which emit laser beams with wavelengths in the range from about 455 nm (nanometers) to about 2100 nm, preferably in the range about 400 nm to about 1600 nm, about 400 nm to about 800 nm, 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers). An example of this general type of fiber laser is the IPG YLS-20000. The detailed properties of which are disclosed in U.S. patent application Publication No. 2010/0044106. Thus, by way of example, there is contemplated the use of four, five, or six, 20 kW lasers to provide a laser beam having a power greater than about 60 kW, greater than about 70 kW, greater than about 80 kW, greater than about 90 kW and greater than about 100 kW. One laser may also be envisioned to provide these higher laser powers.

The various embodiments of rotational junction transmission devices, e.g., a rotating coupler, an OSR, an ORCA, a ratchet type optical transmission system, and others set forth in this specification may be used with various high power laser systems and conveyance structures and systems, in addition to those embodiments of the Figures and Examples in this specification. For example, embodiments of rotational junction transmission devices, e.g., a rotating coupler, an OSR, an ORCA, a ratchet type optical transmission system, and others may be used for, in, or with, the systems, lasers, tools and methods disclosed and taught in the following US patent applications and patent application publications: Publication No. 2010/0044106; Publication No. 2010/0215326; Publication No. 2012/0275159; Publication No. 2010/0044103; Publication No. 2012/0267168; Publication No. 2012/0020631; Publication No. 2013/0011102; Publication No. 2012/0217018; Publication No. 2012/0217015; Publication No. 2012/0255933; Publication No. 2012/0074110; Publication No. 2012/0068086; Publication No. 2012/0273470; Publication No. 2012/0067643; Publication No. 2012/0266803; Ser. No. 61/745,661; and Ser. No. 61/727,096, the entire disclosure of each of which are incorporated herein by reference.

Embodiments of rotational junction transmission devices, e.g., a rotating coupler, an OSR, an ORCA, a ratchet type optical transmission system, and others may also be used with: other high power laser systems that may be developed in the future; and with existing non-high power laser systems, which may be modified, in-part, based on the teachings of this specification, to create a high power laser system. Further, the various embodiments of devices systems, tools, activities and operations set forth in this specification may be used with each other in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A rotational junction transmission device for transmitting very high power laser energy, the device comprising:
   a. a housing having a first end and a second end;
   b. a first plate rotatably affixed to the first end of the housing, and a second plate affixed to the second end of the housing, wherein the first and second plates and the housing define a rotation junction there between;
   c. a means for transferring a laser beam having at least about 20 kW of power across the rotation junction: and,
   d. wherein the means for transferring comprises a pair of optical blocks, wherein each pair of optical blocks is optically associated with a laser beam path, whereby the optical block pair is capable of transmitting the laser beam across a rotation junction; and wherein at least one of the pair of optical blocks passes through a second laser beam path.

2. The device of claim 1, wherein the means for transferring comprises at least four high power laser couplers.

3. A rotational function transmission device for transmitting very high power laser energy, the device comprising:
   a. a housing having a first end and a second end;
   b. a first plate rotatably affixed to the first end of the housing, and a second plate affixed to the second end of the housing, wherein the first and second plates and the housing define a rotation junction there between;
   c. a means for transferring a laser beam having at least about 20 kW of power across the rotation junction; and,
   d. wherein the means for transferring comprises an optical block having a plurality of transmissive reflective surfaces with in the block.

4. The device of claim 3, wherein the optical block has at least four transmissive reflective surfaces and each surface is optically associated with a high power optical fiber.

5. A rotational function transmission device for transmitting very high power laser energy, the device comprising:
   a. a housing having a first end and a second end;
   b. a first plate rotatably affixed to the first end of the housing, and a second plate affixed to the second end of the housing, wherein the first and second plates and the housing define a rotation junction there between;
   c. a means for transferring a laser beam having at least about 20 kW of power across the rotation junction; and,
   d. wherein the means for transferring comprises a ratchet mechanism.

* * * * *